United States Patent
Parnaby

(10) Patent No.: US 12,525,320 B2
(45) Date of Patent: Jan. 13, 2026

(54) NEURAL NETWORK PARAMETER QUANTIZATION FOR BASE CALLING

(71) Applicant: Illumina, Inc., San Diego, CA (US)

(72) Inventor: Gavin Derek Parnaby, Laguna Niguel, CA (US)

(73) Assignee: Illumina, Inc., San Deigo (CA)

( * ) Notice: Subject to any disclaimer, the term of this patent is extended or adjusted under 35 U.S.C. 154(b) by 957 days.

(21) Appl. No.: 17/687,583

(22) Filed: Mar. 4, 2022

(65) Prior Publication Data

US 2022/0300811 A1    Sep. 22, 2022

Related U.S. Application Data

(60) Provisional application No. 63/161,880, filed on Mar. 16, 2021, provisional application No. 63/161,896, filed on Mar. 16, 2021.

(51) Int. Cl.
*G16B 30/00* (2019.01)
*G06N 3/04* (2023.01)
(Continued)

(52) U.S. Cl.
CPC .............. *G16B 30/00* (2019.02); *G06N 3/04* (2013.01); *G06N 3/0464* (2023.01);
(Continued)

(58) Field of Classification Search
None
See application file for complete search history.

(56) References Cited

U.S. PATENT DOCUMENTS

| 5,502,773 A | 3/1996 | Tibbetts et al. |
| 5,641,658 A | 6/1997 | Adams et al. |

(Continued)

FOREIGN PATENT DOCUMENTS

| CA | 2894317 A1 | 12/2016 |
| CA | 3065927 A1 | 7/2019 |

(Continued)

OTHER PUBLICATIONS

Gong et al., "Compressing Deep Convolutional Networks using Vector Quantization," Dec. 18, 2014, https://arxiv.org/abs/1412.6115.*

(Continued)

*Primary Examiner* — Ryan Barrett
(74) *Attorney, Agent, or Firm* — Keller Preece PLLC

(57) ABSTRACT

A method of quantizing parameters of a neural network includes grouping a plurality of parameters of a neural network in a plurality of groups. Each group of the plurality of groups includes corresponding two or more parameters of the plurality of parameters. In an example, for each group, a corresponding quantization format is selected from a plurality of available quantization formats, such that a first quantization format selected for at least a first group is different from a second quantization format selected for at least a second group. For each group, individual parameters within the corresponding group are quantized using the quantization format selected for the corresponding group. The quantized parameters of the plurality of groups are stored in a memory.

31 Claims, 28 Drawing Sheets

| Graphical representation | Format name | Range of values that can be represented (in decimal number) | | Resolution (value of LSB) |
|---|---|---|---|---|
| | | Lower range | Upper range | |
| | S0.7 format | -1 | 0.9921875 | 0.0078125 |
| | S1.6 format | -2 | 1.984375 | 0.015625 |
| | S2.5 format | -4 | 3.96875 | 0.03125 |
| | S3.4 format | -8 | 7.9375 | 0.0625 |
| | S4.3 format | -16 | 15.875 | 0.125 |
| | S5.2 format | -32 | 31.75 | .025 |
| | S6.1 format | -64 | 63.5 | 0.5 |
| | S7.0 format | -128 | 127 | 1 |

(51) Int. Cl.
  *G06N 3/0464* (2023.01)
  *G06N 3/0495* (2023.01)
  *G06N 3/08* (2023.01)
  *G16B 40/00* (2019.01)
(52) U.S. Cl.
  CPC ............. *G06N 3/0495* (2023.01); *G06N 3/08* (2013.01); *G16B 40/00* (2019.02)

(56) References Cited

U.S. PATENT DOCUMENTS

| | | | |
|---|---|---|---|
| 6,090,592 | A | 7/2000 | Adams et al. |
| 7,057,026 | B2 | 6/2006 | Barnes et al. |
| 7,115,400 | B1 | 10/2006 | Adessi et al. |
| 7,211,414 | B2 | 5/2007 | Hardin et al. |
| 7,315,019 | B2 | 1/2008 | Turner et al. |
| 7,329,492 | B2 | 2/2008 | Hardin et al. |
| 7,405,281 | B2 | 7/2008 | Xu et al. |
| 7,427,673 | B2 | 9/2008 | Balasubramanian et al. |
| 7,541,444 | B2 | 6/2009 | Milton et al. |
| 7,566,537 | B2 | 7/2009 | Balasubramanian et al. |
| 7,592,435 | B2 | 9/2009 | Milton et al. |
| 8,182,993 | B2 | 5/2012 | Tomaney et al. |
| 8,241,573 | B2 | 8/2012 | Banerjee et al. |
| 8,392,126 | B2 | 3/2013 | Mann |
| 8,401,258 | B2 | 3/2013 | Hargrove et al. |
| 8,407,012 | B2 | 3/2013 | Erlich et al. |
| 8,594,439 | B2 | 11/2013 | Staelin et al. |
| 8,703,422 | B2 | 4/2014 | Tomaney et al. |
| 8,725,425 | B2 | 5/2014 | Heiner et al. |
| 8,795,971 | B2 | 8/2014 | Kersey et al. |
| 8,965,076 | B2 | 2/2015 | Garcia et al. |
| 9,175,343 | B2 | 11/2015 | Tomaney et al. |
| 9,279,154 | B2 | 3/2016 | Previte et al. |
| 9,453,258 | B2 | 9/2016 | Kain et al. |
| 9,708,656 | B2 | 7/2017 | Turner et al. |
| 10,023,911 | B2 | 7/2018 | Tomaney et al. |
| 10,068,053 | B2 | 9/2018 | Kermani et al. |
| 10,068,054 | B2 | 9/2018 | Van Rooyen et al. |
| 10,152,776 | B2 | 12/2018 | Langlois et al. |
| 10,168,438 | B2 | 1/2019 | Dennis et al. |
| 10,241,075 | B2 | 3/2019 | Davey et al. |
| 10,354,747 | B1 | 7/2019 | DePristo et al. |
| 10,423,861 | B2 | 9/2019 | Gao et al. |
| 10,491,239 | B1 | 11/2019 | Hubara |
| 10,527,549 | B2 | 1/2020 | Rebetez et al. |
| 10,540,591 | B2 | 1/2020 | Gao et al. |
| 10,619,195 | B2 | 4/2020 | Lamb et al. |
| 10,648,027 | B2 | 5/2020 | Mannion et al. |
| 10,711,299 | B2 | 7/2020 | Rothberg et al. |
| 10,713,794 | B1 | 7/2020 | He et al. |
| 10,740,880 | B2 | 8/2020 | Paik et al. |
| 10,740,883 | B2 | 8/2020 | Zerfass et al. |
| 10,755,810 | B2 | 8/2020 | Buckler et al. |
| 10,943,255 | B1 | 3/2021 | Andreou |
| 10,963,673 | B2 | 3/2021 | Schaumberg et al. |
| 11,056,220 | B2 | 7/2021 | Lyman et al. |
| 11,107,554 | B2 | 8/2021 | Pratt et al. |
| 11,138,496 | B2 | 10/2021 | Seth |
| 11,210,554 | B2 | 12/2021 | Dutta et al. |
| 11,276,480 | B2 | 3/2022 | Pratt et al. |
| 11,347,965 | B2 | 5/2022 | Dutta et al. |
| 11,436,429 | B2 | 9/2022 | Jaganathan et al. |
| 11,462,300 | B2 | 10/2022 | Bartov et al. |
| 11,538,556 | B2 | 12/2022 | Rothberg et al. |
| 11,783,917 | B2 | 10/2023 | Jaganathan et al. |
| 2002/0055100 | A1 | 5/2002 | Kawashima et al. |
| 2002/0147548 | A1 | 10/2002 | Walther et al. |
| 2003/0062485 | A1 | 4/2003 | Fernandez et al. |
| 2004/0002090 | A1 | 1/2004 | Mayer et al. |
| 2004/0062360 | A1 | 4/2004 | Holeva |
| 2004/0096853 | A1 | 5/2004 | Mayer |
| 2006/0014151 | A1 | 1/2006 | Ogura et al. |
| 2006/0040297 | A1 | 2/2006 | Leamon et al. |
| 2006/0064248 | A1 | 3/2006 | Saidi et al. |
| 2006/0188901 | A1 | 8/2006 | Barnes et al. |
| 2006/0224529 | A1 | 10/2006 | Kermani |
| 2006/0240439 | A1 | 10/2006 | Smith et al. |
| 2006/0269130 | A1 | 11/2006 | Maroy et al. |
| 2007/0118490 | A1 | 5/2007 | Soderman et al. |
| 2007/0128624 | A1 | 6/2007 | Gormley et al. |
| 2007/0166705 | A1 | 7/2007 | Milton et al. |
| 2007/0250274 | A1 | 10/2007 | Volkov et al. |
| 2008/0009420 | A1 | 1/2008 | Schroth et al. |
| 2008/0181296 | A1* | 7/2008 | Tian ............... H04N 19/18 375/240.2 |
| 2008/0234136 | A1 | 9/2008 | Drmanac et al. |
| 2008/0242560 | A1 | 10/2008 | Gunderson et al. |
| 2009/0024331 | A1 | 1/2009 | Tomaney et al. |
| 2009/0081775 | A1 | 3/2009 | Hodneland et al. |
| 2010/0046830 | A1 | 2/2010 | Wang et al. |
| 2010/0088255 | A1 | 4/2010 | Mann |
| 2010/0111370 | A1 | 5/2010 | Black et al. |
| 2010/0157086 | A1 | 6/2010 | Segale et al. |
| 2011/0007981 | A1 | 1/2011 | Osher et al. |
| 2011/0059865 | A1 | 3/2011 | Smith et al. |
| 2011/0065607 | A1 | 3/2011 | Kersey et al. |
| 2011/0144991 | A1* | 6/2011 | Fousek ............ G10L 19/032 704/243 |
| 2011/0281736 | A1 | 11/2011 | Drmanac et al. |
| 2011/0286628 | A1 | 11/2011 | Goncalves et al. |
| 2011/0295902 | A1 | 12/2011 | Mande et al. |
| 2012/0015825 | A1 | 1/2012 | Zhong et al. |
| 2012/0020537 | A1 | 1/2012 | Garcia et al. |
| 2013/0059740 | A1 | 3/2013 | Drmanac et al. |
| 2013/0079232 | A1 | 3/2013 | Kain et al. |
| 2013/0090860 | A1 | 4/2013 | Sikora et al. |
| 2013/0124100 | A1 | 5/2013 | Drmanac et al. |
| 2013/0188866 | A1 | 7/2013 | Obrador et al. |
| 2013/0250407 | A1 | 9/2013 | Schaffer et al. |
| 2014/0051588 | A9 | 2/2014 | Drmanac et al. |
| 2014/0152801 | A1 | 6/2014 | Fine et al. |
| 2015/0079596 | A1 | 3/2015 | Eltoukhy et al. |
| 2015/0117784 | A1 | 4/2015 | Lin et al. |
| 2015/0169824 | A1 | 6/2015 | Kermani et al. |
| 2016/0042511 | A1 | 2/2016 | Chukka et al. |
| 2016/0078272 | A1 | 3/2016 | Hammoud |
| 2016/0102348 | A1 | 4/2016 | Donnet |
| 2016/0110498 | A1 | 4/2016 | Bruand et al. |
| 2016/0196479 | A1 | 7/2016 | Chertok et al. |
| 2016/0247034 | A1 | 8/2016 | Lee et al. |
| 2016/0350914 | A1 | 12/2016 | Champlin et al. |
| 2016/0356715 | A1 | 12/2016 | Zhong et al. |
| 2016/0357903 | A1 | 12/2016 | Shendure et al. |
| 2016/0371431 | A1 | 12/2016 | Haque et al. |
| 2017/0044601 | A1 | 2/2017 | Crnogorac et al. |
| 2017/0098032 | A1 | 4/2017 | Desai et al. |
| 2017/0116520 | A1 | 4/2017 | Min et al. |
| 2017/0161545 | A1 | 6/2017 | Champlin et al. |
| 2017/0169313 | A1 | 6/2017 | Choi et al. |
| 2017/0228496 | A1 | 8/2017 | Boutros et al. |
| 2017/0249421 | A1 | 8/2017 | Eberle et al. |
| 2017/0249744 | A1 | 8/2017 | Wang et al. |
| 2017/0362634 | A1 | 12/2017 | Ota et al. |
| 2018/0075279 | A1 | 3/2018 | Gertych et al. |
| 2018/0107926 | A1* | 4/2018 | Choi ............... G06F 7/582 |
| 2018/0107927 | A1 | 4/2018 | Frey |
| 2018/0114337 | A1 | 4/2018 | Li et al. |
| 2018/0165412 | A1 | 6/2018 | Frey et al. |
| 2018/0189613 | A1 | 7/2018 | Wolf et al. |
| 2018/0195953 | A1 | 7/2018 | Langlois et al. |
| 2018/0197081 | A1* | 7/2018 | Ji ................. G06N 3/08 |
| 2018/0201992 | A1 | 7/2018 | Wu et al. |
| 2018/0204048 | A1 | 7/2018 | Chefd'Hotel et al. |
| 2018/0211001 | A1 | 7/2018 | Gopalan et al. |
| 2018/0253528 | A1 | 9/2018 | Strauss et al. |
| 2018/0274023 | A1 | 9/2018 | Belitz et al. |
| 2018/0276333 | A1 | 9/2018 | Njie et al. |
| 2018/0286040 | A1 | 10/2018 | Sashida |
| 2018/0305751 | A1 | 10/2018 | Vermaas et al. |
| 2018/0322327 | A1 | 11/2018 | Smith et al. |
| 2018/0330824 | A1 | 11/2018 | Athey |
| 2018/0334711 | A1 | 11/2018 | Kelley et al. |
| 2018/0334712 | A1 | 11/2018 | Singer et al. |

(56) References Cited

U.S. PATENT DOCUMENTS

| | | |
|---|---|---|
| 2018/0340234 A1 | 11/2018 | Scafe et al. |
| 2019/0034586 A1 | 1/2019 | Pirrotte et al. |
| 2019/0080450 A1 | 3/2019 | Arar et al. |
| 2019/0107642 A1 | 4/2019 | Farhadi Nia et al. |
| 2019/0114464 A1 | 4/2019 | Nicolle et al. |
| 2019/0114544 A1 | 4/2019 | Sundaram et al. |
| 2019/0128869 A1 | 5/2019 | Chou et al. |
| 2019/0156915 A1 | 5/2019 | Zhang et al. |
| 2019/0164010 A1 | 5/2019 | Ma et al. |
| 2019/0170680 A1 | 6/2019 | Sikora et al. |
| 2019/0180153 A1 | 6/2019 | Buckler et al. |
| 2019/0213473 A1 | 7/2019 | Dutta et al. |
| 2019/0237160 A1 | 8/2019 | Rothberg et al. |
| 2019/0237163 A1 | 8/2019 | Wang et al. |
| 2019/0244348 A1 | 8/2019 | Buckler et al. |
| 2019/0252041 A1 | 8/2019 | Frey et al. |
| 2019/0266491 A1 | 8/2019 | Gao et al. |
| 2019/0272638 A1 | 9/2019 | Mouton et al. |
| 2019/0332118 A1 | 10/2019 | Wang et al. |
| 2019/0378248 A1 | 12/2019 | Ida et al. |
| 2019/0392578 A1 | 12/2019 | Chukka et al. |
| 2020/0027002 A1 | 1/2020 | Hickson et al. |
| 2020/0054306 A1 | 2/2020 | Mehanian et al. |
| 2020/0057838 A1 | 2/2020 | Yekhanin et al. |
| 2020/0065675 A1 | 2/2020 | Sundaram et al. |
| 2020/0123552 A1 | 4/2020 | Lee et al. |
| 2020/0125947 A1 | 4/2020 | Park et al. |
| 2020/0176082 A1 | 6/2020 | Massingham |
| 2020/0185055 A1 | 6/2020 | Debourg-Felonneau et al. |
| 2020/0193597 A1 | 6/2020 | Fan et al. |
| 2020/0226368 A1 | 7/2020 | Bakalo et al. |
| 2020/0256856 A1 | 8/2020 | Chou et al. |
| 2020/0272881 A1* | 8/2020 | Lo ................... G06N 3/044 |
| 2020/0285933 A1* | 9/2020 | Zhang ................ G06N 3/048 |
| 2020/0302223 A1 | 9/2020 | Dutta et al. |
| 2020/0302224 A1 | 9/2020 | Jaganathan et al. |
| 2020/0302276 A1* | 9/2020 | Yang ................. G06N 3/084 |
| 2020/0302283 A1* | 9/2020 | Zhu .................. G06N 3/063 |
| 2020/0302297 A1* | 9/2020 | Jaganathan ......... G06V 10/454 |
| 2020/0302603 A1 | 9/2020 | Barnes et al. |
| 2020/0320294 A1 | 10/2020 | Mangal et al. |
| 2020/0327377 A1 | 10/2020 | Jaganathan et al. |
| 2020/0342955 A1 | 10/2020 | Guo et al. |
| 2020/0364565 A1 | 11/2020 | Kostem |
| 2020/0388029 A1 | 12/2020 | Saltz et al. |
| 2021/0019630 A1* | 1/2021 | Yao ................... G06N 3/047 |
| 2021/0020314 A1 | 1/2021 | Ehrich et al. |
| 2021/0027462 A1 | 1/2021 | Bredno et al. |
| 2021/0056287 A1 | 2/2021 | Schaumburg et al. |
| 2021/0064954 A1* | 3/2021 | Choi .................. G06N 3/063 |
| 2021/0072391 A1 | 3/2021 | Li et al. |
| 2021/0089827 A1 | 3/2021 | Kumagai et al. |
| 2021/0115490 A1 | 4/2021 | Embree et al. |
| 2021/0174172 A1* | 6/2021 | Qadeer ................ G06N 3/048 |
| 2021/0183053 A1 | 6/2021 | Zink et al. |
| 2021/0224658 A1* | 7/2021 | Mathew ................ G06N 3/04 |
| 2021/0257050 A1 | 8/2021 | Lam et al. |
| 2021/0264266 A1 | 8/2021 | Dutta et al. |
| 2021/0264267 A1 | 8/2021 | Dutta et al. |
| 2021/0265009 A1 | 8/2021 | Jaganathan et al. |
| 2021/0265015 A1 | 8/2021 | Parnaby et al. |
| 2021/0265016 A1 | 8/2021 | Vessere et al. |
| 2021/0265017 A1 | 8/2021 | Dutta et al. |
| 2021/0265018 A1 | 8/2021 | Dutta et al. |
| 2021/0279635 A1* | 9/2021 | Gadelrab ............. G06N 3/063 |
| 2021/0324374 A1 | 10/2021 | Feagin et al. |
| 2021/0390278 A1 | 12/2021 | Van Leeuwen et al. |
| 2022/0067489 A1 | 3/2022 | Kashefhaghighi et al. |
| 2022/0067497 A1* | 3/2022 | Dikici ................ G06N 3/063 |
| 2022/0075669 A1* | 3/2022 | Shomron .............. G06N 3/063 |
| 2022/0101133 A1* | 3/2022 | Ardywibowo ......... G06N 3/084 |
| 2022/0114479 A1* | 4/2022 | Zhao ................. G06N 3/0985 |
| 2022/0121884 A1 | 4/2022 | Zadeh et al. |
| 2022/0129759 A1* | 4/2022 | Yao .................. G06N 3/084 |
| 2022/0147760 A1 | 5/2022 | Dutta et al. |
| 2023/0048206 A1* | 2/2023 | Athreya ............... G06N 3/045 |
| 2023/0154208 A1 | 5/2023 | Desroziers et al. |

FOREIGN PATENT DOCUMENTS

| | | |
|---|---|---|
| CA | 3104851 A1 | 11/2020 |
| CN | 105980578 A | 9/2016 |
| CN | 105989248 A | 10/2016 |
| CN | 108203847 A | 6/2018 |
| CN | 108319817 A | 7/2018 |
| CN | 106770114 A | 3/2019 |
| CN | 109416928 A | 3/2019 |
| CN | 110245685 A | 9/2019 |
| EP | 3130681 A1 | 2/2017 |
| EP | 3373238 A1 | 9/2018 |
| JP | 2007199397 A | 8/2007 |
| JP | 2018-173943 A | 11/2018 |
| JP | 2019-537157 A | 12/2019 |
| NL | 2023310 A | 9/2020 |
| NL | 2023311 A | 9/2020 |
| NL | 2023312 A | 9/2020 |
| NL | 2023314 A | 9/2020 |
| NL | 2023316 A | 9/2020 |
| RU | 2580425 C1 | 4/2016 |
| RU | 2750706 C2 | 7/2021 |
| SG | 10201913208 | 2/2020 |
| WO | 9106678 A1 | 5/1991 |
| WO | 9727317 A1 | 7/1997 |
| WO | 2004018497 A2 | 3/2004 |
| WO | 2005065814 A1 | 7/2005 |
| WO | 2006064199 A1 | 6/2006 |
| WO | 2007010251 A2 | 1/2007 |
| WO | 2007123744 A2 | 11/2007 |
| WO | 2008154317 A1 | 12/2008 |
| WO | 2012058096 A1 | 5/2012 |
| WO | 2014142921 A1 | 9/2014 |
| WO | 2015084985 A2 | 6/2015 |
| WO | 2016145516 A1 | 9/2016 |
| WO | 2016201564 A1 | 12/2016 |
| WO | 2017184997 A1 | 10/2017 |
| WO | 2018-068014 A1 | 4/2018 |
| WO | 2018-102748 A1 | 7/2018 |
| WO | 2018129314 A1 | 7/2018 |
| WO | 2018165099 A1 | 9/2018 |
| WO | 2018203084 A1 | 11/2018 |
| WO | 2019-036388 A1 | 2/2019 |
| WO | 2019027767 A1 | 2/2019 |
| WO | 2019028047 A1 | 2/2019 |
| WO | 2019055856 A1 | 3/2019 |
| WO | 2019079182 A1 | 4/2019 |
| WO | 2019079202 A1 | 4/2019 |
| WO | 2019-084515 A1 | 5/2019 |
| WO | 2019090251 A2 | 5/2019 |
| WO | 2019136284 A1 | 7/2019 |
| WO | 2019136388 A1 | 7/2019 |
| WO | 2019140402 A1 | 7/2019 |
| WO | 2019147904 A1 | 8/2019 |
| WO | 2020014280 A1 | 1/2020 |
| WO | 2020123552 A1 | 6/2020 |
| WO | 2020-191387 A1 | 9/2020 |
| WO | 2020-191389 A1 | 9/2020 |
| WO | 2020-191390 A1 | 9/2020 |
| WO | 2020-191391 A1 | 9/2020 |
| WO | 2020-205296 A1 | 10/2020 |
| WO | 2020-232409 A1 | 11/2020 |
| WO | 2020-232410 A1 | 11/2020 |
| WO | 2020-243185 A1 | 12/2020 |
| WO | PCT/US2021/018258 | 2/2021 |
| WO | PCT/US2021/018422 | 2/2021 |
| WO | PCT/US2021/018427 | 2/2021 |
| WO | PCT/US2021/018910 | 2/2021 |
| WO | PCT/US2021/018913 | 2/2021 |
| WO | PCT/US2021/018915 | 2/2021 |
| WO | PCT/US2021/018917 | 2/2021 |
| WO | PCT/US2021/047763 | 8/2021 |
| WO | 2022-056296 A1 | 3/2022 |
| WO | PCT/US2022/020460 | 3/2022 |
| WO | PCT/US2022/020462 | 3/2022 |

(56) References Cited

FOREIGN PATENT DOCUMENTS

| WO | PCT/US2022/021814 | 3/2022 |
|---|---|---|
| WO | PCT/US2022/24911 | 4/2022 |
| WO | PCT/US2022/24913 | 4/2022 |
| WO | PCT/US2022/24916 | 4/2022 |
| WO | PCT/US2022/24918 | 4/2022 |
| WO | PCT/US2022/035564 | 6/2022 |
| WO | PCT/US2022/035567 | 6/2022 |
| WO | PCT/US2022/035847 | 6/2022 |

OTHER PUBLICATIONS

Kao et. al., BayesCall: A model-based base-calling algorithm for high-throughput short-read sequencing, Genome Research (19), pp. 1884-1895, dated 2009.
Rang et. al., From squiggle to basepair: computational approaches for improving nanopore sequencing read accuracy, Genome Biology 2018, (19), 30.
Wang et. al., An adaptive decorrelation method removes Illumina DNA base-calling errors caused by crosstalk between adjacent clusters, Scientific Reports, published Feb. 20, 2017, 11 pages.
Cacho et. al., A comparison of Base Calling Algorithms for Illumina Sequencing Technology, dated Oct. 5, 2015, Briefings in Bioinformatics 2016 (17), 786-795.
Luo et. al., G-softmax: Improving Intra-class Compactness and Inter-class Separability of Features, dated Apr. 8, 2019, 15 pages.
Luo et. al., A multi-task convolutional deep neural network for variant calling in single molecule sequencing, Nature Communications (10), No. 1, dated Mar. 1, 2019.
Kingma et. al., Adam: A method for Stochastic Optimization, ICLR 2015, dated Jul. 23, 2015.
Luo et. al., Skyhawk: An Artificial Neural Network-based discriminator for reviewing clinically significant genomic variants, dated Jan. 28, 2019, 8 pages.
MiSEQ: Imaging and Base Calling: Illumina, Inc. Online Training Course, colored version, [retrieved on Oct. 11, 2020], Retrieved from <URL: https://support.illumina.com/training.html >, 9 pages.
Kircher et. al., Improved base-calling for the Illumina Genome Analyzer using Machine Learning Strategies, Genome Biology, published Aug. 14, 2009, 9 pages.
Angermueller, Christof, et. al., Deep learning for computational biology, Molecular Systems Biology, dated Jun. 6, 2016, 16 pages.
Smith et. al., Barcoding and demultiplexing Oxford nanopore native RNA sequencing reads with deep residual learning, bioRxiv, dated Dec. 5, 2019, 18 pages.
Aggarwal, Neural Networks and Deep Learning: A Textbook, Springer, dated Aug. 26, 2018, 512 pages.
Wang et. al., Deep Neural Network Approximation for Custom Hardware: Where We've Been, Where We're Going, Cornell University, dated Jan. 21, 2019, 37 pages.
Lavin et. al., Fast Algorithms for Convolutional Neural Networks, dated Nov. 10, 2015, 9 pages.
Liu et. al., A Uniform Architecture Design for Accelerating 2D and 3D CNNs on FPGAs, published Jan. 7, 2019, 19 pages.
Zeng et. al., Causalcall: Nanopore Basecalling Using a Temporal Convolutional Network, dated Jan. 20, 2020, 11 pages.
Kwon et. al., Understanding Reuse, Performance, and Hardware Cost of DNN Dataflow—A Data-Centric Approach, Proceedings of the 52nd Annual IEEE/ACM International Symposium on Microarchitecture, dated Oct. 12, 2019, 13 pages.
Sze et. al., Efficient Processing of Deep Neural Networks: A Tutorial and Survey, Cornell University Library, dated Mar. 27, 2017, 21 pages.
Sundaram, L. et. al., "Predicitng the clinical impact of human mutation with deep neural networks", Nat. Genet. 50, 1161-1170 (2018).
Jaganathan, K. et. al., "Predicting splicing from primary sequence with deep learning", Cell 176, 535-548, (2019).

Kircher, Martin, et al. "A general framework for estimating the relative pathogenicity of human genetic variants." Nature genetics 46.3 (2014): 310. (Year:2014).
Henikoff, S. & Henikoff, J. G. Amino acid substitution matrices from protein blocks. Proc. Natl. Acad. Sci. USA 89, 10915-10919 (1992).
Li, W. H., Wu, C. I. & Luo, C. C. Nonrandomness of point mutation as reflected in nucleotide substitutions in pseudogenes and its evolutionary implications. J. Molec. Evol. 21, 58-71 (1984).
Grantham, R. Amino acid difference formula to help explain protein evolution. Science 185, 862-864 (1974).
LeCun, Y., Botlou, L., Bengio, Y., & Haffner, P. Gradient based learning applied to document recognition. Proc. IEEE 86, 2278-2324 (1998).
Vissers, L. E., Gilissen, C., & Veltman, J. A. Genetic studies in intellectual disability and related disorders. Nat. Rev. Genet. 17, 9-18 (2016).
Neale, B. M. et al. Patterns and rates of exonic de novo mutations in autism spectrum disorders. Nature 485, 242-245 (2012).
Sanders, S. J. et al. De novo mutations revealed by whole-exome sequencing are strongly associated with autism. Nature 485, 237-241 (2012).
De Rubeis, S. et al. Synaptic, transcriptional and chromatin genes disrupted in autism. Nature 515, 209-215 (2014).
Deciphering Developmental Disorders Study. Large-scale discovery of novel genetic causes of developmental disorders. Nature 519, 223-228 (2015).
Deciphering Developmental Disorders Study. Prevalence and architecture of de novo mutations in developmental disorders. Nature 542, 433-438 (2017).
Iossifov, I. et al. The contribution of de novo coding mutations to autism spectrum disorder. Nature 515, 216-221 (2014).
Zhu, X. Need, A. C., Petrovski, S. & Goldstein, D. B. One gene, many neuropsychiatric disorders: lessons from Mendelian diseases. Nat. Neurosci. 17, 773-781, (2014).
Leffler, E. M. et al. Revisiting an old riddle: what determines genetic diversity levels within species? PLoS Biol. 10, e1001388 (2012), 9pages.
Estrada, A. et al. Impending extinction crisis of the world's primates—why primates matter. Sc. Adv. 3, e1600946 (2017), 17 pages.
Kent, W. J. et al. The human genome browser at UCSC. Genome Res. 12, 996-1006 (2002).
Tyner, C. et al. The UCSC Genome Browser database—2017 update. Nucleic Acids Res. 45, D626-D634 (2017).
Kabsch, W., & Sander, C. Dictionary of protein secondary structure—pattern recognition of hydrogen-bonded and geometrical features. Biopolymers 22, 2577-2637 (1983).
Joosten, R. P. et al. A series of PDB related databases for everyday needs. Nucleic Acids Res. 39, 411-419 (2011).
He, K, Zhang, X., Ren, S., & Sun, J. Identity mappings in deep residual networks. in 14th European Conference on Computer Vision—ECCV 2016. ECCV 2016. Lecture Notes in Computer Science, vol. 9908; 630 6, 15 (Springer, Cham, Switzerland; 2016).
Onita-Laza, I., McCallum, K., Xu, B., & Buxbaum, J. D. A spectral approach integrating functional genomic annotations for coding and noncoding variants. Nat. Genet. 48, 214-220 (2016).
Li, B. et al. Automated inference of molecular mechanisms of disease from amino acid substitutions. Bioinformatics 25, 2744-2750 (2009).
Lu, Q. et al. A statistical framework to predict functional non-coding regions in the human genome through integrated analysis of annotation data. Sci. Rep. 5, 10576 (2015), 13pgs.
Shihab, H. A. et al. Predicting the functional, molecular, and phenotypic consequences of amino acid substitutions using hidden Markov models. Human. Mutat. 34, 57-65 (2013).
Davydov, E. V. et al. Identifying a high fraction of the human genome to be under selective constraint using Gerp++. PLoS Comput. Biol. 6, Dec. 2, 2010, 13 pages.
Liu, X., Wu, C., Li, C., & Boerwinkle, E. dbNSFPv3.0 a one-stop database of functional predictions and annotations for human nonsynonymous and splice-site SNVs. Human. Mutat. 37, 235-241 (2016).

(56) References Cited

OTHER PUBLICATIONS

Jain, S., White, M., Radivojac, P. Recovering true classifier performance in positive-unlabeled learning. in Proceedings Thirty-First AAAI Conference on Artificial Intelligence. 2066-2072 (AAAI Press, San Francisco; 2017).
De Ligt, J. et al. Diagnostic exome sequencing in persons with severe intellectual disability. N. Engl. J. Med. 367, 1921-1929 (2012).
Iossifov, I. et al. De novo gene disruptions in children on the autistic spectrum. Neuron 74, 285-299 (2012).
Linder, Modeling the intronic regulation of Alternative Splicing using Deep Convolutional Neural Nets, KTH Institute of Technology, dated Jun. 14, 2015, 53 pages.
Bentley et al., Accurate Whole Human Genome Sequencing using Reversible Terminator Chemistry, Nature, Nov. 2008, 21 pages.
Illumina CMOS Chip and One-Channel SBS Chemistry, Illumina Inc, 2018, 4 pages.
Ilumina, Calculating Percent Passing Filter for Patterned and Nonpatterned Flow Cells, 2017, 2 pages.
Fritzilas, An Overview of Illumina's Sequencing Technology and its Applications, University of Primorska, dated Mar. 4, 2011, 47 pages.
Python Implementation of the color map function for the PASCAL VOC data set, Github, 4 pages, retrieved on Jul. 23, 2021. Retrieved from [URL: https://gist.github.com/wllhf/a4533e0adebe57e3ed06d4b50c8419ae ].
Illumina, Quality Score Encoding, 2 pages, retrieved on Jul. 23, 2021. Retrieved from [URL: https://support.illumina.com/help/BaseSpace_OLH_009008/Content/Source/Informatics/BS/QualityScoreEncoding_swBS.htm ].
Illumina, Reducing Whole-Genome Data Storage Footprint, Illumina Whitepaper, 2010-2014, 4 pages.
Badrinarayanan et. al., SegNet: A Deep Convolutional Encoder-Decoder Architecture for Image Segmentation, dated Oct. 10, 2016, 14 pages.
Li et. al., CS231 Lecture 13 Segmentation and Attention, Stanford University, dated Feb. 24, 2016, 133 pages.
Whiteford et. al., Swift: Primary data analysis for the Illumina Solexa sequencing platform, Bioinformatics, vol. 25, No. 17, 2009, pp. 2194-2199, 7 pages.
Schilling, The Effect of Batch Normalization on Deep Convolutional Neural Networks, KTH Royal Institute of Technology, 2016, 113 pages.
Tutorial Image Segmentation, BoofCV, 6 pages, retrieved on Jul. 23, 2021. Retrieved from [URL: https://boofcv.org/index.php?title=Tutorial_Image_Segmentation ].
Ilumina, Understanding Illumina Quality Scores, dated Apr. 23, 2014, 2 pages.
Zhang et. al., Estimating Phred scores of Illumina base calls by logistic regression and sparse modeling, Bio Med Central Bioinformatics, 2017, 14 pages.
Renaud et. al., freelbis: an efficient base caller with calibrated quality scores for Illumina sequencers, dated Mar. 6, 2013, 2 pages.
Kircher, Improving data quality of the Illumina Genome Analyzer platform, Max Planck Institute for Evolutionary Anthropology, dated Oct. 24, 2009, 46 pages.
Mitra et. al., Strategies for Achieving High Sequencing Accuracy for Low Diversity Samples and Avoiding Sample Bleeding Using Illumina Platform, PLOS One, published Apr. 10, 2015, 21 pages.
Datta et. al., Statistical Analyses of Next Generation Sequence Data: A Partial Overview, Journal of Proteomics and Bioinformatics, vol. 3, Issue 6, 2010, 8 pages.
Erlich et. al., Alta-Cyclic: a self-optimizing base-caller for next generation sequencing, Nature Methods, Aug. 2008, 7 pages.
Kao et. al., Algorithms for Next-Generation High-Throughput Sequencing Technologies, University of California, Berkeley, 2011, 106 pages.
Kircher et. al., Addressing challenges in the production and analysis of Illumina sequencing data, published Jul. 29, 2011, retrieved on Jul. 24, 2021, 25 pages. Retrieved from [URL: https://www.ncbi.nlm.nih.gov/pmc/articles/PMC3163567/ ].
Teng et. al., Chiron: translating nanopore raw signal directly into nucleotide sequence using deep learning, GigaScience, 7, 2018, 9 pages.
Ratkovic, Deep Learning Model for Base Calling of MinION Nanopore Reads, dated Jun. 2017, 48 pages.
Teng et. al., Chiron: translating nanopore raw signal directly into nucleotide sequence using deep learning, dated Aug. 23, 2017, 10 pages.
Stoiber et al., BasecRAWller: Streaming Nanopore Basecalling Directly from Raw Signal, dated May 1, 2017, 15 pages.
Li et. al., DeepSimulator: a deep simulator for Nanopore sequencing, Bioinformatics 34(17), 2018, pp. 2899-2908, 10 pages.
Wick et. al., Performance of neural network basecalling tools for Oxford Nanopore sequencing, dated Feb. 7, 2019, 14 pages.
Ledergerber et. al., Base-calling for next-generation sequencing platforms, Briefings in Bioinformatics vol. 12, No. 5, pp. 489-497, dated Jan. 18, 2011, 9 pages.
Sheikh et. al., Chapter 5 Base-Calling for Bioinformaticians, 2012, 17 pages.
Kriseman et. al., BING: Biomedical informatics pipeline for Next Generation Sequencing, Journal of Biomedical Informatics, vol. 43, 2010, pp. 428-434, 7 pages.
Das et. al., Model-based sequential base calling for Illumina sequencing, IEEE, 2010, 4 pages.
Shamaiah et. al., Base calling error rates in next-generation DNA sequencing, IEEE Statistical Signal Processing Workshop, 2012, 4 pages.
Ye et. al., BlindCall: ultra-fast base-calling of high-throughput sequencing data by blind deconvolution, Bioinformatics, vol. 30, No. 9, 2014, pp. 1214-1219, 6 pages.
Wolowski, High-quality, high-throughput measurement of protein-DNA binding using HiTS-FLIP, Ludwig Maxmilian University, 2016, 251 pages.
Bravo et. al., Model-Based Quality Assessment and Base-Calling for Second-Generation Sequencing Data, Biometrics, 2009, 10 pages.
Illumina, RTA Theory of Operation, 2009, 8 pages.
Dash et. al., Artificial Intelligence and Evolutionary Computations in Engineering Systems, Advances in Intelligent Systems and Computing, vol. 1056, Springer 2020, 781 pages.
Ahmed, SIGNET: A Neural Network Architecture for Predicting Protein-Protein Interactions, The University of Western Ontario, dated May 7, 2017, 84 pages.
Deepa J, Development of Fully Automated Image Analysis Method for High Density cDNA and array CGH Microarray based genomic studies, Cochin University of Science and Technology, Mar. 2013, 232 pages.
Zhang et. al., Nanopore basecalling from a perspective of instance segmentation, BMC Bioinformatics, 2020, 9 pages.
Kao et. al., naiveBayesCall: An Efficient Model-Based Base-Calling Algorithm for High-Throughput Sequencing, Journal of Computational Biology, dated Mar. 2011, 16 pages.
Wick et. al., Performance of neural network basecalling tools for Oxford Nanopore sequencing, Genome Biology, 2019, 10 pages.
Baek et. al., LncRNAnet: long non-coding RNA identification using deep learning, Bioinformatics, vol. 34 (22), 2018, pp. 3889-3897, 9 pages.
Evans et. al., Estimating Change-Points in Biological Sequences via the Cross-Entropy Method, dated Sep. 20, 2010, 17 pages.
Shen et. al., ParticleCall: A particle filter for base calling in next-generation sequencing systems, BMC Bioinformatics, 2012, 10 pages.
Peresini et. al., Nanopore Base Calling on the Edge, dated Nov. 9, 2020, 15 pages.
Liang et. al., Bayesian Basecalling for DNA Sequence Analysis Using Hidden Markov Models, IEEE Transactions on Computational Biology and Bioinformatics, vol. 4, No. 3, Jul.-Sep. 2007, 11 pages.

(56) References Cited

OTHER PUBLICATIONS

Wang et. al., DeepDNA: a hybrid convolutional and recurrent neural network for compressing human mitochondrial genomes, IEEE International Conference on Bioinformatics and Biomedicine, 2018, 5 pages.
Anonymous, Vanishing Gradient Problem, Wikipedia, dated Jun. 16, 2018, retrieved on Jan. 12, 2020. Retrieved from [URL: https://en.wikipedia.org/w/index.php?title=Vanishing_gradient_problem&oldid=846115335 ].
Chun, S. & Fay, J. C. Identification of deleterious mutations within three human genomes. Genome Res. 19, 1553-1561 (2009).
Schwarz, J. M., Rodelsperger, C., Schuelke, M. & Seelow, D. MutationTaster evaluates disease-causing potential of sequence alterations. Nat. Methods 7, 575-576 (2010).
Reva, B., Antipin, Y., & Sander, C. Predicting the functional impact of protein mutations—application to cancer genomics. Nucleic Acids Res. 39, e118 (2011), 14pgs.
Dong, C. et al. Comparison and integration of deleteriousness prediction methods for nonsynonymous SNVs in whole exome sequencing studies. Hum. Mol. Genet. 24, 2125-2137 (2015).
Carter, H., Douville, C., Stenson, P. D., Cooper, D. N., & Karchin, R. Identifying Mendelian disease genes with the variant effect scoring tool. BMC Genom, (2013), 13 pages.
Choi, Y., Sims, G. E., Murphy, S., Miller, J. R., & Chan, A. P. Predicting the functional effect of amino acid substitutions and indels. PLoS One 7, e46688 (2012).
Gulko, B., Hubisz, M. J., Gronau, I., & Siepel, A. A method for calculating probabilities of fitness consequences for point mutations across the human genome. Nat. Genet. 47, 276-283 (2015).
Shihab, H. A. et al. An integrative approach to predicting the functional effects of non-coding and coding sequence variation. Bioinformatics 31, 1536-1543 (2015).
Bell, C. J. et al. Comprehensive carrier testing for severe childhood recessive diseases by next generation sequencing. Sci. Transl. Med. 3, Jan. 12, 2011, 28 pages.
Smedley, D. et al. A whole-genome analysis framework for effective identification of pathogenic regulatory variants in mendelian disease. Am. J. Hum. Genet. 99, 595-606 (2016).
Jagadeesh, K. A. et al. M-CAP eliminates a majority of variants of uncertain significance in clinical exomes at high sensitivity. Nat. Genet. 48, 1581-1586 (2016).
Grimm, D. G. The evaluation of tools used to predict the impact of missense variants is hindered by two types of circularity. Human. Mutat. 36, 513-523 (2015).
Hefferman, R. et al. Improving prediction of secondary structure, local backbone angles, and solvent accessible surface area of proteins by iterative deep learning. Sci. Rep. 5, 11476 (2015) 11 pages.
Wang, S., Peng, J., Ma, J. & Xu, J. Protein secondary structure prediction using deep convolutional neural fields. Sci. Rep. 6, 18962-18962 (2016).
Harpak, A., Bhaskar, A., & Pritchard, J. K. Mutation rate variation is a primary determinant of the distribution of allele frequencies in humans. PLoS Genet. Dec. 15, 2016, 22pgs.
Payandeh, J., Scheuer, T., Zheng, N. & Catterall, W. A. The crystal structure of a voltage-gated sodium channel. Nature 475, 353-358 (2011).
Shen, H. et al. Structure of a eukaryotic voltage-gated sodium channel at near-atomic resolution. Science 355, eaal4326 (2017), 19 pages.
Nakamura, K. et al. Clinical spectrum of SCN2A mutations expanding to Ohtahara syndrome. Neurology 81, 992-998 (2013).
Ioannidis, Nilah M., et al., "REVEL—An Ensemble Method for Predicting the Pathogenicity of Rare Missense Variants", Oct. 5, 2016, 9 pages.
Quang Daniel, et. al., "DANN—a deep learning approach for annotating the pathogenicity of genetic variants", Oct. 22, 2014, 3 pages.
Sundaram, et. al., "Predicting the clinical impact of human mutation with deep neural networks", Aug. 2018, 15pgs.
Xiong, et al., "The human splicing code reveals new insights into the genetic determinants of disease", Jan. 9, 2015, 20pgs.
Yue, et. al., "Deep Learning for Genomics—A Concise Overview from internet", May 8, 2018, 40pgs.
Yuen, et. al., "Genome wide characteristics of de novo mutations in autism", Jun. 1, 2016, 10pgs.
Libbrecht, et. al., "Machine learning in genetics and genomics", Jan. 2, 2017, 30pgs.
Min, et. al., "Deep Learning in Bioinformatics", Jul. 25, 2016, 19 pgs.
Torng, Wen, et al., "3D deep convolutional neural networks for amino acid environment similarity analysis", 2017, 23pages.
Chen, Kathleen M., et al., "Selene—a PyTorch based deep learning library for sequence level data", Oct. 10, 2018, 15pages.
Grob, C., et al., "Predicting variant deleteriousness in non human species Applying the CADD approach in mouse", 2018, 11 pages.
Li, et al., "FoldingZero—Protein Folding from Scratch in Hydrophobic Polar Model", Dec. 3, 2018, 10 pages.
Rentzsch, et. al., "CADD—predicting the deleteriousness of variants throughout the human genome", Oct. 11, 2018, 9 pages.
Zou, etal, "A primer on deep learning in genomics", Nov. 26, 2018, 7pages.
Alberts, Bruce, et al., "Molecular biology of the cell", Sixth Edition, 2015, 3 pages.
Wei etal_The Role of Balanced Training and Testing Data Sets for Binary Classifiers in Bioinformatics dated Jul. 9, 2013 12 pages.
Duggirala, Ravindranath, et.al., "Genome Mapping and Genomics in Human and Non Human Primate", 2015, 306pgs.
Brookes, Anthony J., "The essence of SNPs", 1999, pp. 177-186.
UniProtKB P04217 A1BG Human [retrieved on Mar. 13, 2019 from (www.uniprot.org/uniprot/P04217), 12pages.
Bahar, Protein Actions Principles and Modeling, Chapter 7, 2017 pp. 165-166.
Dunbrack, Roland L., Re Question about your Paper titled "The Role of Balanced Training and Testing Data Sets for Binary Classifiers in Bioinformatics", Message to Sikander Mohammed Khan, Feb. 3, 2019, E-mailm, 3pgs.
DbSNP rs2241788 [Retrieved on Mar. 13, 2019], Retrieved from the Internet<www.ncbi.nlm.nih.gov/snp/rs2241788>, 5 pages.
Wei, et al., "Prediction of phenotypes of missense mutations in human proteins from biological assemblies", Feb. 2013, 28 pages.
Zhang, Jun, and Bin Liu. "PSFM-DBT—identifying DNA-binding proteins by combing position specific frequency matrix and distance-bigram transformation." International journal of molecular sciences 18.9 (2017) 1856.
Gao, Tingting, et al. "Identifying translation initiation sites in prokaryotes using support vector machine." Journal of theoretical biology 262.4 (2010) 644-649. (Year 2010).
Bi, Yingtao, et al. "Tree-based position weight matrix approach to model transcription factor binding site profiles." PloS one6.9 (2011) e24210.
Korhonen, Janne H., et al. "Fast motif matching revisited—high-order PWMs, SNPs and indels." Bioinformatics 33.4 (2016) 514-521.
Wong, Sebastien C., et al. "Understanding data augmentation for classification—when to warp ?. " 2016 international conference on digital image computing—techniques and applications (DICTA). IEEE, 2016.
Chang, Chia-Yun, et al. "Oversampling to overcome overfitting—exploring the relationship between data set composition, molecular descriptors, and predictive modeling methods." Journal of chemical information and modeling 53.4 (2013) 958-971.
Li, Gangmin, and Bei Yao. "Classification of Genetic Mutations for Cancer Treatment with Machine Learning Approaches." International Journal of Design, Analysis and Tools for Integrated Circuits and Systems 7.1 (2018) pp. 63-67.
Martin-Navarro, Antonio, et al. "Machine learning classifier for identification of damaging missense mutations exclusive to human mitochondrial DNA-encoded polypeptides." BMC bioinformatics 18.1 (2017) p. 158.
Krizhevsky, Alex, et al, ImageNet Classification with Deep Convolutional Neural Networks, 2012, 9 Pages.

(56) References Cited

OTHER PUBLICATIONS

U.S. Appl. No. 16/825,987, filed Mar. 20, 2020, U.S. Pat. No. 11,347,965, May 31, 2022, Issued.
U.S. Appl. No. 16/825,991, filed Mar. 20, 2020, U.S. Pat. No. 11,210,554, Dec. 28, 2021, Issued.
U.S. Appl. No. 16/826,126, filed Mar. 20, 2020, US-2020-032297-A1, Sep. 24, 2020, Pending.
U.S. Appl. No. 16/826,134, filed Mar. 20, 2020,US-2020-0327377-A1, Oct. 15, 2020, Pending.
U.S. Appl. No. 16/826,168, filed Mar. 21, 2020, US-2020-0302224-A1, Sep. 24, 2020, Allowed.
U.S. Appl. No. 17/529,222, filed Nov. 17, 2021, US-2022-0147760-A1, May 12, 2022, Pending.
U.S. Appl. No. 17/827,612, filed May 27, 2022, Pending.
U.S. Appl. No. 16/874,633, filed May 14, 2020, US-2020-0364565-A1, Nov. 19, 2020, Allowed.
U.S. Appl. No. 17/703,975, filed Mar. 24, 2022, Pending.
U.S. Appl. No. 17/175,546, filed Feb. 12, 2021, US-2021-0265009-A1, Aug. 26, 2021, Pending.
U.S. Appl. No. 17/180,542, filed Feb. 19, 2021, US-2021-0265017-A1, Aug. 26, 2021, Pending.
U.S. Appl. No. 17/176,151, filed Feb. 15, 2021, US-2021-0265018-A1, Aug. 26, 2021, Pending.
U.S. Appl. No. 17/411,980, filed Aug. 25, 2021, US-2022-0067489-A1, Mar. 3, 2022, Pending.
U.S. Appl. No. 17/687,551, filed Mar. 4, 2022, Pending.
U.S. Appl. No. 17/176,147, filed Feb. 15, 2021, US-2021-0265015-A1, Aug. 26, 2021, Pending.
U.S. Appl. No. 17/179,395, filed Feb. 18, 2021, US-2021-0265016-A1, Aug. 26, 2021, Pending.
U.S. Appl. No. 17/180,480, filed Feb. 19, 2021, US-2021-0264266-A1, Aug. 26, 2021, Pending.
U.S. Appl. No. 17/180,513, filed Feb. 19, 2021, US-2021-0264267-A1, Aug. 26, 2021, Pending.
U.S. Appl. No. 17/687,586, filed Mar. 4, 2022, Pending.
U.S. Appl. No. 17/232,056, filed Apr. 15, 2021, Pending.
U.S. Appl. No. 17/468,411, filed Sep. 7, 2021, Pending.
U.S. Appl. No. 17/830,287, filed Jun. 1, 2022, Pending.
U.S. Appl. No. 17/830,316, filed Jun. 1, 2022, Pending.
U.S. Appl. No. 17/839,331, filed Jun. 13, 2022, Pending.
U.S. Appl. No. 17/703,935, filed Mar. 24, 2022, Pending.
U.S. Appl. No. 17/703,958, filed Mar. 24, 2022, Pending.
PCT/US2020/024090, Mar. 21, 2020, WO 2020/191389, Sep. 24, 2020, Nationalized.
PCT/US2020/024087, Mar. 21, 2020, WO 2020/205296, Oct. 8, 2020, Nationalized.
PCT/US2020/024088, Mar. 21, 2020, WO 2020/191387, Sep. 24, 2020, Nationalized.
PCT/US2020/024091, Mar. 21, 2020, WO 2020/191390, Sep. 24, 2020, Nationalized.
PCT/US2020/024092, Mar. 22, 2020, WO 2020/191391, Sep. 24, 2020, Nationalized.
PCT/US2020/033280, May 15, 2020, WO 2020/232409, Nov. 19, 2020, Nationalized.
PCT/US2020/033281, May 15, 2020, WO 2020/232410, Nov. 19, 2020, Nationalized.
O'Roak, B. J. et al. Sporadic autism exomes reveal a highly interconnected protein network of de novo mutations. Nature 485, 246-250 (2012).
Rauch, A. et al. Range of genetic mutations associated with severe non-syndromic sporadic intellectual disability—an exome sequencing study. Lancet 380, 1674-1682 (2012).
Epi, K. C. et al. De novo mutations in epileptic encephalopathies. Nature 501, 217-221 (2013).
EuroEPINOMICS-RES Consortium, Epilepsy Phenome/Genome Project, Epi4K Consortium. De novo mutations in synaptic transmission genes including DNM1 cause epileptic encephalopathies. Am. J. Hum. Genet. 95, 360-370 (2014).
Gilissen, C. et al. Genome sequencing identifies major causes of severe intellectual disability. Nature 511, 344-347 (2014).
Lelieveld, S. H. et al. Meta-analysis of 2, 104 trios provides support for 10 new genes for intellectual disability. Nat. Neurosci. 19, 1194-1196 (2016).
Famiglietti, M. L. et al. Genetic variations and diseases in UniProtKB Swiss-Prot—the ins and outs of expert manual curation. Human. Mutat. 35, 927-935 (2014).
Horaitis, O., Talbot, C. C.Jr., Phommarinh, M., Phillips, K. M., & Cotton, R. G. A database of locus-specific databases. Nat. Genet. 39, 425 (2007).
Stenson, P. D. et al. The Human Gene Mutation Database—building a comprehensive mutation repository for clinical and molecular genetics, diagnostic testing and personalized genomic medicine. Hum. Genet. 133, 1-9 (2014).
Alipanahi, et. al., "Predicting the Sequence Specificities of DNA and RNA Binding Proteins by Deep Learning", Aug. 2015, 9pgs.
Angermueller, et. al., "Accurate Prediction of Single Cell DNA Methylation States Using Deep Learning", Apr. 11, 2017, 13pgs.
Ching, et. al., "Opportunities and Obstacles for Deep Learning in Biology and Medicine", Jan. 19, 2018, 123pgs.
Ching, et. al., "Opportunities and Obstacles for Deep Learning in Biology and Medicine", May 26, 2017, 47pgs.
Gu et. al., Recent Advances in Convolutional Neural Networks, dated Jan. 5, 2017, 37 pages.
Leung, et. al., "Deep learning of the tissue regulated splicing code", 2014, 9pgs.
Leung, et. al., "Inference of the Human Polyadenylation Code", Apr. 27, 2017, 13pgs.
Leung, et. al., "Machine Learning in Genomic Medicine", Jan. 1, 2016, 22pgs.
Park, et. al., "Deep Learning for Regulatory Genomics", Aug. 2015, 2pgs.
MacArthur, D. G. et al. Guidelines for investigating causality of sequence variants in human disease. Nature 508, 469-476 (2014).
Rehm, H. L. et al. ClinGen—the Clinical Genome Resource. N. Engl. J. Med. 372, 2235-2242 (2015).
Bamshad, M. J. et al. Exome sequencing as a tool for Mendelian disease gene discovery. Nat. Rev. Genet. 12, 745-755 (2011).
Rehm, H. L. Evolving health care through personal genomics. Nat. Rev. Genet. 18, 259-267 (2017).
Richards, S. et al. Standards and guidelines for the interpretation of sequence variants—a joint consensus recommendation of the American College of Medical Genetics and Genomics and the Association for Molecular Pathology. Genet. Med. 17, 405-424 (2015).
Lek, M. et al. Analysis of protein-coding genetic variation in 60,706 humans. Nature 536, 285-291 (2016).
Mallick, S. et al. The Simons Genome Diversity Project—300 genomes from 142 diverse populations. Nature 538, 201-206 (2016).
Genomes Project Consortium. et al. A global reference for human genetic variation. Nature 526, 68-74 (2015).
Liu, X., Jian, X. & Boerwinkle, E. dbNSFP—a lightweight database of human nonsynonymous SNPs and their functional predictions. Human. Mutat. 32, 894-899 (2011).
Chimpanzee Sequencing Analysis Consortium. Initial sequence of the chimpanzee genome and comparison with the human genome. Nature 437, 69-87 (2005).
Takahata, N. Allelic genealogy and human evolution. Mol. Biol. Evol. 10, 2-22 (1993).
Asthana, S., Schmidt, S., & Sunyaev, S. A limited role for balancing selection. Trends Genet. 21, 30-32 (2005).
Effler, E. M. et al. Multiple instances of ancient balancing selection shared between humans and chimpanzees. Science 339, 12 pages (2013).
Samocha, K. E. et al. A framework for the interpretation of de novo mutation in human disease. Nat. Genet. 46, 944-950 (2014).
Ohta, T. Slightly deleterious mutant substitutions in evolution. Nature 246, 96-98 (1973).
Reich, D. E. & Lander, E. S. On the allelic spectrum of human disease. Trends Genet. 17, 502-510 (2001).
Whiffin, N. et al. Using high-resolution variant frequencies to empower clinical genome interpretation. Genet. Med. 19, 1151-1158(2017).
Prado-Martinez, J. et al. Great ape genome diversity and population history. Nature 499, 471-475 (2013).

(56) References Cited

OTHER PUBLICATIONS

Klein, J., Satta, Y., O'HUigin, C., & Takahata, N. The molecular descent of the major histocompatibility complex. Annu. Rev. Immunol. 11, 269-295 (1993).
De Manuel, M. et al. Chimpanzee genomic diversity reveals ancient admixture with bonobos. Science 354, 477-481 (2016).
Locke, D. P. et al. Comparative and demographic analysis of orang-utan genomes. Nature 469, 529-533 (2011).
Rhesus Macaque Genome Sequencing Analysis Consortium. Evolutionary and biomedical insights from the rhesus macaque genome. Science 316, 222-234 (2007).
Worley, K. C. et al. The common marmoset genome provides insight into primate biology and evolution. Nat. Genet. 46, 850-857 (2014).
Sherry, S. T. et al. dbSNP—the NCBI database of genetic variation. Nucleic Acids Res. 29, 308-211 (2001).
Schrago, C. G., & Russo, C. A. Timing the origin of New World monkeys. Mol. Biol. Evol. 20, 1620-1625 (2003).
Landrum, M. J. et al. ClinVar—public archive of interpretations of clinically relevant variants. Nucleic Acids Res. 44, D862-868 (2016).
Brandon, E. P., Idzerda, R. L. & McKnight, G. S. Targeting the mouse genome—a compendium of knockouts (Part II). Curr. Biol. 5, 758-765 (1995).
Lieschke, J. G. & Currie, P. D. Animal models of human disease—zebrafish swim into view. Nat. Rev. Genet. 8, 353-367 (2007).
Sittig, L. J. et al. Genetic background limits generalizability of genotype-phenotype relationships. Neuron 91, 1253-1259 (2016).
Bazykin, G. A. et al. Extensive parallelism in protein evolution. Biol. Direct 2, 20, 13 pages (2007).
Ng, P. C., & Henikoff, S. Predicting deleterious amino acid substitutions. Genome Res. 11, 863-874 (2001).
Adzhubei, I. A. et al. A method and server for predicting damaging missense mutations. Nat. Methods 7, 248-249 (2010).
Geeks for Geeks, "Underfitting and Overfilling in Machine Learning", [retrieved on Aug. 26, 2019]. Retrieved from the Internet <www.geeksforgeeks.org/underfitting-and-overfitting-in-machine-learning/>, 2 pages.
Despois, Julien, "Memorizing is not learning !—6 tricks to prevent overfitting in machine learning", Mar. 20, 2018, 17 pages.
Bhande, Anup What is underfitting and overfitting in machine learning and how to deal with it, Mar. 11, 2018, 10pages.
Carter et al., "Cancer-specific high-throughput annotation of somatic mutations—computational prediction of driver missense mutations," Cancer research 69, No. 16 (2009) pp. 6660-6667.
Min, et al., "Deep Learning in Bioinformatics", Jun. 19, 2016, 46pgs.
Jiminez et al., DeepSite—protein binding site predictor using 3D CNNs, dated Oct. 1, 2017, 7 pages.
Pu et al., "DeepDrug3D: Classification of ligand-binding pockets in proteins with a convolutional neural network", dated Feb. 4, 2019, 23 pages.
Adam, "Deep learning, 3D technology to improve structure modeling for protein interactions, create better drugs", dated Jan. 9, 2020, 4 pages.
Varela, "Ligvoxel: A Deep Learning Pharmacore-Field Predictor", dated Mar. 19, 2019, 5 pages.
Li et al., "Predicting changes in protein thermostability upon mutation with deep 3D convolutional neural networks", dated Feb. 28, 2020, 21 pages.
Raschka et al., "Machine Learning and AI-based approaches for bioactive ligand discovery and GPCR-ligand recognition", dated Jun. 6, 2020, 33 pages.
Morrone et. al., "Combining docking pose rank and structure with deep learning improves protein-ligand binding mode prediction", dated Oct. 7, 2019, 13 pages.
Li, "Machine Learning Methods for Medical and Biological Image Computing", dated Summer 2016, 113 pages.
Rivera et. al., "A Deep Learning Approach to Protein Structure Prediction", dated Apr. 24, 2019, 22 pages.
Aritake et. al., "Single-molecule localization by voxel-wise regression using convolutional neural network", dated Nov. 3, 2020, 11 pages.
Townshend et. al., "End-to-End Learning on 3D Protein Structure for Interface Prediction", dated 2019, 10 pages.
Amidi et. al., "EnzyNet: enzyme classification using 3D convolutional neural networks on spatial representation", dated Jul. 25, 2017, 18 pages.
Luna, "Machine Learning in structural biology and chemoinformatics", dated 2019, 106 pages.
Anonymous, "Transferrable end-to-end learning for protein interface prediction", dated 2019, 12 pages.
Dias et. al., "Artificial intelligence in clinical and genomic diagnostics", dated 2019, 12 pages.
Luna et. al., "A Deep-Learning Approach toward Rational Molecular Docking Protocol Selection", dated May 27, 2020, 12 pages.
Li et. al., "DeepAtom: A Framework for Protein-Ligand Binding Affinity Prediction", dated 2019, 8 pages.
Zhang et. al., "Template-based prediction of protein structure with deep learning", dated Jun. 2, 2020, 16 pages.
Wallach et. al., AtomNet: A Deep Convolutional Neural Network for Bioactivity Prediction in Structure-based Drug Discovery, dated Oct. 10, 2015, 11 pages.
Illumina, Two-Channel SBS Sequencing Technology, 2016, 2 pages.
Illumina, Low-diversity sequencing on the Illumina HiSeq Platform, 2014, 2 pages.
Hedegaard, An introduction to "Next Generation" DNA Sequencing, dated 26 Novemeber 2017, 63 pages.
Jordan , An overview of semantic image segmentation, dated May 21, 2018, 28 pages retrieved on Jul. 21, 2021. Retrieved from the internet [URL: https://www.jeremyjordan.me/semantic-segmentation/ ].
Lanchantin, Deep Motif Dashboard: Visualizing and Understanding Genomic Sequences Using Deep Neural Networks, Oct. 18, 2016, 11 pages.
Thalles Silva, Deeplab Image Semantic Segmentation Network, dated Jan. 29, 2018, 19 pages, retrieved on Jul. 21, 2021. Retrieved from [URL: https://sthalles.github.io/deep_segmentation_network/].
James Le, How to do Semantic Segmentation using Deep Learning, dated May 3, 2018, 17 pages, retrieved on Jul. 21, 2021. Retrieved from [URL: https://medium.com/nanonets/how-to-do-image-segmentation-using-deep-learning-c673cc5862ef].
Townley, Illumina Primary and Secondary Analysis, Illumina UK, 2010, 33 pages.
Silver, Literature Review: Fully Convolutional Networks, dated Jun. 12, 2017, 5 pages, retrieved on Jul. 21, 2021. Retrieved from [URL: https://medium.com/self-driving-cars/literature-review-fully-convolutional-networks-d0a11fe0a7aa ].
Bowen, Nanotechnology for a Genomic Revolution, Illumina, dated Dec. 14, 2016, 40 pages.
Han, Deconvolutions in Convolutional Neural Networks, Postech Computer Vision Lab, 2015, 20 pages.
Illumina, Illumina's Genotyping Data Normalization Methods, 2006, 6 pages.
Illumina, Quality Scores for Next-Generation Sequencing—Assessing sequencing accuracy using Phred quality scoring, 2011, 2 pages.
Restrepo, A Gentle Introduction to Semantic Segmentation—Inputs, Labels and Outputs, 2 pages, retrieved on Jul. 21, 2021. Retrieved from [URL: http://ronny.rest/tutorials/module/seg_01/segmentation_03_inputs_outputs/].
Illumina, An Introduction to Next-Generation Sequencing Technology, 2017, 16 pages.
Belanovic, Library of Parameterized Hardware Modules for Floating-Point Arithmetic with an Example Application, Northeastern University, Boston, MA, May 2002, 83 pages.
Massingham, Base Calling: methods, problems and alternatives, EMBL Advanced Course in Analysis of Short Read Sequencing Data, Jun. 8, 2009-Jun. 10, 2009, 84 pages.
Thoma, A Survey of Semantic Segmentation, dated May 11, 2016, 16 pages.

(56) References Cited

OTHER PUBLICATIONS

Rodriguez-Ezpeleta, Bioinformatics for High Throughput Sequencing, Springer, 2012, 266 pages.
Illumina, Optimizing Cluster Density on Illumina Sequencing Systems, 2016, 12 pages.
Boza et al., DeepNano: Deep recurrent neural networks for base calling in MinION nanopore reads, PLOS One, dated Jun. 5, 2017, 13 pages.
Kircher, Understanding and Improving high-throughput sequencing data production and analysis, Leipzig University, 2011, 216 pages.
Lutteropp, Error-Profile-Aware Correction of Next Generation Sequencing Reads, Karlsruhe Institute of Technology, dated Mar. 31, 2017, 96 pages.
Illumina, HCS 1.4/RTA 1.12 Theory of Operation, 2010, 32 pages.
Cacho, Base-Calling of High-throughput Sequencing Data Using a Random Effects Mixture Model, UC Riverside, Dec. 2016, 102 pages.
Zhou et. al., Incorporating Side-Channel Information into Convolutional Neural Networks for Robotic Tasks, 2017, 7 pages.
Ramesh, Nisha, et al., "Cell Segmentation Using a Similarity Interface With a Multi-Task Convolutional Neural Network"; IEEE Journal of Biomedical and Health Informatics, vol. 23, No. 4, Jul. 2019, 12 pages.
Arpali et al., High-throughput screening of large vols. of whole blood using structured illumination and fluoresecent on-chip imaging, Lab on a Chip, United Kingdom, Royal Society of Chemistry, Sep. 12, 2012, vol. 12, pp. 4968-4971.
Liu et. al., 3D Stacked Many Core Architecture for Biological Sequence Analysis Problems, 2017, Int J Parallel Prog, 45:1420-1460.
Wu et. al., FPGA-Based DNA Basecalling Hardware Acceleration, in Proc. IEEE 61st Int. Midwest Symp. Circuits Syst., Aug. 2018, pp. 1098-1101.
Wu et. al., FPGA-Accelerated 3rd Generation DNA Sequencing, in IEEE Transactions on Biomedical Circuits and Systems, vol. 14, Issue 1, Feb. 2020, pp. 65-74.
Prabhakar et. al., Plasticine: A Reconfigurable Architecture for Parallel Patterns, ISCA '17, Jun. 24-28, 2017, Toronto, ON, Canada.
Lin et. al., Network in Network, in Proc. of ICLR, 2014.
Sifre, Rigid-motion Scattering for Image Classification, Ph.D. thesis, 2014.
Sifre et. al., Rotation, Scaling and Deformation Invariant Scattering for Texture Discrimination, in Proc. of CVPR, 2013.
Chollet, Xception: Deep Learning with Depthwise Separable Convolutions, in Proc. of CVPR, 2017. 8 pages.
Zhang et. al., ShuffleNet: An Extremely Efficient Convolutional Neural Network for Mobile Devices, 2017.
He et. al., Deep Residual Learning for Image Recognition, in Proc. of CVPR, 2016.
Xie et. al., Aggregated Residual Transformations for Deep Neural Networks, in Proc. of CVPR, 2017.
Howard et. al., Mobilenets: Efficient Convolutional Neural Networks for Mobile Vision Applications, 2017.
Sandler et. al., MobileNetV2: Inverted Residuals and Linear Bottlenecks, 2018.
Qin et. al., FD-MobileNet: Improved MobileNet with a Fast Downsampling Strategy, 2018.
Chen et. al., Rethinking atrous convolution for semantic image segmentation, 2017.
Huang et. al., Speed/accuracy trade-offs for modern convolutional detectors, 2016.
Oord et al., Wavenet: A Generative Model for Raw Audio, dated Sep. 19, 2016, 15 pages.
Arik et al., Deep Voice: Real-time Neural Text-to-Speech, dated 2017, 17 pages.
Yu et al., Multi-Scale Context Aggregation by Dilated Convolutions, ICLR 2016, dated Apr. 30, 2016, 13 pages.
He et. al., Deep Residual Learning for Image Recognition, 2015.
Srivastava et al., Highway Networks, dated 2015, 6 pages.
Huang et al., Densely Connected Convolutional Networks, dated Aug. 17, 2017, 9 pages.
Szegedy et. al., Going Deeper with Convolutions, dated 2014, 12 pages.
Ioffe et al., Batch Normalization Accelerating Deep Network Training by Reducing Internal Covariate Shift, dated 2015, 11 pages.
Wolterink et al., Dilated Convolutional Neural Networks for Cardiovascular MR Segmentation in Congenital Heart Disease, dated 2017, 9 pages.
Piqueras, Autoregressive Model Based on a Deep Convolutional Neural Network for Audio Generation, Tampere University of Technology, dated 2016, 58 pages.
Wu, Introduction to Convolutional Neural Networks, Nanjing University, dated 2017, 31 pages.
scikit-image/peak.py at master, Github, retrieved on Jun. 8, 2021, 10 pages, Retrieved from the internet <URL: https://github.com/scikit-image/scikit-image/blob/main/skimage/feature/peak.py>.
3.3.9.11.Watershed and random walker for segmentation, Scipy lecture notes, 2 pages. [retrieved on Jun. 8, 2021] Retrieved from the internet <URL: http:scipy-lectures.org/packages/scikit-image/auto_examples/plot_segmentations.html>.
Mordvintsev et. al., Image Segmentation with Watershed Algorithm, Revision 43532856, 2013, 6 pages. [retrieved on Jun. 8, 2021] Retrieved from the Internet <URL: https://opencv-python-tutroals.readthedocs.io/en/latest/py_tutorials/by_imgproc/py_watershed/py_watershed.html>.
Mzur, Watershed.py, Github, 3 pages. [retrieved on Jun. 8, 2021] Retrieved from the internet <URL: https://github.com/ mzur/watershed/blob/master/Watershed.py>.
Thakur et. al., A Survey of Image Segmentation Techniques, International Journal of Research in Computer Applications and Robotics, vol. 2, Issue 4, Apr. 2014, p. 158-165.
Long et. al., Fully Convolutional Networks for Semantic Segmentation, IEEE Transactions on Pattern Analysis and Machine Intelligence, vol. 39, Issue 4, Apr. 1, 2017, 12 pages.
Ronneberger et. al., U-net: Convolutional networks for biomedical image segmentation, in International Conference on Medical Image computing and computer assisted intervention, May 18, 2015, 8 pages.
Xie et. al., Microscopy cell counting and detection with fully convolutional regression networks, Computer methods in biomechanics and biomedical engineering, Imaging and Visualization, 6(3), pp. 283-292, 2018.
Xie, Y., et. al., Beyond classification: structured regression for robust cell detection using convolutional neural network. International conference on medical image computing and computer assisted intervention, Oct. 2015, 12 pages.
Snuverink, Deep Learning for Pixelwise Classification of Hyperspectral Images, Master of Science Thesis, Delft University of Technology, Nov. 23, 2017, 128 pages.
Shevchenko, Keras weighted categorical_crossentropy, Github, [retrieved on Jun. 12, 2021], Retrieved from the internet <URL: https://gist.github.com/skeeet/cad06d584548fb45eece1d4e28cfa98b >, 2 pages.
Assem, Predicting periodic and chaotic signals using Wavenets, Master of Science thesis, Delft University of Technology, Aug. 18, 2017, pp. 3-38.
Goodfellow et al., Chapter 9—Convolutional Networks, Deep Learning, MIT Press, dated 2016, 41 pages.
Illumina, "Indexed Sequencing Overview Guide", Document No. 15057455, v. 5, Mar. 2019.
Albrecht et. al., Deep learning for single-molecule science, Nanotechnology (28), dated 2017, 423001, 11 pages.
MiSEQ: Imaging and Base Calling: Illumina, Inc. Online Training Course, dated Jan. 1, 2013 [retrieved on Jul. 13, 2020] , Retrieved from <URL: https://support.illumina.com/training.html >, 13 pages.
MiSEQ: Imaging and Base Calling Script, retrieved on [Jun. 14, 2021], Retrieved from the internet <URL: https://support.illumina.com/content/dam/illumina-support/courses/MiSeq_Imaging_and_Base_Calling/story_content/external_files/MiSeq%20Imaging%20and%20Base%20Calling%20Script.pdf >.
Zhao et. al., Object detection with Deep Learning: A Review, dated Jul. 15, 2018, 22 pages.

(56) References Cited

OTHER PUBLICATIONS

Lee et. al., Fast Object Localization Using a CNN Feature Map Based Multi-Scale Search, dated Apr. 12, 2016, 16 pages.
Misiunas et. al., QuipuNet: convolutional neural network for single-molecule nanopore sensing, dated May 30, 2018, 7 pages.
Boza et. al., Deep Recurrent Neural Networks for Base Calling in MinION Nanopore Reads, dated Mar. 30, 2016, 12 pages.
U.S. Appl. No. 16/825,991, filed Mar. 20, 2020, U.S. Pat. No. 11,210,554, Dec. 28, 221, Issued.
U.S. Appl. No. 16/826,126, filed Mar. 20, 2020, US-2020-0302297-A1, Sep. 24, 2020, Pending.
U.S. Appl. No. 16/874,633, filed May 14, 2020, US-2020-0364565-A1, Nov. 19, 2020, Pending.
U.S. Appl. No. 17/179,395, filed Feb. 18, 2021, US-2021-0264266-A1, Aug. 26, 2021, Pending.
U.S. Appl. No. 17/687,586, filed 4, 2022, Pending.
PCT/US2020/024909, Mar. 21, 2020, WO 2020/191389, Sep. 24, 2020, Nationalized.
Zhang Buanzhi et al., "Stable oligonucleotides Synthesis of silver nanocluster fluorescent probes High selection of synthetic and sulfhydryl-containing drugs" Selective Analytical Assay—Science China Chemistry, vol. 41, No. 6, (2011) 1031-1036.
Sifre et al., Rigid-motion Scattering for Texture Classification, Ph.D. thesis submitted for publishing.
Fu Weiling, Yang Qian, Zhang Xue, "Focus on the application of bioinformatics in laboratory medicine", Chongqing Medicine, vol. 33, Issue 8, Aug. 2004.
Eraslan et. al., "Deep Learning: New computational modelling techniques for genomics", dated Jul. 2019, 15 pages.
Semantic Segmentation Examples—MATLAB and Simulink, 22 pages, [retrieved on Jul. 21, 2021], Retrieved from the Internet [URL: https://www.mathworks.com/help/vision/ug/semantic-segmentation-examples.html ].
Bentley et. al., Accurate Whole Human Genome Sequencing using Reversible Terminator Chemistry, Supplemental Information, Nature, dated Nov. 6, 2008, 55 pages, [retrieved on Jul. 21, 2021], retrieved from the internet [URL: https://media.nature.com/original/nature-assets/nature/journal/v456/n7218/extref/nature07517-s1.pdf ].
Grange, NGS: the basics, Institut Jacques Monod, dated Jun. 26, 2000, 59 pages.
Massingham et. al., All Your Base: a fast and accurate probabilistic approach to base calling, European Bioinformatics Institute, 22 pages, [retrieved on Jul. 22, 2021], Retrieved from the internet [URL: https://www.ebi.ac.uk/goldman-srv/AYB/references/ayb.pdf].
Krishnakumar et. al., Systematic and stochastic influences on the performance of the MinION nanopore sequencer across a range of nucleotide bias, Scientific Reports, published Feb. 16, 2018, 13 pages.
Tegfalk, Application of Machine Learning techniques to perform base-calling in next-generation DNA sequencing, KTH Royal Institue of Technology, dated 2020, 53 pages.
Kircher—etal_Improved-base-calling-for-the-Illumina-Genome-Analyzer-using-machine-learning-strategies_Aug. 14, 2009_10pages.
Kircher et al, Improved base-calling for the IIllumina Genome Analyzer using Machine Learning Strategies, Genome Biology 2009, I O:R83, Aug. 14, 2009, 10 pages.
Albrecht etal, "Deep Learning for single-molecule science", Nanotechnology 28, IOP Publishuigm Sep. 18, 2017 11 pages.
Adriana Romero et. al., FitNets: Hints for Thin Deep Nets, published Mar. 27, 2015, 13 pages.
Robinson et al., Computational Exome and Genome Analysis—Chapter 3 Illumina Technology, dated 2018, 25 pages.
Wang et. al., An adaptive decorrelation method removes Illumina DNA base-calling errors caused by crosstalk between adjacent clusters—with Supplemental Materials, Scientific Reports, published Feb. 20, 2017, 17 pages.
Pfeiffer et. al., Systematic evaluation of error rates and causes in short samples in next-generation sequencing, Scientific Reports, published Jul. 19, 2018, 14 pages.
Puckelwartz et al., Supercomputing for the parallelization of whole genome analysis, Bioinformatics, dated Feb. 12, 2014, pp. 1508-1513, 6 pages.
Kelly et al., Churchill: an ultra-fast, deterministic, highly scalable and balanced parallelization strategy for the discovery of human genetic variation in clinical and population-scale genomics, Genome Biology, Bio-Med Central Ltd, vol. 16, No. 1, dated Jan. 20, 2015, 14 pages.
Wang et al., Achieving Accurate and Fast Base-calling by a Block model of the Illumina Sequencing Data, Science Direct, vol. 48, No. 28, dated Jan. 1, 2015, pp. 1462-1465, 4 pages.
Gao et al., Deep Learning in Protein Structural Modeling and Design, Patterns—CelPress, dated Dec. 11, 2020, 23 pages.
Pejaver et al., Inferring the molecular and phenotypic impact of amino acid variants with MutPred2—with Supplementary Information, Nature Communications, dated 2020, 59 pages.
Pakhrin et al., Deep learning based advances in protein structure prediction, International Journal of Molecular sciences, published May 24, 2021, 30 pages.
Wang et al. Predicting the impacts of mutations on protein-ligand binding affinity based on molecular dynamics simulations and machine learning methods, Computational and Structural Biotechnology Journal 18, dated Feb. 20, 2022, pp. 439-454, 16 pages.
Iqbal et al., Comprehensive characterization of amino acid positions in protein structures reveals molecular effects of missense variants, and supplemental information, PNAS, vol. 117, No. 45, dated Nov. 10, 2020, 35 pages.
Forghani et al., Convolutional Neural Network Based Approach to In Silica Non-Anticipating Prediction of Antigenic Distance for Influenza Virus, Viruses, published Sep. 12, 2020, vol. 12, 20 pages.
Jing et al., Learning from protein structure with geometric vector perceptrons, Arxiv: 2009: 01411v2, dated Dec. 31, 2020, 18 pages.
Hacteria Wiki, HiSeq2000—Next Level Hacking—Hackteria Wiki, retrieved on Apr. 12, 2021, retrieved from the internet [URL: https://www.hackteria.org/wiki/HiSeq2000_-_Next_Level_Hacking ], 42 pages.
Pei et al., A Topological Measurement for Weighted Protein Interaction Network, IEEE Computational Systems Bioinformatics Conference dated 2005, 11 pages.
Assfalg et. al., "3DString, A Feature String Kernel for 3D Object Classification on Voxelized Data", dated Nov. 6, 2006, 10 pages.

* cited by examiner

| Graphical representation | Format name | Range of values that can be represented (in decimal number) | | Resolution (value of LSB) |
|---|---|---|---|---|
| | | Lower range | Upper range | |
| | S0.7 format | -1 | 0.9921875 | 0.0078125 |
| | S1.6 format | -2 | 1.984375 | 0.015625 |
| | S2.5 format | -4 | 3.96875 | 0.03125 |
| | S3.4 format | -8 | 7.9375 | 0.0625 |
| | S4.3 format | -16 | 15.875 | 0.125 |
| | S5.2 format | -32 | 31.75 | .025 |
| | S6.1 format | -64 | 63.5 | 0.5 |
| | S7.0 format | -128 | 127 | 1 |

Drawing legend used:
- Sign bit
- Integer bit(s)
- Radix point (e.g., Decimal separator between integer and fractional bits)
- Fractional bit(s)

FIG. 14

| Format name | Range of values that can be represented (in decimal number) | | Resolution (value of LSB) | Format to be selected for the following ranges of neural network parameters |
|---|---|---|---|---|
| | Lower range | Upper range | | |
| S0.7 format | -1 | 0.9921875 | 0.0078125 | -1 to 0.9921875 |
| S1.6 format | -2 | 1.984375 | 0.015625 | -2 to -1, and 0.9921875 to 1.984375 |
| S2.5 format | -4 | 3.96875 | 0.03125 | -4 to -2, and 1.984375 to 3.96875 |
| S3.4 format | -8 | 7.9375 | 0.0625 | -4 to -8, and 3.96875 to 7.9375 |
| S4.3 format | -16 | 15.875 | 0.125 | -8 to -16, and 7.9375 to 15.875 |
| S5.2 format | -32 | 31.75 | .025 | -16 to -32, and 15.875 to 31.75 |
| S6.1 format | -64 | 63.5 | 0.5 | -32 to -64, and 31.75 to 63.5 |
| S7.0 format | -128 | 127 | 1 | Less than -64, and greater than 63.5 |

FIG. 15A

| Graphical representation | Format name | Range of values that can be represented (in decimal number) | | Resolution (value of LSB) | Format to be selected for the following ranges of absolute values of the neural network parameters |
|---|---|---|---|---|---|
| | | Lower range | Upper range | | 1550 |
| | S0.7 format | -1 | 0.9921875 | 0.0078125 | 0 to 1 |
| | S1.6 format | -2 | 1.984375 | 0.015625 | 1 to 2 |
| | S2.5 format | -4 | 3.96875 | 0.03125 | 2 to 4 |
| | S3.4 format | -8 | 7.9375 | 0.0625 | 4 to 8 |
| | S4.3 format | -16 | 15.875 | 0.125 | 8 to 16 |
| | S5.2 format | -32 | 31.75 | .025 | 16 to 32 |
| | S6.1 format | -64 | 63.5 | 0.5 | 32 to 64 |
| | S7.0 format | -128 | 127 | 1 | Greater than 64 |

FIG. 15C

| Graphical representation | Format name | Range of values that can be represented (in decimal number) | | Resolution (value of LSB) | Format to be selected for the following ranges of absolute values of the neural network parameters |
| --- | --- | --- | --- | --- | --- |
| | | Lower range | Upper range | | |
| | S0.7 format | -1 | 0.9921875 | 0.0078125 | 0 to 0.9921875 |
| | S1.6 format | -2 | 1.984375 | 0.015625 | 0.9921875 to 1.984375 |
| | S2.5 format | -4 | 3.96875 | 0.03125 | 1.984375 to 3.96875 |
| | S3.4 format | -8 | 7.9375 | 0.0625 | 3.96875 to 7.9375 |
| | S4.3 format | -16 | 15.875 | 0.125 | 7.9375 to 15.875 |
| | S5.2 format | -32 | 31.75 | .025 | 15.875 to 31.75 |
| | S6.1 format | -64 | 63.5 | 0.5 | 31.75 to 63.5 |
| | S7.0 format | -128 | 127 | 1 | Greater than 63.5 |

NEURAL NETWORK PARAMETER QUANTIZATION FOR BASE CALLING

PRIORITY APPLICATIONS

This application claims the benefit of U.S. Provisional Patent Application No. 63/161,896, titled "Neural Network Parameter Quantization for Base Calling", filed Mar. 16, 2021. The priority provisional application is hereby incorporated by reference for all purposes.

This application claims the benefit of U.S. Provisional Patent Application No. 63/161,880, titled "Tile Location and/or Cycle Based Weight Set Selection for Base Calling", filed Mar. 16, 2021. The priority provisional application is hereby incorporated by reference for all purposes.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks. In particular, the technology disclosed relates to using deep neural networks such as deep convolutional neural networks for analyzing data.

INCORPORATIONS

The following are incorporated by reference as if fully set forth herein:

U.S. Nonprovisional patent application Ser. No. 17/687,551, titled "TILE LOCATION AND/OR CYCLE BASED WEIGHT SET SELECTION FOR BASE CALLING," filed 4 Mar. 2022 filed contemporaneously;

U.S. Provisional Patent Application No. 62/979,384, titled "ARTIFICIAL INTELLIGENCE-BASED BASE CALLING OF INDEX SEQUENCES," filed 20 Feb. 2020;

U.S. Provisional Patent Application No. 62/979,414, titled "ARTIFICIAL INTELLIGENCE-BASED MANY-TO-MANY BASE CALLING," filed 20 Feb. 2020;

U.S. Nonprovisional patent application Ser. No. 16/825,987, titled "TRAINING DATA GENERATION FOR ARTIFICIAL INTELLIGENCE-BASED SEQUENCING," filed 20 Mar. 2020;

U.S. Nonprovisional patent application Ser. No. 16/825,991, titled "ARTIFICIAL INTELLIGENCE-BASED GENERATION OF SEQUENCING METADATA," filed 20 Mar. 2020;

U.S. Nonprovisional patent application Ser. No. 16/826,126, titled "ARTIFICIAL INTELLIGENCE-BASED BASE CALLING," filed 20 Mar. 2020;

U.S. Nonprovisional patent application Ser. No. 16/826,134, titled "ARTIFICIAL INTELLIGENCE-BASED QUALITY SCORING," filed 20 Mar. 2020; and U.S. Nonprovisional patent application Ser. No. 16/826,168, titled "ARTIFICIAL INTELLIGENCE-BASED SEQUENCING," filed 21 Mar. 2020.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The rapid improvement in computation capability has made deep Convolution Neural Networks (CNNs) a great success in recent years on many computer vision tasks with significantly improved accuracy. During the inference phase, many applications demand low latency processing of one image with strict power consumption requirement, which reduces the efficiency of Graphics Processing Unit (GPU) and other general-purpose platform, bringing opportunities for specific acceleration hardware, e.g., Field Programmable Gate Array (FPGA), by customizing the digital circuit specific for the deep learning algorithm inference. However, deploying CNNs on portable and embedded systems is still challenging due to large data volume, intensive computation, varying algorithm structures, and frequent memory accesses.

As convolution contributes most operations in CNNs, the convolution acceleration scheme significantly affects the efficiency and performance of a hardware CNN accelerator. Convolution involves multiply and accumulate (MAC) operations with four levels of loops that slide along kernel and feature maps. The first loop level computes the MAC of pixels within a kernel window. The second loop level accumulates the sum of products of the MAC across different input feature maps. After finishing the first and second loop levels, a final output element in the output feature map is obtained by adding the bias. The third loop level slides the kernel window within an input feature map. The fourth loop level generates different output feature maps.

FPGAs have gained increasing interest and popularity in particular to accelerate inference tasks, due to their (1) high degree of reconfigurability, (2) faster development time compared to Application Specific Integrated Circuits (ASICs) to catch up with the rapid evolving of CNNs, (3) good performance, and (4) superior energy efficiency compared to GPUs. The high performance and efficiency of an FPGA can be realized by synthesizing a circuit that is customized for a specific computation to directly process billions of operations with the customized memory systems. For instance, hundreds to thousands of digital signal processing (DSP) blocks on modern FPGAs support the core convolution operation, e.g., multiplication and addition, with high parallelism. Dedicated data buffers between external on-chip memory and on-chip processing engines (PEs) can be designed to realize the preferred dataflow by configuring tens of Mbyte on-chip block random access memories (BRAM) on the FPGA chip.

Efficient dataflow and hardware architecture of CNN acceleration are desired to minimize data communication while maximizing resource utilization to achieve high performance. An opportunity arises to design methodology and framework to accelerate the inference process of various CNN algorithms on acceleration hardware with high performance, efficiency, and flexibility.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 14 illustrates a table depicting example 8-bit binary fixed-point formats, at least some of which can be used to represent parameters (e.g., weights and biases) of a neural network for base calling.

FIG. 15A illustrates a Look-Up Table (LUT) usable to select a quantization format for a corresponding neural network parameter.

FIG. 15C illustrates another LUT usable to select a quantization format for a corresponding absolute value of a neural network parameter.

FIG. 15D illustrates yet another LUT usable to select a quantization format for a corresponding absolute value of a neural network parameter.

DETAILED DESCRIPTION

Figure 1:
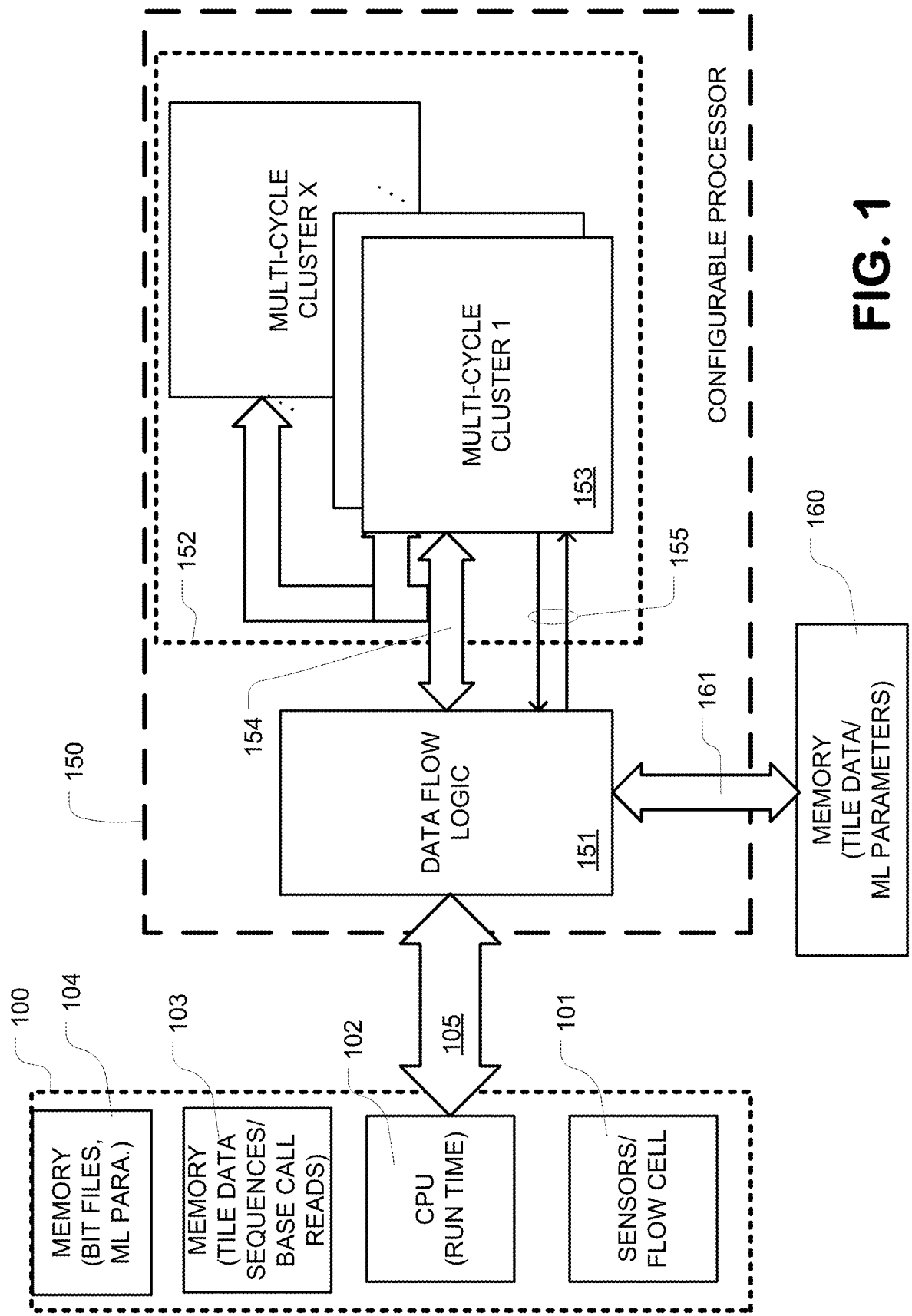
FIG. 1 is a simplified diagram of a base calling computation system that comprises a configurable processor.

Embodiments described herein may be used in various biological or chemical processes and systems for academic or commercial analysis. More specifically, embodiments described herein may be used in various processes and systems where it is desired to detect an event, property, quality, or characteristic that is indicative of a desired reaction. For example, embodiments described herein include cartridges, biosensors, and their components as well as bioassay systems that operate with cartridges and biosensors. In particular embodiments, the cartridges and biosensors include a flow cell and one or more sensors, pixels, light detectors, or photodiodes that are coupled together in a substantially unitary structure.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) Similarly, the programs may be standalone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" or "including" an element or a plurality of elements having a particular property may include additional elements whether or not they have that property.

As used herein, a "desired reaction" includes a change in at least one of a chemical, electrical, physical, or optical property (or quality) of an analyte-of-interest. In particular embodiments, the desired reaction is a positive binding event (e.g., incorporation of a fluorescently labeled biomolecule with the analyte-of-interest). More generally, the desired reaction may be a chemical transformation, chemical change, or chemical interaction. The desired reaction may also be a change in electrical properties. For example, the desired reaction may be a change in ion concentration within a solution. Exemplary reactions include, but are not limited to, chemical reactions such as reduction, oxidation, addition, elimination, rearrangement, esterification, amidation, etherification, cyclization, or substitution; binding interactions in which a first chemical binds to a second chemical; dissociation reactions in which two or more chemicals detach from each other; fluorescence; luminescence; bioluminescence; chemiluminescence; and biological reactions, such as nucleic acid replication, nucleic acid amplification, nucleic acid hybridization, nucleic acid ligation, phosphorylation, enzymatic catalysis, receptor binding, or ligand binding. The desired reaction can also be an addition or elimination of a proton, for example, detectable as a change in pH of a surrounding solution or environment. An additional desired reaction can be detecting the flow of ions across a membrane (e.g., natural or synthetic bilayer membrane), for example as ions flow through a membrane the current is disrupted and the disruption can be detected.

In particular embodiments, the desired reaction includes the incorporation of a fluorescently-labeled molecule to an analyte. The analyte may be an oligonucleotide and the fluorescently-labeled molecule may be a nucleotide. The desired reaction may be detected when an excitation light is directed toward the oligonucleotide having the labeled nucleotide, and the fluorophore emits a detectable fluorescent signal. In alternative embodiments, the detected fluorescence is a result of chemiluminescence or bioluminescence. A desired reaction may also increase fluorescence (or Forster) resonance energy transfer (FRET), for example, by bringing a donor fluorophore in proximity to an acceptor fluorophore, decrease FRET by separating donor and acceptor fluorophores, increase fluorescence by separating a quencher from a fluorophore or decrease fluorescence by co-locating a quencher and fluorophore.

As used herein, a "reaction component" or "reactant" includes any substance that may be used to obtain a desired reaction. For example, reaction components include reagents, enzymes, samples, other biomolecules, and buffer solutions. The reaction components are typically delivered to a reaction site in a solution and/or immobilized at a reaction site. The reaction components may interact directly or indirectly with another substance, such as the analyte-of-interest.

As used herein, the term "reaction site" is a localized region where a desired reaction may occur. A reaction site may include support surfaces of a substrate where a substance may be immobilized thereon. For example, a reaction site may include a substantially planar surface in a channel of a flow cell that has a colony of nucleic acids thereon. Typically, but not always, the nucleic acids in the colony have the same sequence, being for example, clonal copies of a single stranded or double stranded template. However, in some embodiments a reaction site may contain only a single nucleic acid molecule, for example, in a single stranded or double stranded form. Furthermore, a plurality of reaction sites may be unevenly distributed along the support surface or arranged in a predetermined manner (e.g., side-by-side in a matrix, such as in microarrays). A reaction site can also include a reaction chamber (or well) that at least partially defines a spatial region or volume configured to compartmentalize the desired reaction.

This application uses the terms "reaction chamber" and "well" interchangeably. As used herein, the term "reaction chamber" or "well" includes a spatial region that is in fluid communication with a flow channel. The reaction chamber may be at least partially separated from the surrounding environment or other spatial regions. For example, a plurality of reaction chambers may be separated from each other by shared walls. As a more specific example, the reaction chamber may include a cavity defined by interior surfaces of a well and have an opening or aperture so that the cavity may be in fluid communication with a flow channel Biosensors including such reaction chambers are described in greater detail in international application no. PCT/US2011/057111, filed on Oct. 20, 2011, which is incorporated herein by reference in its entirety.

In some embodiments, the reaction chambers are sized and shaped relative to solids (including semi-solids) so that the solids may be inserted, fully or partially, therein. For example, the reaction chamber may be sized and shaped to accommodate only one capture bead. The capture bead may have clonally amplified DNA or other substances thereon. Alternatively, the reaction chamber may be sized and shaped to receive an approximate number of beads or solid substrates. As another example, the reaction chambers may also be filled with a porous gel or substance that is configured to control diffusion or filter fluids that may flow into the reaction chamber.

In some embodiments, sensors (e.g., light detectors, photodiodes) are associated with corresponding pixel areas of a sample surface of a biosensor. As such, a pixel area is a geometrical construct that represents an area on the biosensor's sample surface for one sensor (or pixel). A sensor that is associated with a pixel area detects light emissions gathered from the associated pixel area when a desired reaction has occurred at a reaction site or a reaction chamber overlying the associated pixel area. In a flat surface embodiment, the pixel areas can overlap. In some cases, a plurality of sensors may be associated with a single reaction site or a single reaction chamber. In other cases, a single sensor may be associated with a group of reaction sites or a group of reaction chambers.

As used herein, a "biosensor" includes a structure having a plurality of reaction sites and/or reaction chambers (or wells). A biosensor may include a solid-state imaging device (e.g., CCD or CMOS imager) and, optionally, a flow cell mounted thereto. The flow cell may include at least one flow channel that is in fluid communication with the reaction sites and/or the reaction chambers. As one specific example, the biosensor is configured to fluidically and electrically couple to a bioassay system. The bioassay system may deliver reactants to the reaction sites and/or the reaction chambers according to a predetermined protocol (e.g., sequencing-by-synthesis) and perform a plurality of imaging events. For example, the bioassay system may direct solutions to flow along the reaction sites and/or the reaction chambers. At least one of the solutions may include four types of nucleotides having the same or different fluorescent labels. The nucleotides may bind to corresponding oligonucleotides located at the reaction sites and/or the reaction chambers. The bioassay system may then illuminate the reaction sites and/or the reaction chambers using an excitation light source (e.g., solid-state light sources, such as light-emitting diodes or LEDs). The excitation light may have a predetermined wavelength or wavelengths, including a range of wavelengths. The excited fluorescent labels provide emission signals that may be captured by the sensors.

In alternative embodiments, the biosensor may include electrodes or other types of sensors configured to detect other identifiable properties. For example, the sensors may be configured to detect a change in ion concentration. In another example, the sensors may be configured to detect the ion current flow across a membrane.

As used herein, a "cluster" is a colony of similar or identical molecules or nucleotide sequences or DNA strands. For example, a cluster can be an amplified oligonucleotide or any other group of a polynucleotide or polypeptide with a same or similar sequence. In other embodiments, a cluster can be any element or group of elements that occupy a physical area on a sample surface. In embodiments, clusters are immobilized to a reaction site and/or a reaction chamber during a base calling cycle.

As used herein, the term "immobilized," when used with respect to a biomolecule or biological or chemical substance, includes substantially attaching the biomolecule or biological or chemical substance at a molecular level to a surface. For example, a biomolecule or biological or chemical substance may be immobilized to a surface of the substrate material using adsorption techniques including non-covalent interactions (e.g., electrostatic forces, van der Waals, and dehydration of hydrophobic interfaces) and covalent binding techniques where functional groups or linkers facilitate attaching the biomolecules to the surface. Immobilizing biomolecules or biological or chemical substances to a surface of a substrate material may be based upon the properties of the substrate surface, the liquid medium carrying the biomolecule or biological or chemical substance, and the properties of the biomolecules or biological or chemical substances themselves. In some cases, a substrate surface may be functionalized (e.g., chemically or physically modified) to facilitate immobilizing the biomolecules (or biological or chemical substances) to the substrate surface. The substrate surface may be first modified to have functional groups bound to the surface. The functional groups may then bind to biomolecules or biological or chemical substances to immobilize them thereon. A substance can be immobilized to a surface via a gel, for example, as described in US Patent Publ. No. US 2011/0059865 A1, which is incorporated herein by reference.

In some embodiments, nucleic acids can be attached to a surface and amplified using bridge amplification. Useful bridge amplification methods are described, for example, in U.S. Pat. No. 5,641,658; WO 2007/010251; U.S. Pat. No. 6,090,592; U.S. Patent Publ. No. 2002/0055100 A1; U.S. Pat. No. 7,115,400; U.S. Patent Publ. No. 2004/0096853 A1; U.S. Patent Publ. No. 2004/0002090 A1; U.S. Patent Publ. No. 2007/0128624 A1; and U.S. Patent Publ. No. 2008/0009420 A1, each of which is incorporated herein in its entirety. Another useful method for amplifying nucleic acids on a surface is Rolling Circle Amplification (RCA), for example, using methods set forth in further detail below. In some embodiments, the nucleic acids can be attached to a surface and amplified using one or more primer pairs. For example, one of the primers can be in solution and the other primer can be immobilized on the surface (e.g., 5'-attached). By way of example, a nucleic acid molecule can hybridize to one of the primers on the surface followed by extension of the immobilized primer to produce a first copy of the nucleic acid. The primer in solution then hybridizes to the first copy of the nucleic acid which can be extended using the first copy of the nucleic acid as a template. Optionally, after the first copy of the nucleic acid is produced, the original nucleic acid molecule can hybridize to a second immobilized primer on the surface and can be extended at the same time or after the primer in solution is extended. In any embodiment, repeated rounds of extension (e.g., amplification) using the immobilized primer and primer in solution provide multiple copies of the nucleic acid.

In particular embodiments, the assay protocols executed by the systems and methods described herein include the use of natural nucleotides and also enzymes that are configured to interact with the natural nucleotides. Natural nucleotides include, for example, ribonucleotides (RNA) or deoxyribonucleotides (DNA). Natural nucleotides can be in the mono-, di-, or tri-phosphate form and can have a base selected from adenine (A), thymine (T), uracil (U), guanine (G) or cytosine (C). It will be understood however that non-natural nucleotides, modified nucleotides or analogs of the aforementioned nucleotides can be used. Some examples of useful non-natural nucleotides are set forth below in regard to reversible terminator-based sequencing by synthesis methods.

In embodiments that include reaction chambers, items or solid substances (including semi-solid substances) may be disposed within the reaction chambers. When disposed, the item or solid may be physically held or immobilized within the reaction chamber through an interference fit, adhesion, or entrapment. Exemplary items or solids that may be disposed within the reaction chambers include polymer beads, pellets, agarose gel, powders, quantum dots, or other solids that may be compressed and/or held within the reaction chamber. In particular embodiments, a nucleic acid superstructure, such as a DNA ball, can be disposed in or at a reaction chamber, for example, by attachment to an interior surface of the reaction chamber or by residence in a liquid within the reaction chamber. A DNA ball or other nucleic acid superstructure can be performed and then disposed in or at the reaction chamber. Alternatively, a DNA ball can be synthesized in situ at the reaction chamber. A DNA ball can be synthesized by rolling circle amplification to produce a concatemer of a particular nucleic acid sequence and the concatemer can be treated with conditions that form a relatively compact ball. DNA balls and methods for their synthesis are described, for example in, U.S. Patent Publication Nos. 2008/0242560 A1 or 2008/0234136 A1, each of which is incorporated herein in its entirety. A substance that is held or disposed in a reaction chamber can be in a solid, liquid, or gaseous state.

As used herein, "base calling" identifies a nucleotide base in a nucleic acid sequence. Base calling refers to the process of determining a base call (A, C, G, T) for every cluster at a specific cycle. As an example, base calling can be performed utilizing four-channel, two-channel or one-channel methods and systems described in the incorporated materials of U.S. Patent Application Publication No. 2013/0079232. In particular embodiments, a base calling cycle is referred to as a "sampling event." In one dye and two-channel sequencing protocol, a sampling event comprises two illumination stages in time sequence, such that a pixel signal is generated at each stage. The first illumination stage induces illumination from a given cluster indicating nucleotide bases A and T in a AT pixel signal, and the second illumination stage induces illumination from a given cluster indicating nucleotide bases C and T in a CT pixel signal.

The technology disclosed, e.g., the disclosed base callers can be implemented on processors like Central Processing Units (CPUs), Graphics Processing Units (GPUs), Field Programmable Gate Arrays (FPGAs), Coarse-Grained Reconfigurable Architectures (CGRAs), Application-Specific Integrated Circuits (ASICs), Application Specific Instruction-set Processor (ASIP), and Digital Signal Processors (DSPs).

System Diagram

FIG. 1 is a simplified block diagram of the system for analysis of sensor data from a sequencing system, such as base call sensor outputs. In the example of FIG. 1, the system includes a sequencing machine 100 and a configurable processor 150. The configurable processor 150 can execute a neural network-based base caller in coordination with a runtime program executed by the central processing unit Central Processing Unit (CPU) 102. The sequencing machine 100 comprises base call sensors and flow cells 101. The flow cells can comprise one or more tiles in which clusters of genetic material are exposed to a sequence of analyte flows used to cause reactions in the clusters to identify the bases in the genetic material. The sensors sense the reactions for each cycle of the sequence in each tile of the flow cell to provide tile data. Examples of this technology are described in more detail below. Genetic sequencing is a data intensive operation, which translates base call sensor data into sequences of base calls for each cluster of genetic material sensed in during a base call operation.

The system in this example includes the CPU 102 which executes a runtime program to coordinate the base call operations, memory 103 to store sequences of arrays of tile data, base call reads produced by the base calling operation, and other information used in the base call operations. Also, in this illustration the system includes memory 104 to store a configuration file (or files), such as FPGA bit files, topology of the neural network, and model parameters for the neural network used to configure and reconfigure the configurable processor 150 and execute the neural network. Examples of such model parameters include weight coefficients (also referred to as weights) and/or biases that are to be used to configure the topology of the neural network. The sequencing machine 100 can include a program for configuring a configurable processor and in some embodiments a reconfigurable processor to execute the neural network.

The sequencing machine 100 is coupled by a bus 105 to the configurable processor 150. The bus 105 can be implemented using a high throughput technology, such as in one example bus technology compatible with the PCIe standards (Peripheral Component Interconnect Express) currently maintained and developed by the PCI-SIG (PCI Special Interest Group). Also, in this example, a memory 160 is coupled to the configurable processor 150 by bus 161. The memory 160 can be on-board memory, disposed on a circuit board with the configurable processor 150. The memory 160 is used for high speed access by the configurable processor 150 of working data used in the base call operation. The bus 161 can also be implemented using a high throughput technology, such as bus technology compatible with the PCIe standards.

Configurable processors, including field programmable gate arrays FPGAs, coarse grained reconfigurable arrays CGRAs, and other configurable and reconfigurable devices, can be configured to implement a variety of functions more efficiently or faster than might be achieved using a general purpose processor executing a computer program. Configuration of configurable processors involves compiling a functional description to produce a configuration file, referred to sometimes as a bitstream or bit file, and distributing the configuration file to the configurable elements on the processor.

The configuration file defines the logic functions to be executed by the configurable processor, by configuring the circuit to set data flow patterns, use of distributed memory and other on-chip memory resources, lookup table contents, operations of configurable logic blocks and configurable execution units like multiply-and-accumulate units, configurable interconnects and other elements of the configurable array. A configurable processor is reconfigurable if the configuration file may be changed in the field, by changing the loaded configuration file. For example, the configuration file may be stored in volatile SRAM elements, in non-volatile read-write memory elements, and in combinations of the same, distributed among the array of configurable elements on the configurable or reconfigurable processor. A variety of commercially available configurable processors are suitable for use in a base calling operation as described herein. Examples include commercially available products such as Xilinx Alveo™ U200, Xilinx Alveo™ U250, Xilinx Alveo™ U280, Intel/Altera Stratix™ GX2800, Intel/Altera Stratix™ GX2800, and Intel Stratix™ GX10M. In some examples, a host CPU can be implemented on the same integrated circuit as the configurable processor.

Embodiments described herein implement the multi-cycle neural network using a configurable processor 150. The configuration file for a configurable processor can be implemented by specifying the logic functions to be executed using a high level description language HDL or a register transfer level Rum language specification. The specification can be compiled using the resources designed for the selected configurable processor to generate the configuration file. The same or similar specification can be compiled for the purposes of generating a design for an application-specific integrated circuit which may not be a configurable processor.

Alternatives for the configurable processor, in all embodiments described herein, therefore include a configured processor comprising an application specific ASIC or special purpose integrated circuit or set of integrated circuits, or a system-on-a-chip SOC device, configured to execute a neural network based base call operation as described herein.

In general, configurable processors and configured processors described herein, as configured to execute runs of a neural network, are referred to herein as neural network processors.

The configurable processor 150 is configured in this example by a configuration file loaded using a program executed by the CPU 102, or by other sources, which configures the array of configurable elements on the configurable processor 150 to execute the base call function. In this example, the configuration includes data flow logic 151 which is coupled to the buses 105 and 161 and executes functions for distributing data and control parameters among the elements used in the base call operation.

Also, the configurable processor 150 is configured with base call execution logic 152 to execute a multi-cycle neural network. The logic 152 comprises a plurality of multi-cycle execution clusters (e.g., 153) which, in this example, includes multi-cycle cluster 1 through multi-cycle cluster X. The number of multi-cycle clusters can be selected according to a trade-off involving the desired throughput of the operation, and the available resources on the configurable processor.

The multi-cycle clusters are coupled to the data flow logic 151 by data flow paths 154 implemented using configurable interconnect and memory resources on the configurable processor. Also, the multi-cycle clusters are coupled to the data flow logic 151 by control paths 155 implemented using configurable interconnect and memory resources for example on the configurable processor, which provide control signals indicating available clusters, readiness to provide input units for execution of a run of the neural network to the available clusters, readiness to provide trained parameters for the neural network, readiness to provide output patches of base call classification data, and other control data used for execution of the neural network.

The configurable processor is configured to execute runs of a multi-cycle neural network using trained parameters to produce classification data for sensing cycles of the base flow operation. A run of the neural network is executed to produce classification data for a subject sensing cycle of the base call operation. A run of the neural network operates on a sequence including a number N of arrays of tile data from respective sensing cycles of N sensing cycles, where the N sensing cycles provide sensor data for different base call operations for one base position per operation in time sequence in the examples described herein. Optionally, some of the N sensing cycles can be out of sequence if the needed according to a particular neural network model being executed. The number N can be any number greater than one. In some examples described herein, sensing cycles of the N sensing cycles represent a set of sensing cycles for at least one sensing cycle preceding the subject sensing cycle and at least one sensing cycle following the subject cycle in time sequence. Examples are described herein in which the number N is an integer equal to or greater than five.

The data flow logic is configured to move tile data and at least some trained parameters of the model parameters from the memory 160 to the configurable processor for runs of the neural network, using input units for a given run including tile data for spatially aligned patches of the N arrays. The input units can be moved by direct memory access operations in one DMA operation, or in smaller units moved during available time slots in coordination with the execution of the neural network deployed.

Tile data for a sensing cycle as described herein can comprise an array of sensor data having one or more features. For example, the sensor data can comprise two images which are analyzed to identify one of four bases at a base position in a genetic sequence of DNA, RNA, or other genetic material. The tile data can also include metadata about the images and the sensors. For example, in embodiments of the base calling operation, the tile data can comprise information about alignment of the images with the clusters such as distance from center information indicating the distance of each pixel in the array of sensor data from the center of a cluster of genetic material on the tile.

During execution of the multi-cycle neural network as described below, tile data can also include data produced during execution of the multi-cycle neural network, referred to as intermediate data, which can be reused rather than recomputed during a run of the multi-cycle neural network. For example, during execution of the multi-cycle neural network, the data flow logic can write intermediate data to the memory 160 in place of the sensor data for a given patch of an array of tile data. Embodiments like this are described in more detail below.

As illustrated, a system is described for analysis of base call sensor output, comprising memory (e.g., 160) accessible by the runtime program storing tile data including sensor data for a tile from sensing cycles of a base calling operation. Also, the system includes a neural network processor, such as configurable processor 150 having access to the memory. The neural network processor is configured to execute runs of a neural network using trained parameters to produce classification data for sensing cycles. As described herein, a run of the neural network is operating on a sequence of N arrays of tile data from respective sensing cycles of N sensing cycles, including a subject cycle, to produce the classification data for the subject cycle. The data flow logic 151 is provided to move tile data and the trained parameters from the memory to the neural network processor for runs of the neural network using input units including data for spatially aligned patches of the N arrays from respective sensing cycles of N sensing cycles.

Also, a system is described in which the neural network processor has access to the memory, and includes a plurality of execution clusters, the execution logic clusters in the plurality of execution clusters configured to execute a neural network. The data flow logic has access to the memory and to execution clusters in the plurality of execution clusters, to provide input units of tile data to available execution clusters in the plurality of execution clusters, the input units including a number N of spatially aligned patches of arrays of tile data from respective sensing cycles, including a subject sensing cycle, and to cause the execution clusters to apply the N spatially aligned patches to the neural network to produce output patches of classification data for the spatially aligned patch of the subject sensing cycle, where N is greater than 1.

Figure 2:
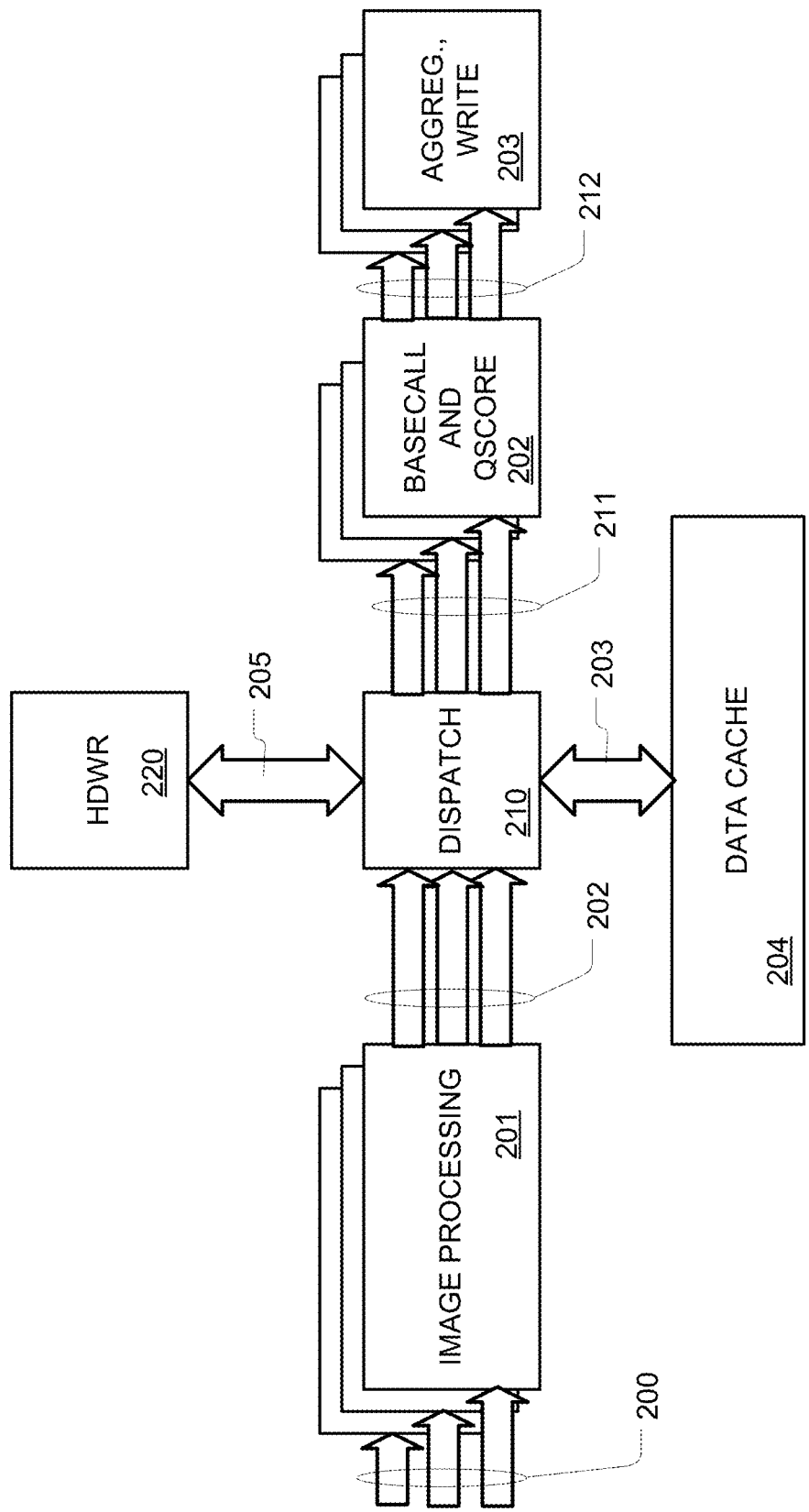
FIG. 2 is a simplified data flow diagram which can be executed by a system like that of FIG. 1.

FIG. 2 is a simplified diagram showing aspects of the base calling operation, including functions of a runtime program executed by a host processor. In this diagram, the output of image sensors from a flow cell are provided on lines 200 to image processing threads 201, which can perform processes on images such as resampling, alignment and arrangement in an array of sensor data for the individual tiles, and can be used by processes which calculate a tile cluster mask for each tile in the flow cell, which identifies pixels in the array of sensor data that correspond to clusters of genetic material on the corresponding tile of the flow cell. To compute a cluster mask, one example algorithm is based on a process to detect clusters which are unreliable in the early sequencing cycles using a metric derived from the softmax output, and then the data from those wells/clusters is discarded, and no output data is produced for those clusters. For example, a process can identify clusters with high reliability during the first N (e.g., 25) base-calls, and reject the others. Rejected clusters might be polyclonal or very weak intensity or obscured by fiducials. This procedure can be performed on the host CPU. In alternative implementations, this information would potentially be used to identify the necessary clusters of interest to be passed back to the CPU, thereby limiting the storage required for intermediate data (i.e., the 'dehydration' step described below could look at all pixels with wells, or it could be implemented more efficiently to only process pixels with wells/clusters that pass the filter).

The outputs of the image processing threads 201 are provided on lines 202 to a dispatch logic 210 in the CPU which routes the arrays of tile data to a data cache 204 on a high-speed bus 203, or on high-speed bus 205 to the multi-cluster neural network processor hardware 220, such as the configurable processor of FIG. 1, according to the state of the base calling operation. The hardware 220 returns classification data output by the neural network to the dispatch logic 210, which passes the information to the data cache 204, or on lines 211 to threads 202 that perform base call and quality score computations using the classification data, and can arrange the data in standard formats for base call reads. The outputs of the threads 202 that perform base calling and quality score computations are provided on lines 212 to threads 203 that aggregate the base call reads, perform other operations such as data compression, and write the resulting base call outputs to specified destinations for utilization by the customers.

In some embodiments, the host can include threads (not shown) that perform final processing of the output of the hardware 220 in support of the neural network. For example, the hardware 220 can provide outputs of classification data from a final layer of the multi-cluster neural network. The host processor can execute an output activation function, such as a softmax function, over the classification data to configure the data for use by the base call and quality score threads 202. Also, the host processor can execute input operations (not shown), such as resampling, batch normalization or other adjustments of the tile data prior to input to the hardware 220.

Figure 3:
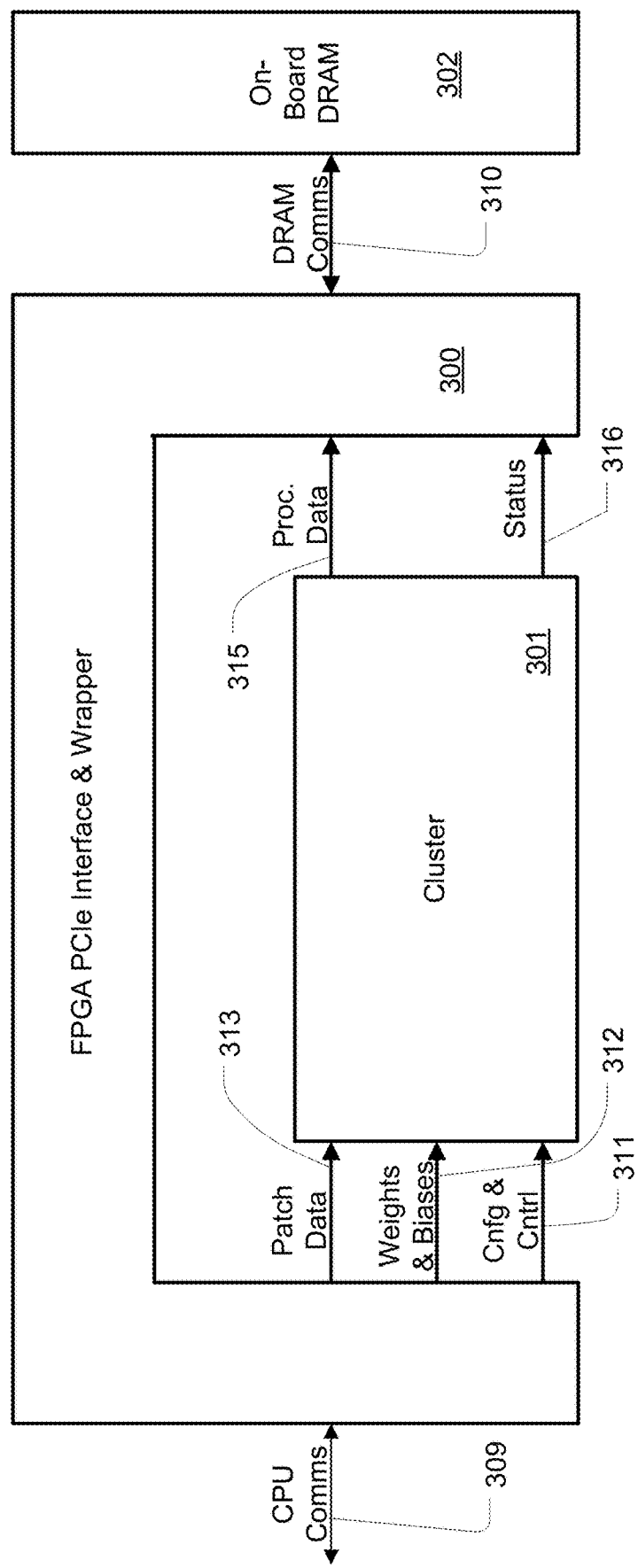
FIG. 3 illustrates a configuration architecture for components of a configurable or a reconfigurable array supporting base calling operations.

FIG. 3 is a simplified diagram of a configuration of a configurable processor such as that of FIG. 1. In FIG. 3, the configurable processor comprises in FPGA with a plurality of high speed PCIe interfaces. The FPGA is configured with a wrapper 300 which comprises the data flow logic described with reference to FIG. 1. The wrapper 300 manages the interface and coordination with a runtime program in the CPU across the CPU communication link 309 and manages communication with the on-board DRAM 302 (e.g. memory 160) via DRAM communication link 310. The data flow logic in the wrapper 300 provides patch data retrieved by traversing the arrays of tile data on the on-board DRAM 302 for the number N cycles to a cluster 301 and retrieves process data 315 from the cluster 301 for delivery back to the on-board DRAM 302. The wrapper 300 also manages transfer of data between the on-board DRAM 302 and host memory, for both the input arrays of tile data, and for the output patches of classification data. The wrapper transfers patch data on line 313 to the allocated cluster 301. The wrapper provides trained parameters, such as weights and biases on line 312 to the cluster 301 retrieved from the on-board DRAM 302. The wrapper provides configuration and control data on line 311 to the cluster 301 provided from, or generated in response to, the runtime program on the host via the CPU communication link 309. The cluster can also provide status signals on line 316 to the wrapper 300, which are used in cooperation with control signals from the host to manage traversal of the arrays of tile data to provide spatially aligned patch data, and to execute the multi-cycle neural network over the patch data using the resources of the cluster 301.

As mentioned above, there can be multiple clusters on a single configurable processor managed by the wrapper 300 configured for executing on corresponding ones of multiple patches of the tile data. Each cluster can be configured to provide classification data for base calls in a subject sensing cycle using the tile data of multiple sensing cycles described herein.

In examples of the system, model data, including kernel data like filter weights and biases can be sent from the host CPU to the configurable processor, so that the model can be updated as a function of cycle number. A base calling operation can comprise, for a representative example, on the order of hundreds of sensing cycles. Base calling operation can include paired end reads in some embodiments. For example, the model trained parameters may be updated once every 20 cycles (or other number of cycles), or according to update patterns implemented for particular systems and neural network models. In some embodiments including paired end reads in which a sequence for a given string in a genetic cluster on a tile includes a first part extending from a first end down (or up) the string, and a second part extending from a second end up (or down) the string, the trained parameters can be updated on the transition from the first part to the second part.

In some examples, image data for multiple cycles of sensing data for a tile can be sent from the CPU to the wrapper 300. The wrapper 300 can optionally do some pre-processing and transformation of the sensing data and write the information to the on-board DRAM 302. The input tile data for each sensing cycle can include arrays of sensor data including on the order of 4000×3000 pixels per sensing cycle per tile or more, with two features representing colors of two images of the tile, and one or two bytes per feature per pixel. For an embodiment in which the number N is three sensing cycles to be used in each run of the multi-cycle neural network, the array of tile data for each run of the multi-cycle neural network can consume on the order of hundreds of megabytes per tile. In some embodiments of the system, the tile data also includes an array of DFC data, stored once per tile, or other type of metadata about the sensor data and the tiles.

In operation, when a multi-cycle cluster is available, the wrapper allocates a patch to the cluster. The wrapper fetches a next patch of tile data in the traversal of the tile and sends it to the allocated cluster along with appropriate control and configuration information. The cluster can be configured with enough memory on the configurable processor to hold a patch of data including patches from multiple cycles in some systems, that is being worked on in place, and a patch of data that is to be worked on when the current patch of processing is finished using a ping-pong buffer technique or raster scanning technique in various embodiments.

When an allocated cluster completes its run of the neural network for the current patch and produces an output patch, it will signal the wrapper. The wrapper will read the output patch from the allocated cluster, or alternatively the allocated cluster will push the data out to the wrapper. Then the wrapper will assemble output patches for the processed tile in the DRAM 302. When the processing of the entire tile has been completed, and the output patches of data transferred to the DRAM, the wrapper sends the processed output array for the tile back to the host/CPU in a specified format. In some embodiments, the on-board DRAM 302 is managed by memory management logic in the wrapper 300. The runtime program can control the sequencing operations to complete analysis of all the arrays of tile data for all the cycles in the run in a continuous flow to provide real time analysis.

Figure 4:
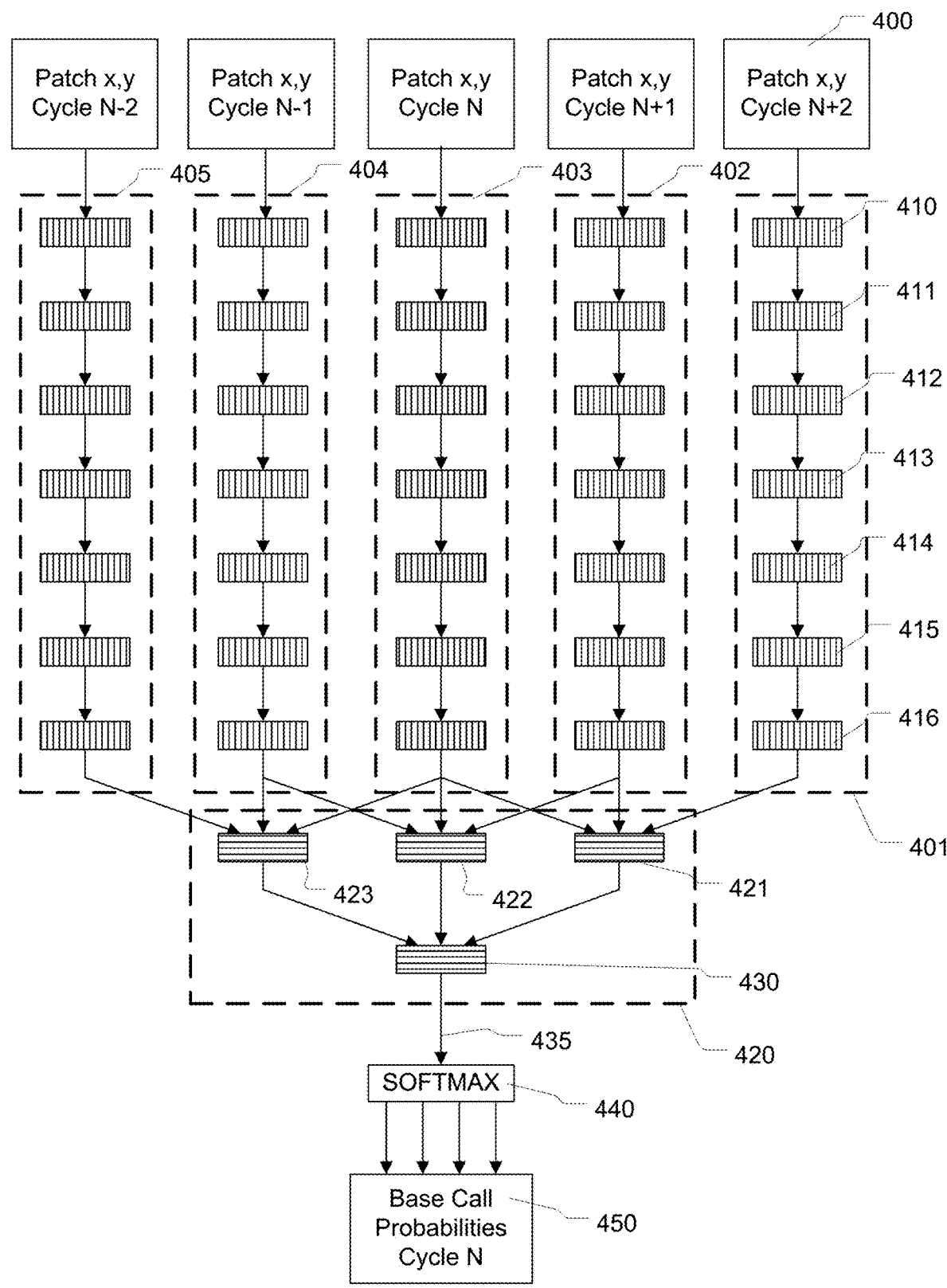
FIG. 4 is a diagram of a neural network architecture which can be executed using a configurable or a reconfigurable array configured as described herein.

FIG. 4 is a diagram of a multi-cycle neural network model which can be executed using the system described herein. The example shown in FIG. 4 can be referred to as a five-cycle input, one-cycle output neural network. The inputs to the multi-cycle neural network model include five spatially aligned patches (e.g., 400) from the tile data arrays of five sensing cycles of a given tile. Spatially aligned patches have the same aligned row and column dimensions (x,y) as other patches in the set, so that the information relates to the same clusters of genetic material on the tile in sequence cycles. In this example, a subject patch is a patch from the array of tile data for cycle N. The set of five spatially aligned patches includes a patch from cycle N−2 preceding the subject patch by two cycles, a patch from cycle N−1 preceding the subject patch by one cycle, a patch from cycle N+1 following the patch from the subject cycle by one cycle, and a patch from cycle N+2 following the patch from the subject cycle by two cycles.

The model includes a segregated stack 401 of layers of the neural network for each of the input patches. Thus, stack 401 receives as input, tile data for the patch from cycle N+2, and is segregated from the stacks 402, 403, 404, and 405 so they do not share input data or intermediate data. In some embodiments, all of the stacks 410-405 can have identical models, and identical trained parameters (such as trained weights and biases). In other embodiments, the models and trained parameters may be different in the different stacks. Stack 402 receives as input, tile data for the patch from cycle N+1. Stack 403 receives as input, tile data for the patch from cycle N. Stack 404 receives as input, tile data for the patch from cycle N−1. Stack 405 receives as input, tile data for the patch from cycle N−2. The layers of the segregated stacks each execute a convolution operation of a kernel including a plurality of filters over the input data for the layer. As in the example above, the patch 400 may include three features. The output of the layer 410 may include many more features, such as 10 to 20 features. Likewise, the outputs of each of layers 411 to 416 can include any number of features suitable for a particular implementation. The parameters of the filters are trained parameters for the neural network, such as weights and biases. The output feature set (intermediate data) from each of the stacks 401-405 is provided as input to an inverse hierarchy 420 of temporal combinatorial layers, in which the intermediate data from the multiple cycles is combined. In the example illustrated, the inverse hierarchy 420 includes a first layer including three combinatorial layers 421, 422, 423, each receiving intermediate data from three of the segregated stacks, and a final layer including one combinatorial layer 430 receiving intermediate data from the three temporal layers 421, 422, 423.

The output of the final combinatorial layer 430 is an output patch of classification data for clusters located in the corresponding patch of the tile from cycle N. The output patches can be assembled into an output array classification data for the tile for cycle N. In some embodiments, the output patch may have sizes and dimensions different from the input patches. In some embodiments, the output patch may include pixel-by-pixel data that can be filtered by the host to select cluster data.

The output classification data can then be applied to a softmax function 440 (or other output activation function) optionally executed by the host, or on the configurable processor, depending on the particular implementation. An output function different from softmax could be used (e.g., making a base call output parameter according to largest output, then use a learned nonlinear mapping using context/network outputs to give base quality).

Finally, the output of the softmax function 440 can be provided as base call probabilities for cycle N (450) and stored in host memory to be used in subsequent processing. Other systems may use another function for output probability calculation, e.g., another nonlinear model.

The neural network can be implemented using a configurable processor with a plurality of execution clusters so as complete evaluation of one tile cycle within the duration of the time interval, or close to the duration of the time interval, of one sensing cycle, effectively providing the output data in real time. Data flow logic can be configured to distribute input units of tile data and trained parameters to the execution clusters, and to distribute output patches for aggregation in memory.

Input units of data for a five-cycle input, one-cycle output neural network like that of FIG. 4 are described with reference to FIG. 5 and FIG. 6 for a base call operation using two-channel sensor data. For example, for a given base in a genetic sequence, the base call operation can execute two flows of analyte and two reactions that generate two channels of signals, such as images, which can be processed to identify which one of four bases is located at a current position in the genetic sequence for each cluster of genetic material. In other systems, a different number of channels of sensing data may be utilized.

Figure 5:
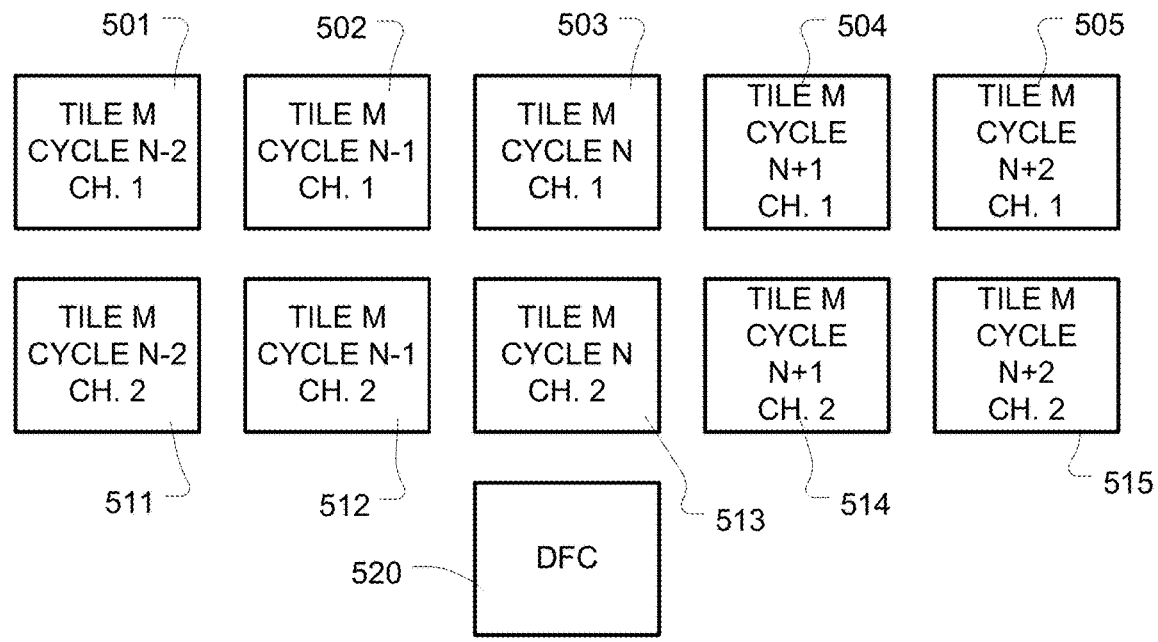
FIG. 5 is a simplified illustration of an organization of tiles of sensor data used by a neural network architecture like that of FIG. 4.

FIG. 5 shows arrays of tile data for five cycles for a given tile, tile M, used for the purposes of executing a five-cycle input, one-cycle output neural network. The five-cycle input tile data in this example can be written to the on-board DRAM, or other memory in the system which can be accessed by the data flow logic and, for cycle N−2, includes an array 501 for channel 1 and an array 511 for channel 2, for cycle N−1, an array 502 for channel 1 and an array 512 for channel 2, for cycle N, an array 503 for channel 1 and an array 513 for channel 2, for cycle N+1, an array 504 for channel 1 and an array 514 for channel 2, for cycle N+2, an array 505 for channel 1 and an array 515 for channel 2. Also an array 520 of metadata for the tile can be written once in the memory, in this case a DFC file, included for use as input to the neural network along with each cycle.

Figure 6:
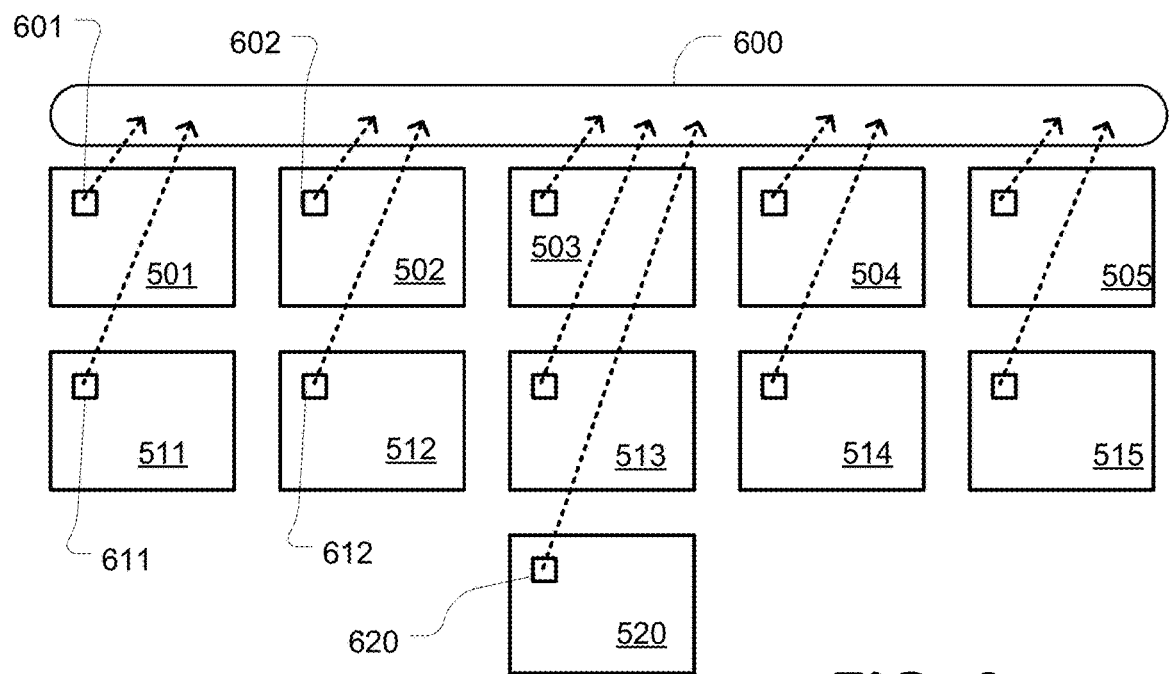
FIG. 6 is a simplified illustration of patches of tiles of sensor data used by a neural network architecture like that of FIG. 4.

The data flow logic composes input units, which can be understood with reference to FIG. 6, of tile data that includes spatially aligned patches of the arrays of tile data for each execution cluster configured to execute a run of the neural network over an input patch. An input unit for an allocated execution cluster is composed by the data flow logic by reading spatially aligned patches (e.g., 601, 602, 611, 612, 620) from each of the arrays 501-505, 511, 515, 520 of tile data for the five input cycles, and delivering them via data paths (schematically 600) to memory on the configurable processor configured for use by the allocated execution cluster. The allocated execution cluster executes a run of the five-cycle input/one-cycle output neural network, and delivers an output patch for the subject cycle N of classification data for the same patch of the tile in the subject cycle N.

Figure 7:
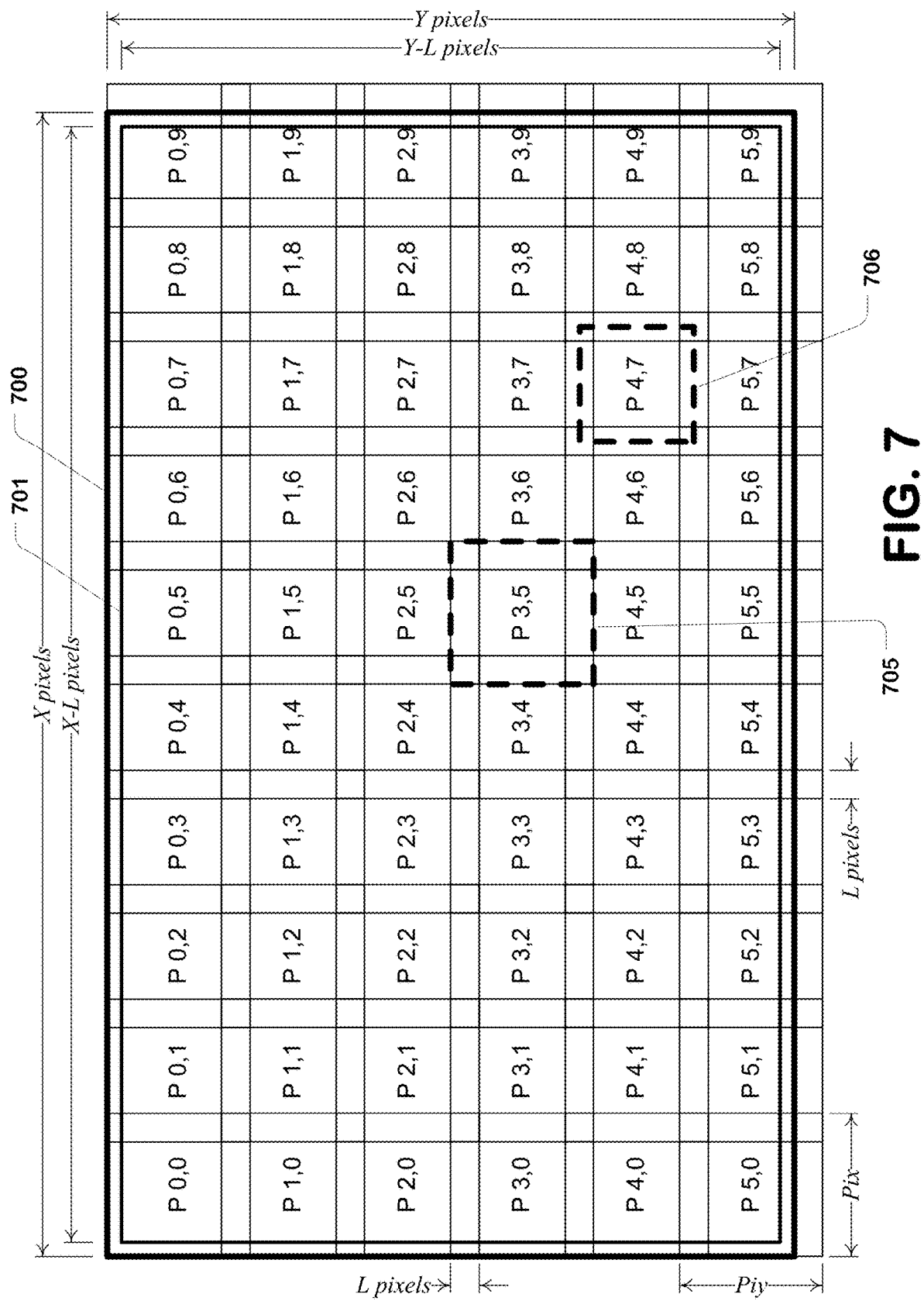
FIG. 7 illustrates a configuration of patches of an input tile used by a neural network architecture like that of FIG. 4.

FIG. 7 illustrates a mapping of patches over an array of tile data for a given tile. In this example, and input array 700 of tile data has a width of X pixels and a height of Y pixels. After convolving a kernel, such as a 3×3 kernel with a stride of one pixel, in a plurality of layers of the neural network, the output tile 701 can be reduced by two rows and two columns per layer of the neural network. The reduction by two rows/columns is caused in this example, by the kernel size of 3×3 and the type of (edge) padding in use and can be different in different configurations. So, for example, the output tile 701 of classification data will have a width of X-L pixels, for a neural network comprising L/2 layers of convolutions of this type. Likewise, the output tile of classification data will have a height of Y-L pixels for a neural network comprising L/2 layers. For example, taking a neural network having six layers, L can be 12 pixels. In the example shown in FIG. 7, the patch areas are not drawn to scale.

The input patches are formed in an overlapping manner to account for lost pixels that result from the convolutions over the patch dimensions. The sizes of the input patches can be chosen according to the particular implementation. In one example, an input patch may have a dimension of 76×76 pixels, with three channels of one or more bytes each. An output patch may have a dimension of 64×64 pixels. In an embodiment, base call operation output classifications for A/C/T/G base calls, and the output patch may include four channels of one or more bytes for each pixel representing confidence scores for the classifications. In the example of FIG. 4, the outputs on line 435 are unnormalized confidence scores for four base calls.

The data flow logic can address the array of tile data to patches in a raster scan fashion, or other scanning fashion to provide input patches (e.g., 705). For example, for the first available cluster, patch P0,0 can be provided. For a next available cluster, patch P0,1 can be provided. This sequence can be continued in a raster pattern until all of the patches of the tile are delivered to available clusters for processing.

Output patches (e.g., 706) can be written back in the same address space aligned with their subject input patches in some embodiments, accounting for any differences in the number of bytes per pixel used to encode the data. The output patches have an area (number of pixels) reduced relative to the input patches according to the number of convolution layers, and the nature of the convolutions executed.

Figure 8:
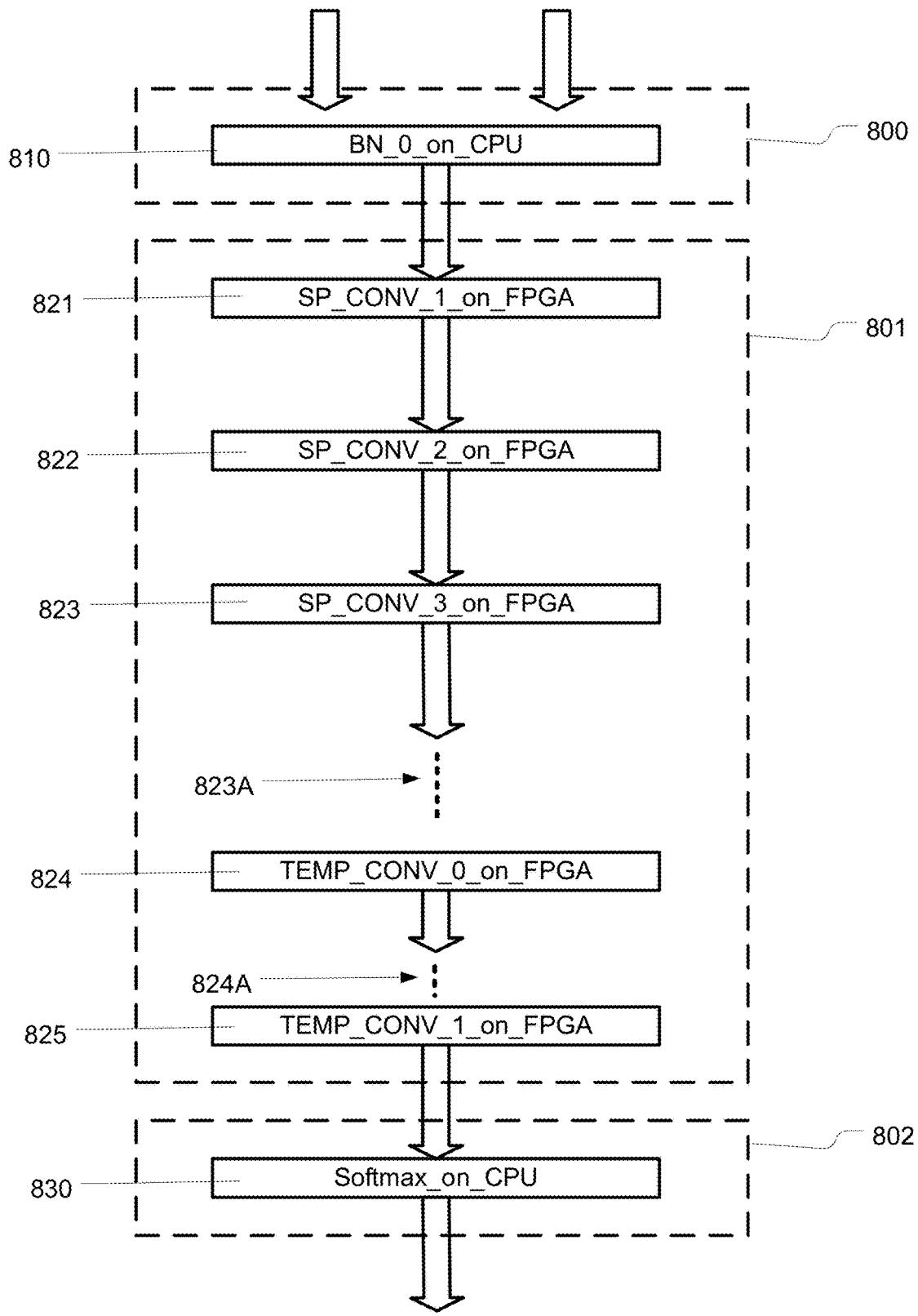
FIG. 8 illustrates part of a configuration for a neural network like that of FIG. 4 on a configurable or a reconfigurable array, such as a field programmable gate array (FPGA).

FIG. 8 is a simplified representation of a stack of a neural network usable in a system like that of FIG. 4 (e.g., 401 and 420). In this example, some functions of the neural network are executed on the host (e.g., 800, 802) and other portions of the neural network are executed on the configurable processor (801).

In an example, a first function can be batch normalization (layer 810) formed on the CPU. However, in another example, batch normalization as a function may be fused into one or more layers, and no separate batch normalization layer may be present.

A number of spatial, segregated convolution layers are executed as a first set of convolution layers of the neural network, as discussed above on the configurable processor. In this example, the first set of convolution layers applies 2D convolutions spatially.

As shown in FIG. 8, a first spatial convolution 821 is executed, followed by a second spatial convolution 822, followed by a third spatial convolution 823, and so on for a number L/2 of spatially segregated neural network layers in each stack (L is described with reference to FIG. 7). As indicated at 823A, the number of spatial layers can be any practical number, which for context may range from a few to more than 20 in different embodiments.

For SP_CONV_0, kernel weights are stored for example in a (1,6,6,3,L) structure since there are 3 input channels to this layer. In this example, the "6" in this structure is due to storing coefficients in the transformed Winograd domain (the kernel size is 3×3 in the spatial domain but expands in the transform domain).

For other SP_CONV layers, kernel weights are stored for this example in a (1,6,6 L) structure since there are K(=L) inputs and outputs for each of these layers.

The outputs of the stack of spatial layers are provided to temporal layers, including convolution layers 824, 825 executed on the FPGA. Layers 824 and 825 can be convolution layers applying 1D convolutions across cycles. As indicated at 824A, the number of temporal layers can be any practical number, which for context may range from a few to more than 20 in different embodiments.

The first temporal layer, TEMP_CONV_0 layer 824, reduces the number of cycle channels from 5 to 3, as illustrated in FIG. 4. The second temporal layer, layer 825, reduces the number of cycle channels from 3 to 1 as illustrated in FIG. 4, and reduces the number of feature maps to four outputs for each pixel, representing confidence in each base call.

The output of the temporal layers is accumulated in output patches and delivered to the host CPU to apply for example, a softmax function 830, or other function to normalize the base call probabilities.

Figure 9:
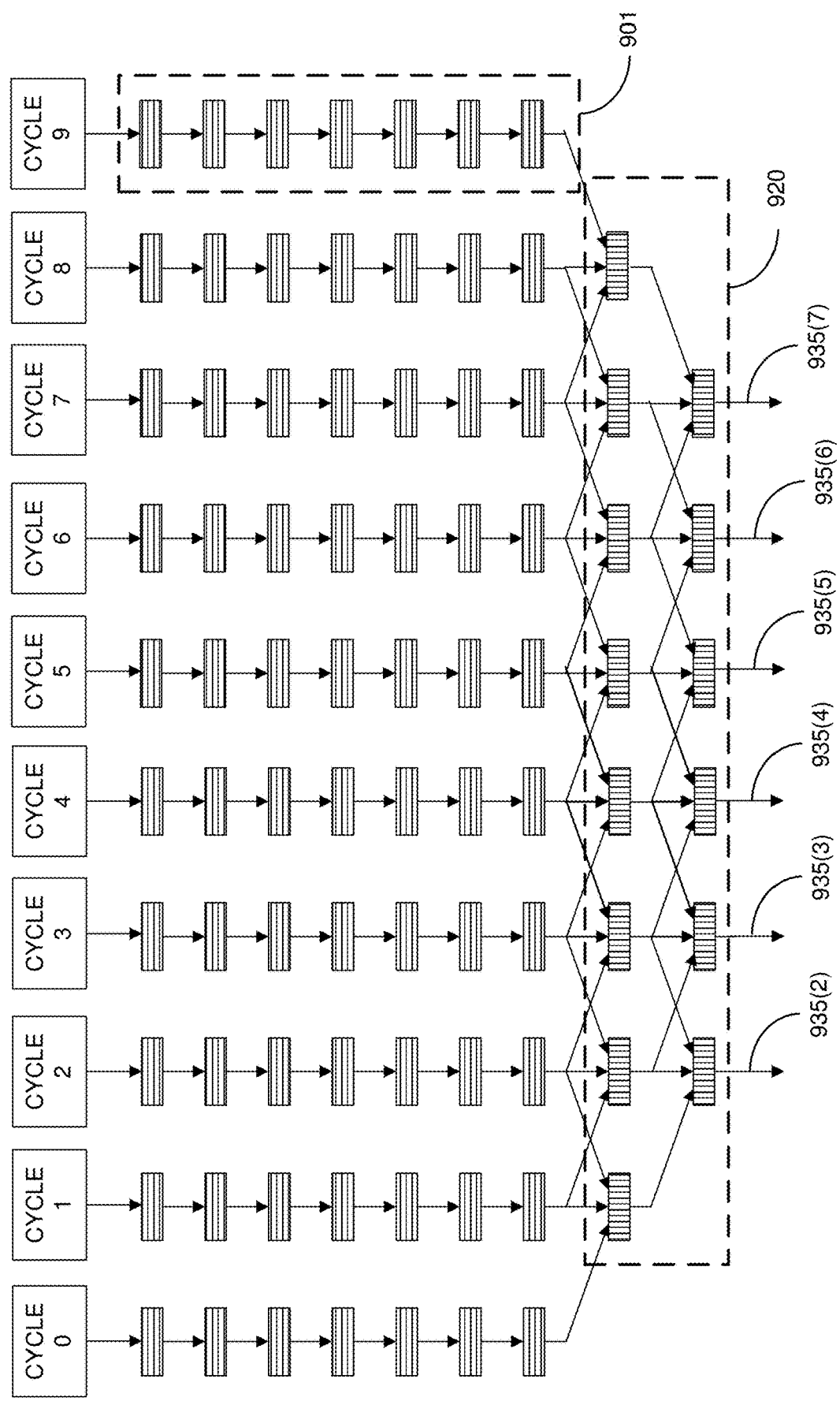
FIG. 9 is a diagram of another alternative neural network architecture which can be executed using a configurable or a reconfigurable array configured as described herein.

FIG. 9 illustrates an alternative implementation showing a 10-input, six-output neural network which can be executed for a base calling operation. In this example, tile data for spatially aligned input patches from cycles 0 to 9 are applied to segregated stacks of spatial layers, such as stack 901 for cycle 9. The outputs of the segregated stacks are applied to an inverse hierarchical arrangement of temporal stacks 920, having outputs 935(2) through 1135(7) providing base call classification data for subject cycles 2 through 7.

Figure 10:
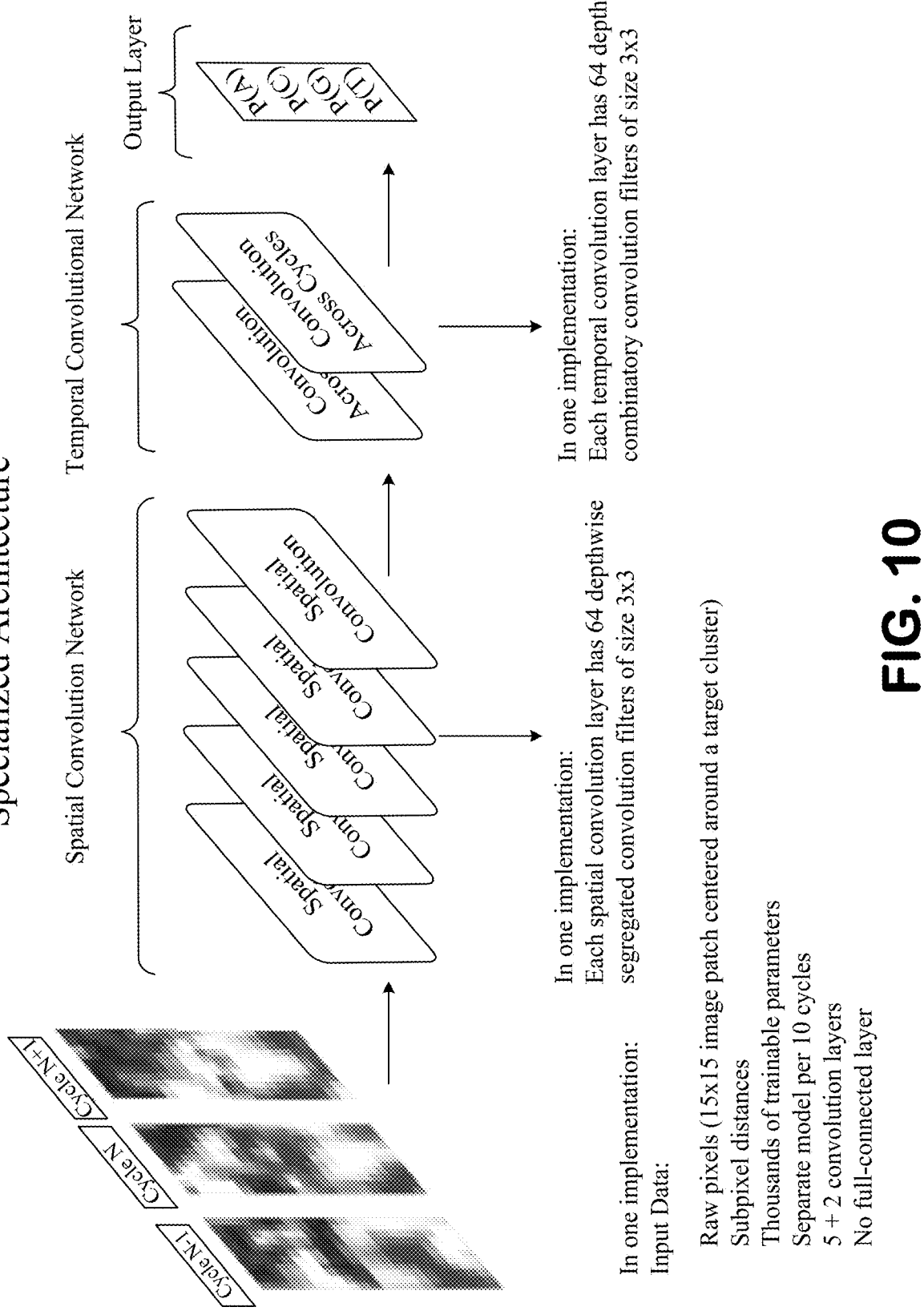
FIG. 10 illustrates one implementation of a specialized architecture of the neural network-based base caller that is used to segregate processing of data for different sequencing cycles.

FIG. 10 illustrates one implementation of the specialized architecture of the neural network-based base caller (e.g., FIG. 4 and FIG. 9) that is used to segregate processing of data for different sequencing cycles. The motivation for using the specialized architecture is described first.

The neural network-based base caller processes data for a current sequencing cycle, one or more preceding sequencing cycles, and one or more successive sequencing cycles. Data for additional sequencing cycles provides sequence-specific context. The neural network-based base caller learns the sequence-specific context during training and base call them. Furthermore, data for pre and post sequencing cycles provides second order contribution of pre-phasing and phasing signals to the current sequencing cycle.

Images captured at different sequencing cycles and in different image channels are misaligned and have residual registration error with respect to each other. To account for this misalignment, the specialized architecture comprises spatial convolution layers that do not mix information between sequencing cycles and only mix information within a sequencing cycle.

Spatial convolution layers use so-called "segregated convolutions" that operationalize the segregation by independently processing data for each of a plurality of sequencing cycles through a "dedicated, non-shared" sequence of convolutions. The segregated convolutions convolve over data and resulting feature maps of only a given sequencing cycle, i.e., intra-cycle, without convolving over data and resulting feature maps of any other sequencing cycle.

Consider, for example, that the input data comprises (i) current data for a current (time t) sequencing cycle to be base called, (ii) previous data for a previous (time t−1) sequencing cycle, and (iii) next data for a next (time t+1) sequencing cycle. The specialized architecture then initiates three separate data processing pipelines (or convolution pipelines), namely, a current data processing pipeline, a previous data processing pipeline, and a next data processing pipeline. The current data processing pipeline receives as input the current data for the current (time t) sequencing cycle and independently processes it through a plurality of spatial convolution layers to produce a so-called "current spatially convolved representation" as the output of a final spatial convolution layer. The previous data processing pipeline receives as input the previous data for the previous (time t−1) sequencing cycle and independently processes it through the plurality of spatial convolution layers to produce a so-called "previous spatially convolved representation" as the output of the final spatial convolution layer. The next data processing pipeline receives as input the next data for the next (time t+1) sequencing cycle and independently processes it through the plurality of spatial convolution layers to produce a so-called "next spatially convolved representation" as the output of the final spatial convolution layer.

In some implementations, the current, previous, and next processing pipelines are executed in parallel.

In some implementations, the spatial convolution layers are part of a spatial convolutional network (or subnetwork) within the specialized architecture.

The neural network-based base caller further comprises temporal convolution layers that mix information between sequencing cycles, i.e., inter-cycles. The temporal convolution layers receive their inputs from the spatial convolutional network and operate on the spatially convolved representations produced by the final spatial convolution layer for the respective data processing pipelines.

The inter-cycle operability freedom of the temporal convolution layers emanates from the fact that the misalignment property, which exists in the image data fed as input to the spatial convolutional network, is purged out from the spatially convolved representations by the stack, or cascade, of segregated convolutions performed by the sequence of spatial convolution layers.

Temporal convolution layers use so-called "combinatory convolutions" that groupwise convolve over input channels in successive inputs on a sliding window basis. In one implementation, the successive inputs are successive outputs produced by a previous spatial convolution layer or a previous temporal convolution layer.

In some implementations, the temporal convolution layers are part of a temporal convolutional network (or subnetwork) within the specialized architecture. The temporal convolutional network receives its inputs from the spatial convolutional network. In one implementation, a first temporal convolution layer of the temporal convolutional network groupwise combines the spatially convolved representations between the sequencing cycles. In another implementation, subsequent temporal convolution layers of the temporal convolutional network combine successive outputs of previous temporal convolution layers.

The output of the final temporal convolution layer is fed to an output layer that produces an output. The output is used to base call one or more clusters at one or more sequencing cycles.

During a forward propagation, the specialized architecture processes information from a plurality of inputs in two stages. In the first stage, segregated convolutions are used to prevent mixing of information between the inputs. In the second stage, combinatory convolutions are used to mix information between the inputs. The results from the second stage are used to make a single inference for the plurality of inputs.

This is different from the batch mode technique where a convolution layer processes multiple inputs in a batch at the same time and makes a corresponding inference for each input in the batch. In contrast, the specialized architecture maps the plurality of inputs to the single inference. The single inference can comprise more than one prediction, such as a classification score (e.g., softmax or pre-softmax base-wise classification scores or base-wise regression scores) for each of the four bases (A, C, T, and G).

In one implementation, the inputs have temporal ordering such that each input is generated at a different time step and has a plurality of input channels. For example, the plurality of inputs can include the following three inputs: a current input generated by a current sequencing cycle at time step (t), a previous input generated by a previous sequencing cycle at time step (t−1), and a next input generated by a next sequencing cycle at time step (t+1). In another implementation, each input is respectively derived from the current, previous, and next inputs by one or more previous convolution layers and includes k feature maps.

In one implementation, each input can include the following five input channels: a red image channel (in red), a red distance channel (in yellow), a green image channel (in green), a green distance channel (in purple), and a scaling channel (in blue). In another implementation, each input can include k feature maps produced by a previous convolution layer and each feature map is treated as an input channel.

Figure 11:
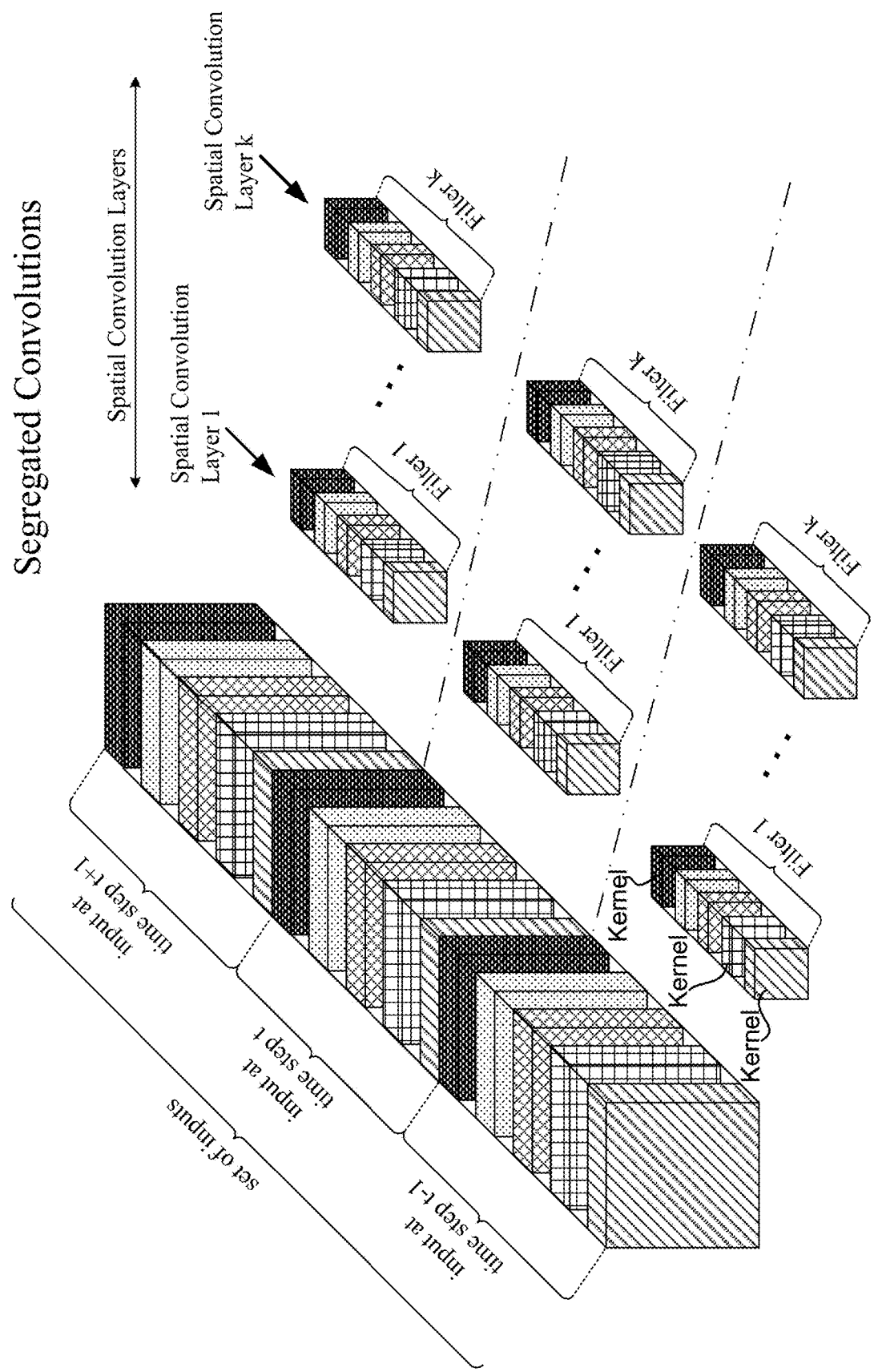
FIG. 11 depicts one implementation of segregated layers, each of which can include convolutions.

FIG. 11 depicts one implementation of segregated layers, each of which can include convolutions. Segregated convolutions process the plurality of inputs at once by applying a convolution filter to each input in parallel. With the segregated convolutions, the convolution filter combines input channels in a same input and does not combine input channels in different inputs. In one implementation, a same convolution filter is applied to each input in parallel. In another implementation, a different convolution filter is applied to each input in parallel. In some implementations, each spatial convolution layer comprises a bank of k convolution filters, each of which applies to each input in parallel.

Figure 12A:
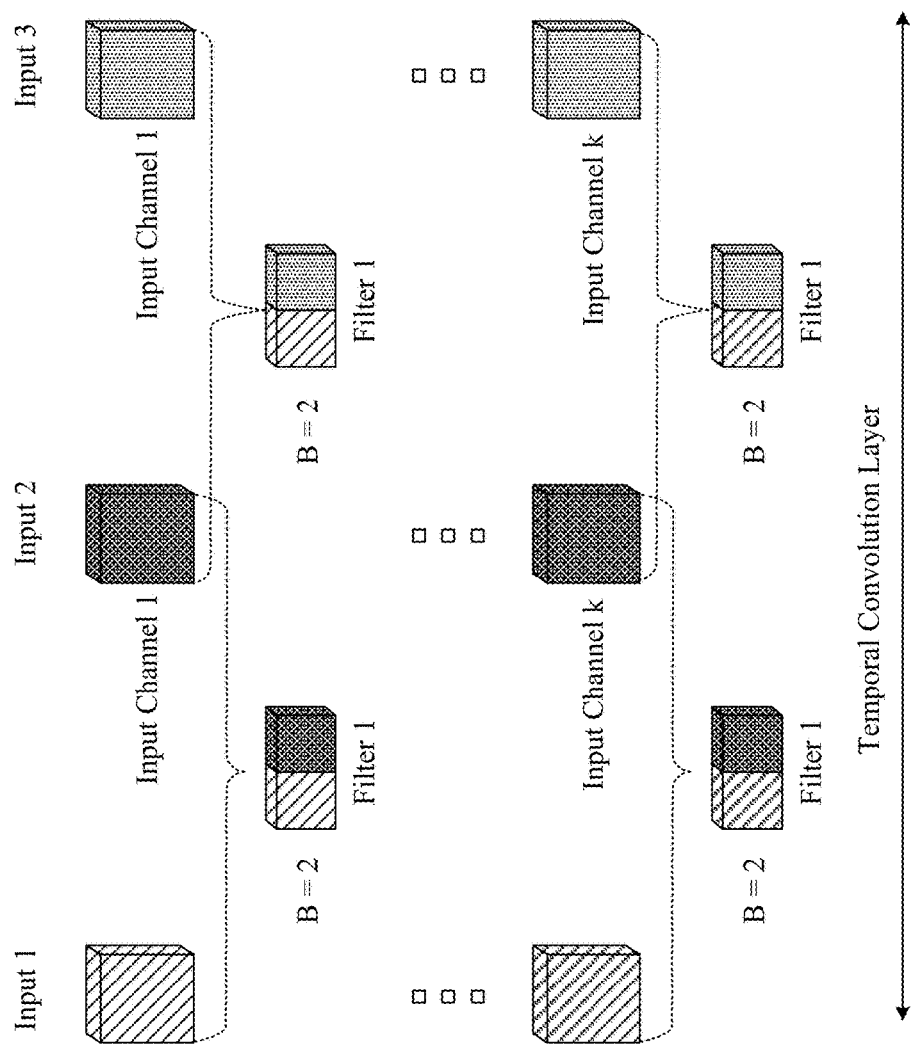
FIG. 12A depicts one implementation of combinatory layers, each of which can include convolutions.
Figure 12B:
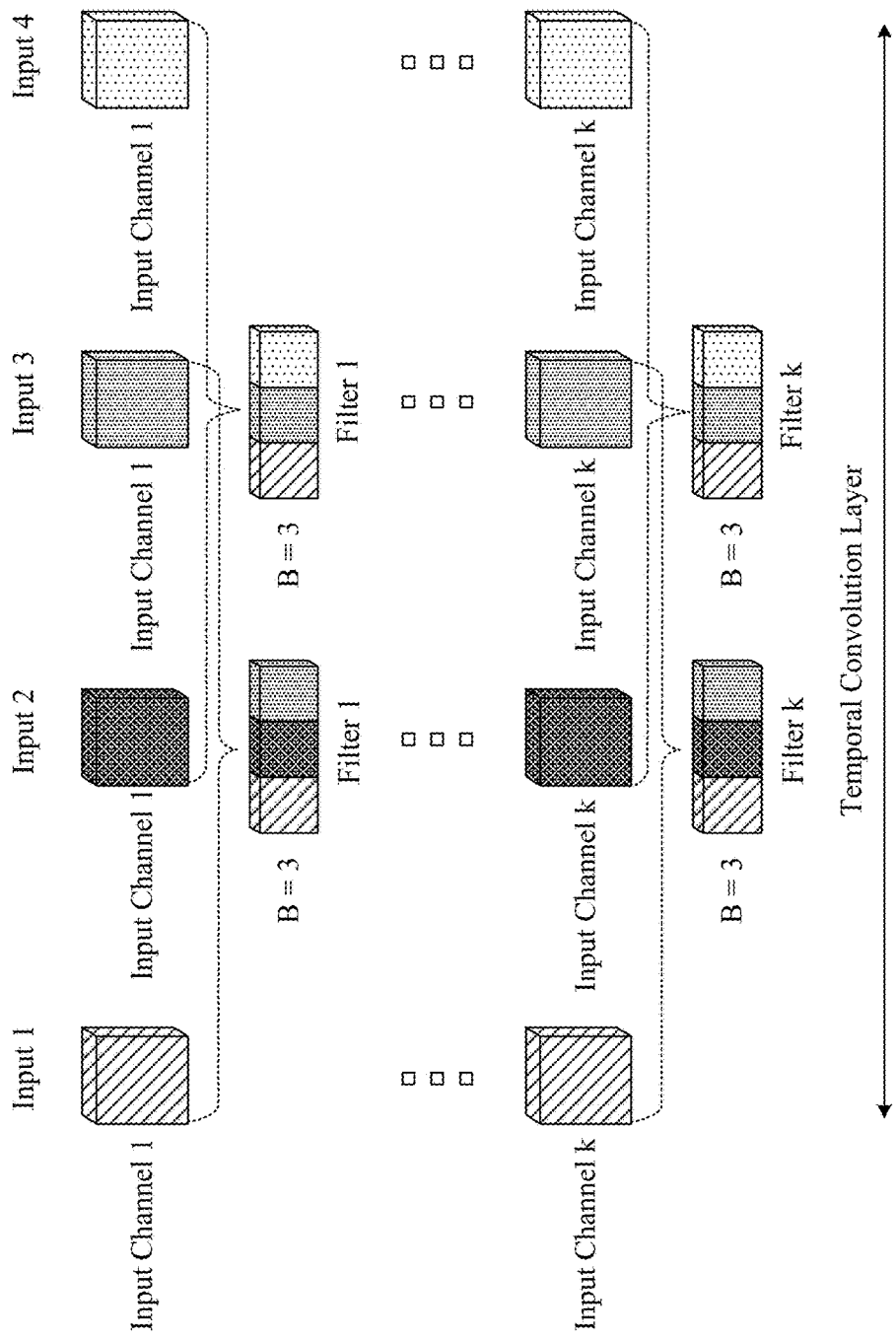
FIG. 12B depicts another implementation of the combinatory layers, each of which can include convolutions.

FIG. 12A depicts one implementation of combinatory layers, each of which can include convolutions. FIG. 12B depicts another implementation of the combinatory layers, each of which can include convolutions. Combinatory convolutions mix information between different inputs by grouping corresponding input channels of the different inputs and applying a convolution filter to each group. The grouping of the corresponding input channels and application of the convolution filter occurs on a sliding window basis. In this context, a window spans two or more successive input channels representing, for instance, outputs for two successive sequencing cycles. Since the window is a sliding window, most input channels are used in two or more windows.

In some implementations, the different inputs originate from an output sequence produced by a preceding spatial or temporal convolution layer. In the output sequence, the different inputs are arranged as successive outputs and therefore viewed by a next temporal convolution layer as successive inputs. Then, in the next temporal convolution layer, the combinatory convolutions apply the convolution filter to groups of corresponding input channels in the successive inputs.

In one implementation, the successive inputs have temporal ordering such that a current input is generated by a current sequencing cycle at time step (t), a previous input is generated by a previous sequencing cycle at time step (t−1), and a next input is generated by a next sequencing cycle at time step (t+1). In another implementation, each successive input is respectively derived from the current, previous, and next inputs by one or more previous convolution layers and includes k feature maps.

In one implementation, each input can include the following five input channels: a red image channel (in red), a red distance channel (in yellow), a green image channel (in green), a green distance channel (in purple), and a scaling channel (in blue). In another implementation, each input can include k feature maps produced by a previous convolution layer and each feature map is treated as an input channel.

The depth B of the convolution filter is dependent upon the number of successive inputs whose corresponding input channels are groupwise convolved by the convolution filter on a sliding window basis. In other words, the depth B is equal to the number of successive inputs in each sliding window and the group size.

In FIG. 12A, corresponding input channels from two successive inputs are combined in each sliding window, and therefore B=2. In FIG. 12B, corresponding input channels from three successive inputs are combined in each sliding window, and therefore B=3.

In one implementation, the sliding windows share a same convolution filter. In another implementation, a different convolution filter is used for each sliding window. In some implementations, each temporal convolution layer comprises a bank of k convolution filters, each of which applies to the successive inputs on a sliding window basis.

Figure 13:
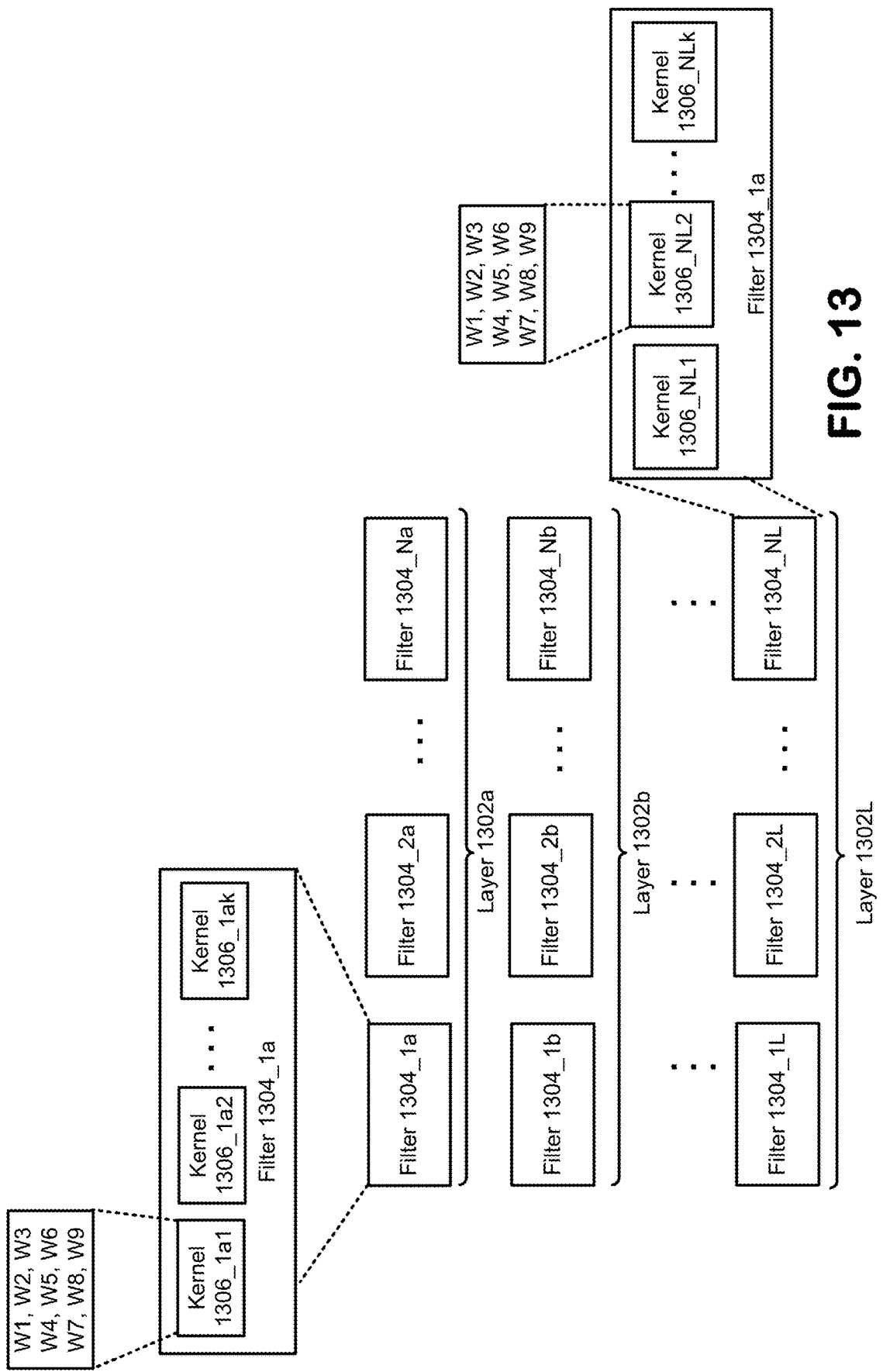
FIG. 13 illustrates layers of a neural network, and corresponding kernels and weights to configure the neural network for base calling operation.

FIG. 13 illustrates layers of a neural network, and corresponding kernels and weights to configure the neural network for base calling operation. For example, L number of layers 1302a, 1302b, 1302L are illustrated in FIG. 13. Each layer 1302 of FIG. 13 corresponds to a corresponding layer of the neural network, such as any of the neural network illustrated in FIGS. 4, 8, 9, 10, and 11 that is to be used for base calling. Merely as an example, layer 1302a of FIG. 13 may correspond to a layer implementing the first spatial convolution 821 of FIG. 8, layer 1302b of FIG. 13 may correspond to a layer implementing the second spatial convolution 822 of FIG. 8, and so on, and layer 1302L may correspond to a layer implementing the temporal convolution layer 825 of FIG. 8.

In an embodiment, each layer 1302 of FIG. 13 comprises a plurality of filters. For example, filters 13041a, 13042a, . . . , 1304Na of the layer 1302a are illustrated in FIG. 13. The filters 1304 of FIG. 13 correspond to the various filters illustrated in FIG. 11, for example. Similarly, various other layers illustrated in FIG. 13 also includes corresponding filters.

In an embodiment, each filter 1304 comprises a corresponding plurality of kernels 1306 (e.g., see FIG. 11 for example kernels in a filter). For example, kernels 13061a1, 13061a2, . . . , 13061ak of the filter 1304_1a are illustrated in FIG. 13. Similarly, various other filters of FIG. 13 also include corresponding kernels, although such kernels are not illustrated in FIG. 13 for purposes of illustrative clarity. In an example, a kernel can be used in a convolution operation, or another appropriate operation of the neural network that is to be used for base calling.

Each kernel comprises one or more matrices (such as a square matrix), such as a 3×3 matrix or a 4×4 matrix (or a matrix of another appropriate dimension) comprising weight coefficients or weights. For example, example weights W1, W2, . . . , W9 of kernels 1306_1a1 and 13061_NL1 are illustrated in FIG. 13.

Although FIG. 13 does not illustrate biases, in an embodiment, one or more kernels, one or more filters, and/or one or more layers can also be associated with corresponding biases. The weights and biases are loaded in the reconfigurable processor 150 (see FIG. 1) along with a topology of the neural network (e.g., from the memory 104 and/or 160), and the neural network topology loaded within the reconfigurable processor 150 is configured with the weights and biases. The configured neural network is used to process cluster data from flow cells, to generate base call classification, as will be discussed in further detail herein.

In some computing systems, numbers are represented using floating point arithmetic. In floating point arithmetic, a floating-point number is represented with a fixed number of significant digits (the significand) and scaled using an exponent in some fixed base, where the base for the scaling is normally two, ten, sixteen, or the like. A number that can be represented using floating point arithmetic is of the following form: significand×base$^{exponent}$, where the significand is an integer, the base is an integer greater than or equal to two, and exponent is also an integer. For example, 1.2345 is represented as 12345×10$^{-4}$, where 12345 is the significand, 10 is the base, and (−4) is the exponent. The term floating point refers to the fact that a number's radix point (i.e., the decimal point, or, more commonly in computers, the binary point) can "float"—that is, it can be placed anywhere relative to the significant digits of the number. This position is indicated as the exponent component.

In an example, the weights and biases, which are to be uploaded in the configurable processor 150 to configure the neural network for base calling, are not represented using the floating-point arithmetic. For example, the configurable processor 150 may be better equipped to handle weights and biases using fixed point arithmetic, and not floating-point arithmetic. A fixed-point number representation is a real data type for a number that has a fixed number of digits after (and sometimes also before) the radix point, where the radix point (also sometimes referred to as the decimal point '.' in English decimal notation) is the symbol used in numerical representations to separate the integer part of a number (to the left of the radix point) from its fractional part (to the right of the radix point).

In an embodiment, various parameters of the neural network (such as weights and biases) are, thus, represented using fixed point arithmetic, prior to being uploaded to the configurable processor 150. For example, assume 8 binary bits are used to represent individual weights. Depending on where the radix point is placed within the 8 bits, the representation or interpretation of the number changes. For example, of the 8 binary bits used to represent a weight, a MSB (Most Significant Bit) may be reserved for a sign bit (e.g., if the number represents a signed value). The remaining 7 bits can include zero or more integer bits, and zero or more fractional bits, and a sum of the integer and fractional bits is equal to 7. Thus, depending on where the radix point is placed, the number format changes. An 8-bit number in fixed point arithmetic can be represented and interpreted in one of many possible number fixed-point formats, e.g., depending on where the radix point is placed.

FIG. 14 illustrates a table 1400 depicting example 8-bit binary fixed-point formats, at least some of which can be used to represent parameters (e.g., weights and biases) of a neural network for base calling. The table 1400 includes eight rows, each representing a corresponding signed binary fixed-point format.

The fixed-point formats depicted in table 1400 are assumed to be signed fixed-point formats. Thus, a MSB is reserved for a sign bit. For example, an MSB of 1 indicates that the number is negative and an MSB of 0 indicates that the number is positive, while in another example an MSB of 1 indicates that the number is positive and an MSB of 0 indicates that the number is negative.

Although the table 1400 and various other embodiments, examples, and figures of this disclosure assume signed binary fixed-point formats (e.g., where the MSB is reserved for the sign bit), that is not meant to be limiting the scope of this disclosure, and the teachings of this disclosure can also be applicable to unsigned binary fixed-point formats (e.g., where the MSB is not reserved for the sign bit). Thus, in another example, one or more unsigned binary fixed-point formats may also be used for representing various parameters (such as weights and biases) of a neural network for base calling.

Referring again to the table 1400, in addition to the MSB sign bit, there are seven more bits to indicate a value of a parameter, where the seven bits include (i) zero or more integer bits and (ii) zero or more fractional bits. As shown in the drawing legend, the sign bit in the various formats is represented using a checkered box, the zero or more integer bits are represented using diagonal boxes, and the zero or more fractional bits are represented using dotted boxes. In each fixed-point format in table 1400, a black circle represents the radix point or decimal separator between the integer and fractional bits.

The first column of the table 1400 graphically illustrates the various fixed-point formats, and the second column of the table 1400 indicates the names of the fixed-point formats. The format name is generally indicated as Sa.b, in which "S" indicates that this is a signed number format where the MSB is reserved for sign bit. The phrase "a" in a Sa.b format indicates a number of integer bits in the format (where "a" can range from 0 to 7), and the phrase "b" in a Sa.b format indicates a number of fractional bits in the format (where "b" can also range from 7 to 0). In the example where the total number of bits is assumed to be 8, the sum of "a" and "b" is always equal to 7 (as the sign bit consumes one bit, the remaining seven bits are shared between the integer bits and the fractional bits).

Referring now to the first row of the table 1400, illustrated is a S0.7 fixed-point format, in which "S" indicates that this is a signed number format where the MSB is reserved for sign bit. The number "0" in the S0.7 format indicates that there is zero number of integer bit, and the number "7" in the S0.7 format indicates that there are seven number of fractional bits in this format. Thus, there are a total of 7 integer and fractional bits, and one sign bit in this 8-bit fixed point format. Here the radix point is immediately after the sign bit, thereby indicating that there are no integer bits in this format.

Referring now to the second row of the table 1400, illustrated is a S1.6 fixed-point format, in which "S" indicates that this is a signed number format where the MSB is reserved for sign bit. Furthermore, there is a single integer bit, and six fractional bits in this format. Thus, there are a total of 7 integer and fractional bits, and one sign bit in this 8-bit fixed point format. Here the radix point is after the sign bit and after the one integer bit.

Referring now to the third row of the table 1400, illustrated is a S2.5 fixed-point format, in which "S" indicates that this is a signed number format where the MSB is reserved for sign bit. Furthermore, there are two integer bit, and five fractional bits in this format. Thus, there are a total of 7 integer and fractional bits, and one sign bit in this 8-bit fixed point format. Here the radix point is after the sign bit and after two integer bits.

Referring now to the fourth row of the table 1400, illustrated is a S3.4 fixed-point format, in which "S" indicates that this is a signed number format where the MSB is reserved for sign bit. Furthermore, there are three integer bit, and four fractional bits in this format. Thus, there are a total of 7 integer and fractional bits, and one sign bit in this 8-bit fixed point format. Here the radix point is after the sign bit and after three integer bits.

The various other fixed-point formats in the table 1400 (such as S4.3, . . . , S7.0) will be readily understood by those skilled in the art, based on the teachings of this disclosure.

Note that the numbers in any given fixed-point format can be stored in two's complement format. For a given signed binary fixed-point format Sa.b (e.g., where there are a number of integer bits and b number of fractional bits), a range of the format is given by:

$$\text{Range}=[-(2^a);(2^a-2^{-b})].\qquad\text{Equation 1}$$

Thus, a maximum value that can be represented by the format Sa.b is (2a-2-b), and a minimum value that can be represented by the format Sa.b is (−2a).

Also, a resolution of a given signed binary fixed-point format Sa.b (where the resolution is a smallest step or difference between two consecutive numbers, and is represented by a value of the LSB) is given by:

$$\text{Resolution}=2^{-b}.\qquad\text{Equation 2}$$

Equations 1 and 2 are derived from "Fixed Point Representation & Fractional Math," by Oberstar, Erick L. (Aug. 30, 2007), retrieved from http://www.superkits.net/whitepapers/Fixed %20Point%20Representation%20&%20Fractional% 20Math.pdf on Mar. 8, 2021, which is incorporated by reference, as if fully set forth herein. Third and fourth columns of the table 1400 provide a range (e.g., a lower and an upper range, respectively) of the various formats, and a fifth column of the table 1400 provides a resolution of the various formats.

Thus, referring to the first row of the table 1400 (i.e., the S0.7 format, where a=0, b=7), a lower range is given by −20, or −1; and an upper range is given by (20-2-7)=(1-0.0078125)=0.9921875. Also, the resolution for this format is given by 2-7, or 0.0078125. There are 256 possible values within the range specified for S0.7 format, in steps of 0.0078125.

Similarly, referring to the second row of the table 1400 (i.e., the S1.6 format, where a=1, b=6), a lower range is given by −21, or −2; and an upper range is given by (21-2-6)=0.984375. Also, the resolution for this format is given by 2-6, or 0.015625. There are 256 possible values within the range specified for S0.7 format, in steps of 0.015625.

Note that for a given format, the corresponding resolution represents a maximum possible quantization error, when a parameter is quantized in accordance with the format (e.g., assuming that the parameter fits within the range of the format). Thus, if a parameter that is between −1 and 0.9921875 is quantized in accordance with the format S0.7, the maximum possible quantization error is 0.0078125.

Ranges and resolutions for various other formats are similarly calculated and illustrated in the table 1400.

Thus, referring to the table 1400, as the number of integer bits in the fixed-point format increase, a range of the format correspondingly increase. However, such as increase in the range is accompanied by a corresponding decrease in precision.

For example, the range of the S1.6 format is (−2, 1.984375), which is higher than the range (−1, 0.9921875) of the S0.6 format. However, the resolution of the S1.6 format is 0.015625, which is lower than the resolution 0.0078125 of the S0.7 format. Thus, an improvement in the range in the S1.6 format relative to the S0.7 format is accompanied by a sacrifice in the resolution.

Assume each of two neural network parameters, such as each of two example weights Wex1 and Wex2, is to be quantized using a corresponding appropriate fixed-point format illustrated in table 1400. Because each weight is to be quantized using a corresponding format, the formats illustrated in FIG. 14 are also referred to as quantization formats. Assume that the weight Wex1 of the neural network for base calling has a decimal value of 0.7, and assume that the weight Wex2 of the neural network for base calling has a decimal value of 1.5.

The weight Wex1 falls within the range of each of the eight quantization formats illustrated in FIG. 14, and accordingly, can be quantized in accordance with any of the formats. However, if the weight Wex1 is quantized with a format that has a relatively higher number of integer bits, a corresponding quantization error may be large. Merely as an example, if the weight Wex1 having the value of 0.7 is quantized using S7.0 format, the value of the weight in this format would be rounded off to 1, with a relatively large quantization error of 0.3. In contrast, quantizing the weight Wex1 in the S0.7 format may result in least quantization error (e.g., as the resolution for this format is the lowest). Accordingly, the weight Wex1 having the example value of 0.7 can be optimally quantized in accordance with the quantization format S0.7.

On the other hand, the weight Wex2 having the example value of 1.5 falls within the range of formats S1.6, S2.5, S3.4, and so on, but is outside the range of the format S0.7 (note that the allowed range of S0.7 is −1 to 0.9921875). Thus, if the weight Wex2 having the example value of 1.5 is quantized in accordance with format S0.7, the weight Wex2 would have to be saturated to the 0.9921875. Accordingly, a quantization noise for quantizing the weight Wex2 to format S0.7 would be (1.5−0.9921875), or 0.5078125. On the other hand, if the weight Wex2 is quantized in accordance with the format S1.6, the weight Wex2 would fit within the allowed range for this format and the maximum quantization error would be 0.015625. Furthermore, if the weight Wex2 is quantized in accordance with the format S2.5, the weight Wex2 would fit within the allowed range for this format but the quantization error might be as high as 0.03125. Accordingly, in an example, the weight Wex2 having the example value of 1.5 can be optimally quantized in accordance with the quantization format S1.6 (e.g., the weight Wex2 fits within the range of format S1.6, and the format S1.6 has minimum possible quantization error among all formats having ranges that fit this weight).

Generally speaking, given an example weight Wex, an appropriate (e.g., optimal) quantization format to quantize the weight Wex can be selected based on the ranges and the resolutions depicted within the table 1400. For example, given the example weight Wex, an absolute value of the weight |Wex| is calculated, and a next higher power of 2, that is higher than and closest to the absolute value of the weight |Wex|, is determined. For example, assume that the next higher power of 2, which is higher than the absolute value |Wex|, is $2^P$. Then a weight having a format SP.(T-P-1) is selected, where T is a total number of bits used in the quantization format, and the format is assumed to represent signed values. When expressed as an equation, the selected format is:

Selected format for Weight $Wex=SP.(T-P-1)$, where the $2^P$ is a next higher power of 2 relative to |Wex|, and $T$ is a total number of bits in the selected format.     Equation 3

For example, assume that Wex is 1.5. The power of 2, that is higher than and nearest to 1.5, is $2^1$, or 2 (i.e., P=1). Also assuming that a 8-bit signed quantization format is to be used, the quantization format selected for this value of Wex is S1.(8-1-1), or S1.6. Note that $2^2$ or 4 is also a power of 2 that is higher than 1.5—but this is not the power of 2 that is higher than and "nearest" to 1.5. Rather, $2^1$ or 2 is the power of 2 is higher than and nearest to 1.5.

In another example, assume that Wex is −5.5. The power of 2, that is higher than but nearest to |−5.5|, is $2^3$, or 8 (i.e., P=3). Also assuming that a 8-bit signed quantization format is to be used, the quantization format selected for this value of Wex is S3.(8-3-1), or S3.4.

In yet another example, assume that Wex is 105.5. The power of 2, that is higher than but nearest to 105.5, is $2^7$, or 128 (i.e., P=7). Also assuming that a 8-bit signed quantization format is to be used, the quantization format selected for this value of Wex is S7.(8-7-1), or S7.0.

If, however, the value of the weight Wex is higher than 127, then the format S0.7 can be used for this weight, and the weight Wex saturates to 127.

Figure 15B:
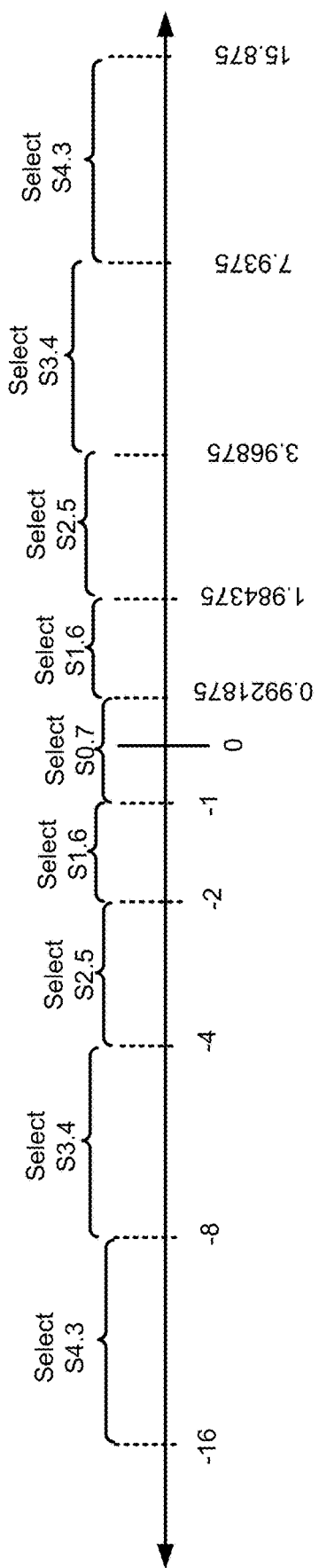
FIG. 15B illustrates a scale that represents at least some information of the LUT of FIG. 15A.

Thus, in some embodiments, equation 3 can be used to select an appropriate quantization format for a neural network parameter (such as a weight or a bias). In some other embodiments, instead of (or in addition to) using equation 3, a lookup table can also be used to select an appropriate quantization format for the neural network parameter, where the lookup table can be generated from the table 1400 of FIG. 14. FIG. 15A illustrates a Look-Up Table (LUT) 1500 usable to select a quantization format for a corresponding neural network parameter, and FIG. 15B illustrates a scale that represents at least some information of the LUT 1500 of FIG. 15A. The neural network parameter can be a weight or a bias that is to be used to configure the neural network for base calling. The sixth column of the LUT 1500 of FIG. 15A represents ranges corresponding to the formats depicted in the first and second columns of the LUT 1500. LUT 1500 is generated from the table 1400 of FIG. 14, by adding the sixth column to the table 1400.

For example, referring to the first row of the LUT 1500 of FIG. 15A, the format S0.7 is to be selected if the neural network parameter is within the range −1 to 0.9921875. Referring to the second row of the LUT 1500 of FIG. 15A, the format S1.6 is to be selected if the neural network parameter is within either of the range −2 to −1, or within the range 0.9921875 to 1.984375, as also depicted in FIG. 15B. Referring to the third row of the LUT 1500 of FIG. 15A, the format S2.5 is to be selected if the neural network parameter is within either of the range −4 to −2, or within the range 1.984375 to 3.96875, as also depicted in FIG. 15B. Other ranges for other formats are also illustrated in FIGS. 15A and 15B. Note that FIG. 15B is not drawn to the scale, and only a few ranges are illustrated in FIG. 15B for purposes of illustrative clarity.

FIG. 15C illustrates another LUT 1550 usable to select a quantization format for a corresponding absolute value of a neural network parameter. Thus, while the sixth column of the LUT 1500 of FIG. 15A included both positive and negative ranges, the sixth column of the LUT 1550 of FIG. 15C includes only positive ranges and assumes that an absolute value of the neural network parameter is assumed when using the LUT 1550. Note that the sixth column of LUT 1550 is an approximation of the sixth column of the LUT 1500. Merely as an example, referring to the fourth row of tables 1500 and 1550, the actual optimal range for the format S3.4 is −4 to −8, and from 3.96875 to 7.9375, as depicted in the LUT 1500 of FIG. 15A. However, this is approximated to an absolute value range of 4 to 8 in the LUT 1550 of FIG. 15C. Thus, for example, a neural network parameter having a value of 7.99 would be assigned the format S4.3 in accordance with LUT 1500 of FIG. 15A, but would be assigned the format S3.4 in accordance with LUT 1550 of FIG. 15C. The choice of whether to use the LUT 1500 or 1550 is implementation specific. For example, the slight loss in accuracy in using LUT 1550 over LUT 1500 is compensated by the ease of use of the LUT 1550. In an example, where high accuracy is desired, the LUT 1500 of FIG. 15A may be used; and where ease of use is desired, the LUT 1550 of FIG. 15C may be used. Note that the sixth column of the LUT 1550 of FIG. 15C can also be derived using the above discussed equation 3.

FIG. 15D illustrates yet another LUT 1570 usable to select a quantization format for a corresponding absolute value of a neural network parameter. Thus, while the sixth column of the LUT 1500 of FIG. 15A included both positive and negative ranges, the sixth column of the LUT 1570 of FIG. 15D includes only positive ranges and assumes that an absolute value of the neural network parameter is assumed when using the LUT 1570. There is a slight difference between the ranges presented in the sixth columns of LUTs 1550 and 1570 of FIGS. 15C and 15D, respectively. For example, in FIG. 15D, a range in the sixth column for a specific format is based on an actual upper range of the format depicted in the fourth column of the LUT 1570.

Thus, in an example, equation 3 and/or any of the LUTs 1500, 1550, or 1570 are to be used to select an appropriate (e.g., optimal) quantization format for a given neural network parameter (e.g., a weight or a bias to be used to configure the neural network), and the choice of equation 3 or any of the LUTs is implementation specific.

Figure 16:
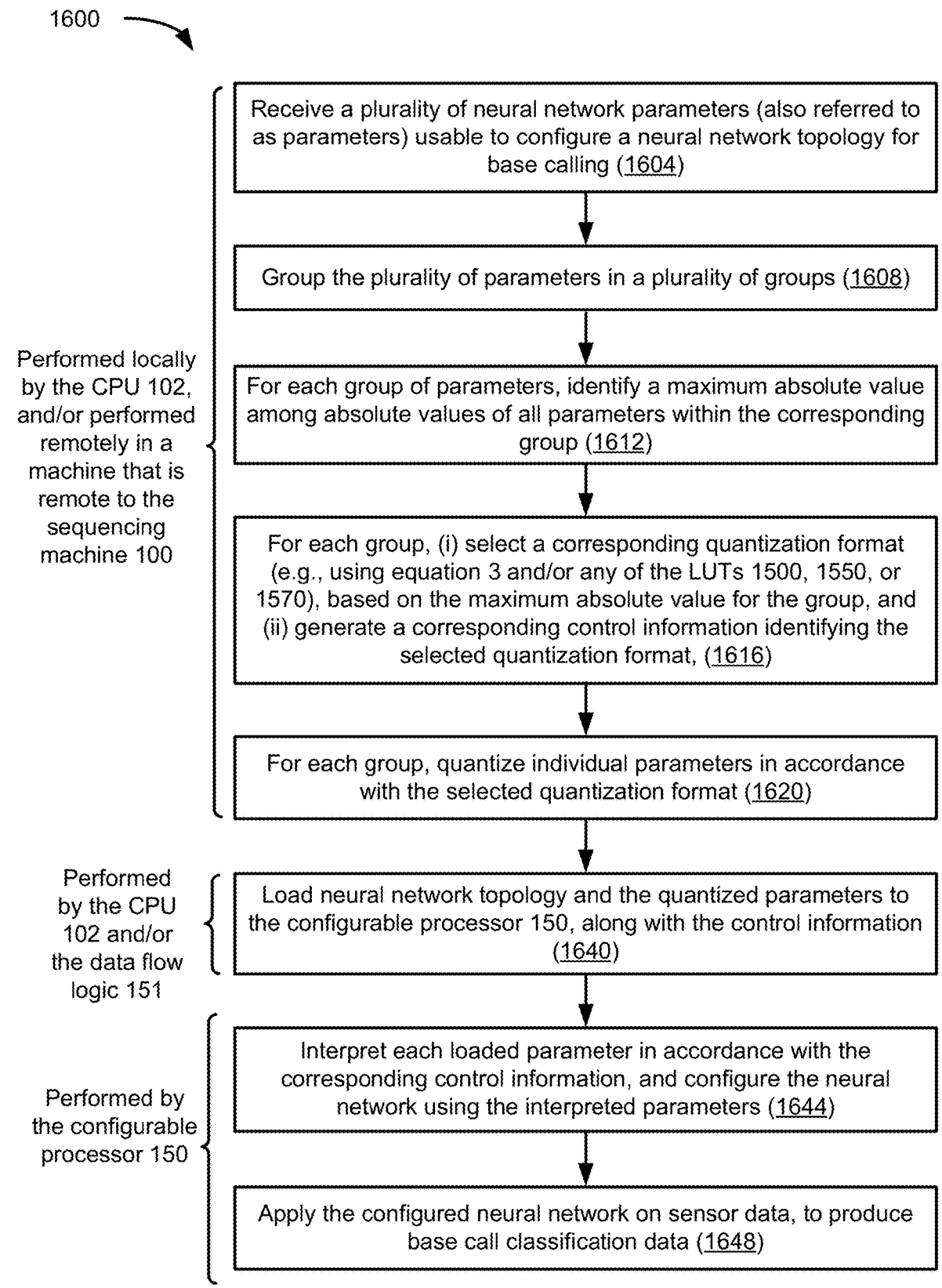
FIG. 16 illustrates a flowchart depicting a method for grouping of neural network parameters, selecting appropriate quantization formats for individual groups, quantizing the neural network parameters of each group in accordance with the corresponding selected quantization format, and using the quantized neural network parameters to configure a neural network topology for base calling.

FIG. 16 illustrates a flowchart depicting a method 1600 for grouping of neural network parameters, selecting appropriate (e.g., optimal) quantization formats for individual groups, quantizing the neural network parameters of each group in accordance with the corresponding selected quantization format, and using the quantized neural network parameters to configure a neural network topology for base calling.

Operations 1604 to 1620 of the method 1600 can be performed by the CPU 102 (see FIG. 1) and/or by a remote computing machine (e.g., hosted by a deep learning cloud platform) that is remotely located relative to the sequencing machine 100. In a first example, solely the CPU 102 can perform the operations 1604-1620. In a second example, solely the remote computing machine can perform the operations 1604-1620.

In a third example, the CPU 102 and the remote computing machine can perform the operations 1604-1620 (e.g., some of the operations are performed by the remote computing machine, while some other operations are performed by the CPU 102). Merely as an example, operations 1604-1616 (e.g., where quantization formats are selected, and corresponding control information are generated) can be performed by the remote computing machine, while operation 1620 (e.g., where the actual quantization is performed) can be performed by the CPU 102 in the local machine. In yet another example, operations 1604-1608 (e.g., grouping of parameters) can be performed by the remote computing machine, while operations 1612-1610 can be performed by the CPU 102 in the local machine. Any other combination of division of operations between the remote and the local machine is also possible.

In an embodiment, one or more of the operations 1604-1620 are performed by quantization logic being executed by the CPU 102 or by the remote computing machine.

At 1604 of the method 1600, a plurality of neural network parameters (also referred to simply as parameters) are received, where the parameters are usable to configure a neural network topology for base calling. Example of the parameters include weights and biases, as discussed. In an embodiment, the parameters can be generated and tuned by training a neural network for base calling Training of a neural network for base calling, to generate neural network parameters such as weights and biases, are discussed in further detail in U.S. Nonprovisional patent application Ser. No. 16/825,987, titled "TRAINING DATA GENERATION FOR ARTIFICIAL INTELLIGENCE-BASED SEQUENCING," filed 20 Mar. 2020, which is incorporated by reference as if fully set forth herein.

As discussed above, the parameters can be either received by the CPU 102 within the sequencing machine 100, or by the remote computing machine. In an example where the CPU 102 receives the parameters, the CPU 102 can access a memory storing the parameters, such as the memory 104 (or memory 160). In another example, the parameters can be received by the CPU 102 from the remote computing machine over a network, such as the Internet.

Figure 17:
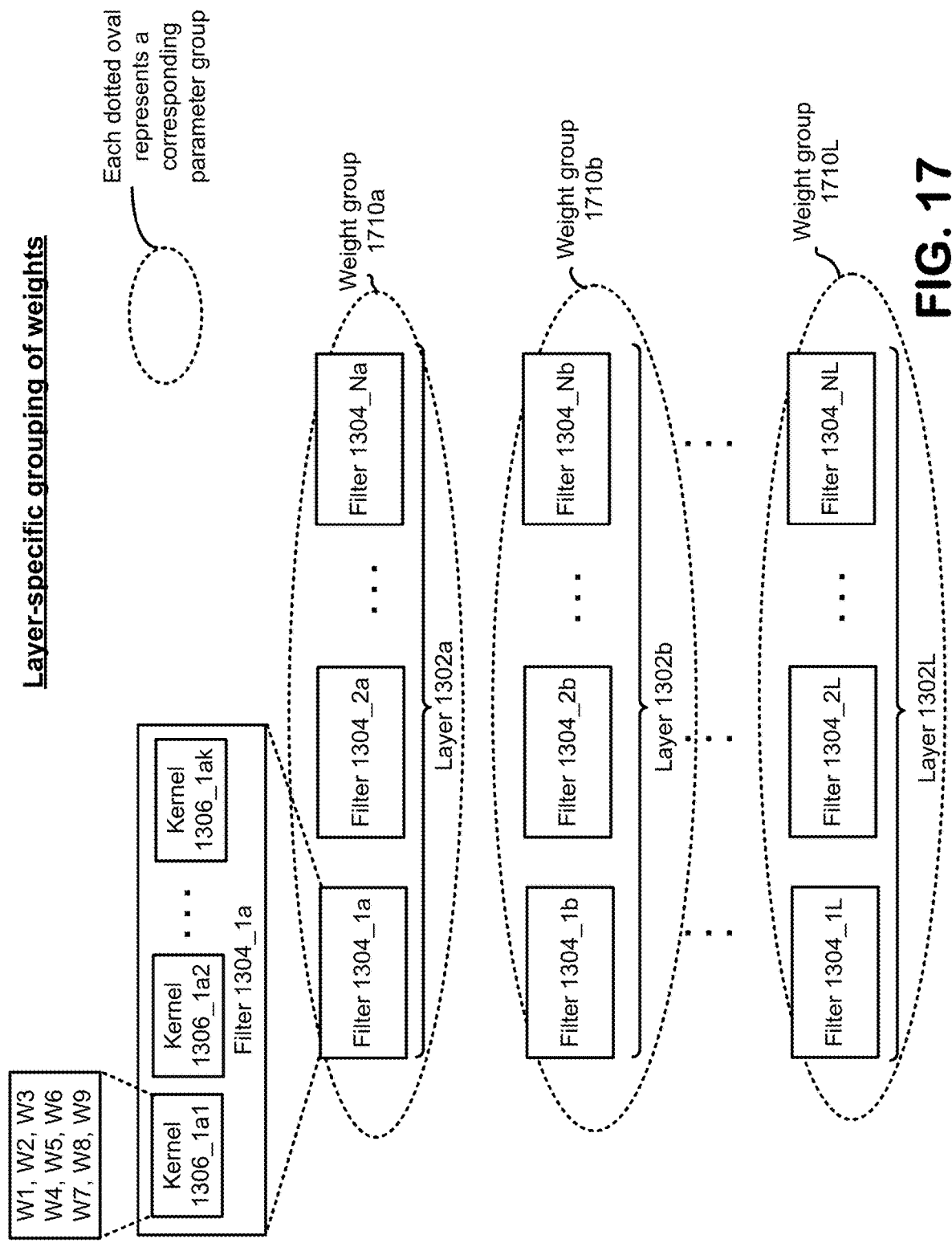
FIG. 17 illustrates an example layer-specific grouping of neural network parameters.
Figure 18:
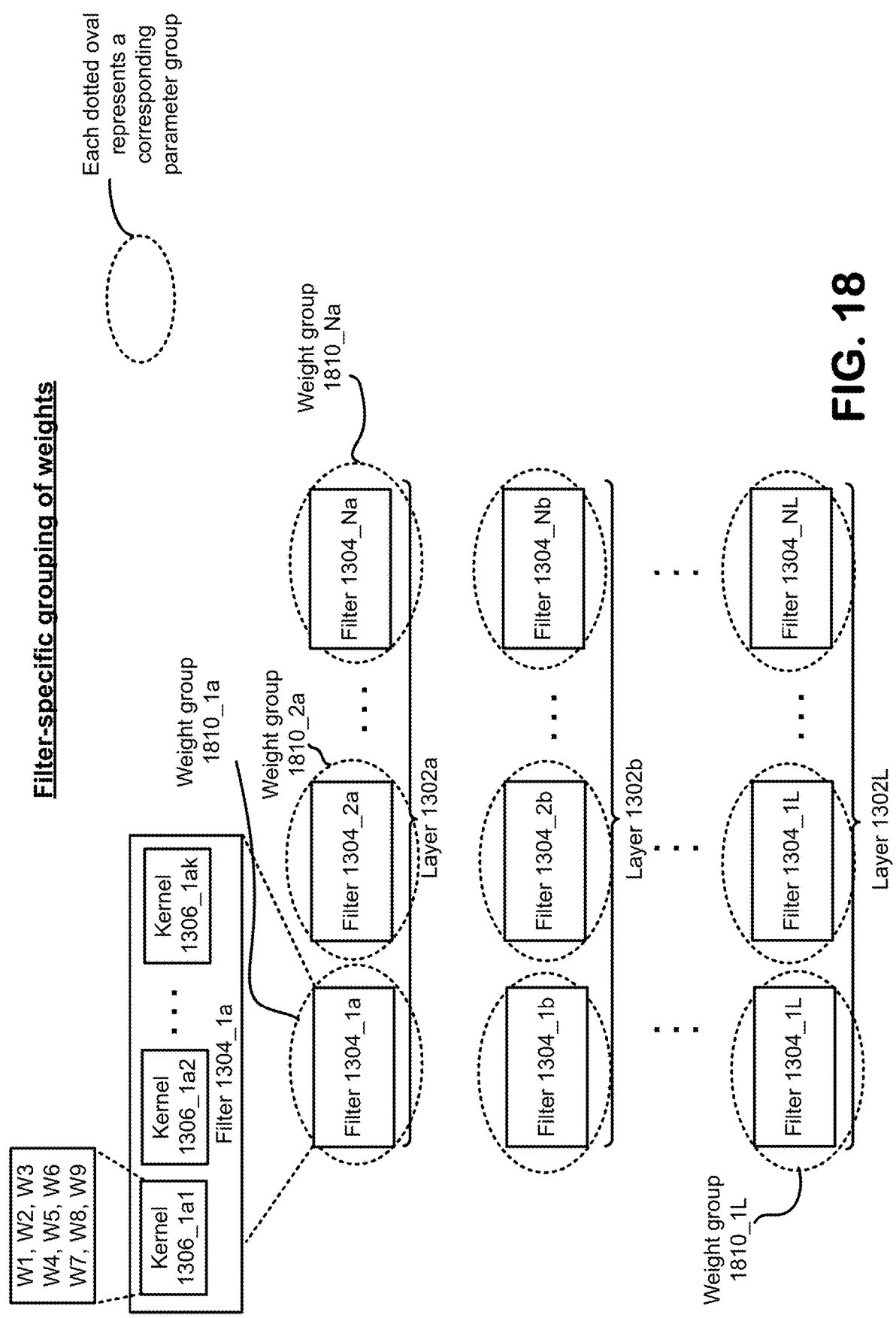
FIG. 18 illustrates an example filter-specific grouping of neural network parameters.
Figure 19:
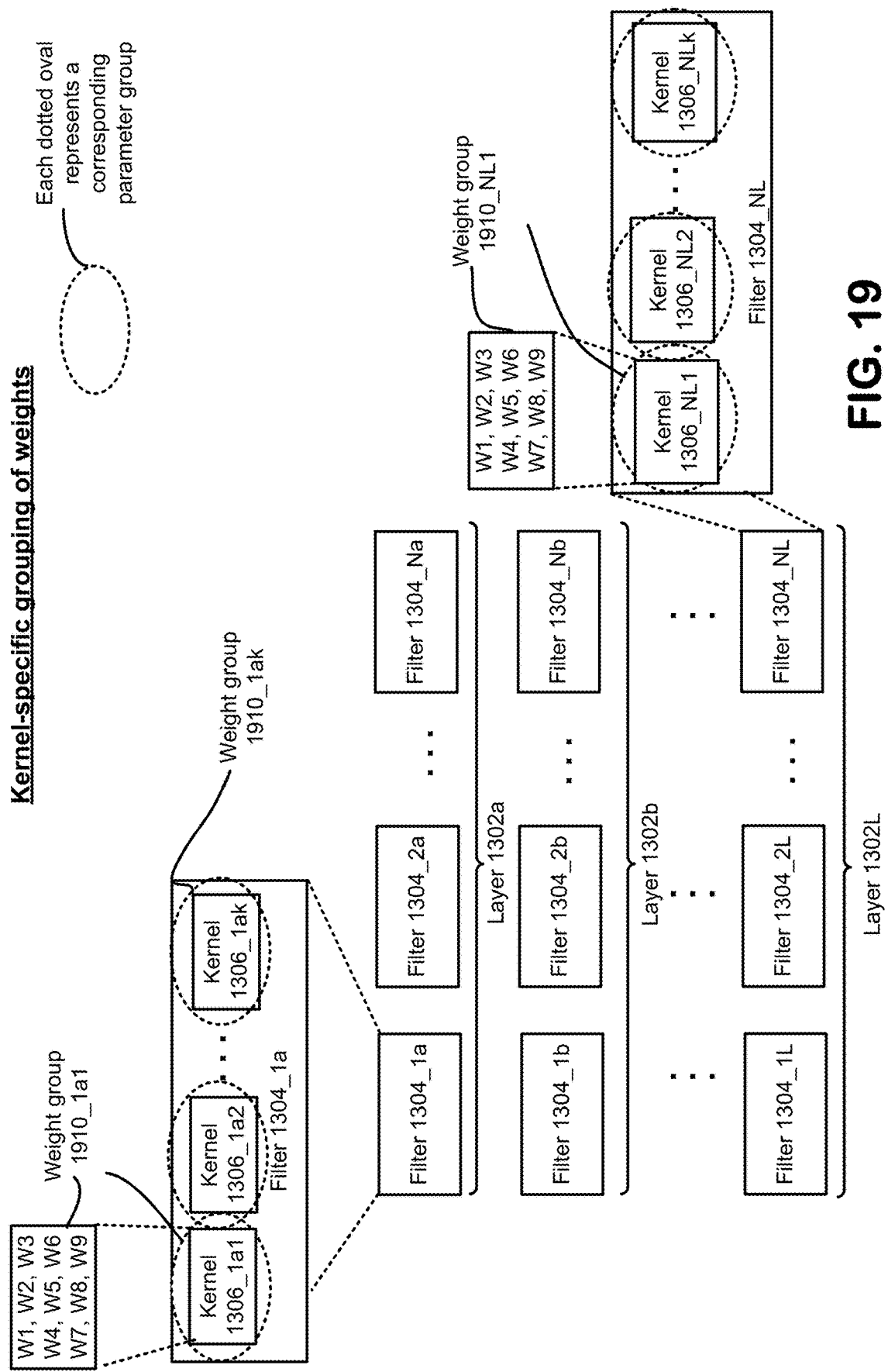
FIG. 19 illustrates an example kernel-specific grouping of neural network parameters.

The method 1600 then proceeds from 1604 to 1608, where the plurality of parameters is grouped in a plurality of groups. Any appropriate criteria may be used to group the parameters. For example, FIG. 17 illustrates an example layer-specific grouping of neural network parameters, FIG. 18 illustrates an example filter-specific grouping of neural network parameters, and FIG. 19 illustrates an example kernel-specific grouping of neural network parameters. Although FIGS. 17-19 illustrate grouping of weights (i.e., specifically discusses weights as an example of neural network parameters), the teachings of these figures can be applied to other types of neural network parameters as well, such as biases.

Referring to each of FIGS. 17, 18, and 19, the topology of the neural network for base calling comprises a plurality of layers, such as layers 1302*a*, 1302*b*, . . . , 1302L, as also discussed in further detail with respect to FIG. 13. Each layer 1302 comprises a plurality of filters 1304, and each filter 1304 comprises a plurality of kernels 1306, and each kernel comprises a plurality of weights (e.g., the figures illustrate an example kernel 1306_1*a*1 comprising weights W1, . . . , W9), as discussed in further detail with respect to FIG. 13. In each of FIGS. 17-19, each dotted oval shape encompasses components including a corresponding group of weights.

Now referring to the example of FIG. 17, the weights of the neural network topology are grouped in accordance with corresponding layers in which the weights are included. For example, weights of layer 1302*a* are grouped in a first weight group 1710*a*, weights of layer 1302*b* are grouped in a second weight group 1710*b*, weights of layer 1302L are grouped in a Lth weight group 1710L, and so on. Thus, for example, weights of each kernel included in each filter of the layer 1302*a* are grouped in the first weight group 1710*a*, weights of each kernel included in each filter of the layer 1302*b* are grouped in the second weight group 1710*b*, and so on.

Now referring to the example of FIG. 18, the weights of the neural network topology are grouped in accordance with corresponding filters in which the weights are included. For example, weights of various kernels included in a filter 1304_1*a* of the layer 1302*a* are grouped in a corresponding weight group 1810_1*a*, weights of various kernels included in a filter 1304_2*a* of the layer 1302*a* are grouped in a corresponding weight group 1810_2*a*, weights of various kernels included in a filter 1304_N*a* of the layer 1302*a* are grouped in a corresponding weight group 1810_N*a*, weights of various kernels included in a filter 1304_1L of the layer 1302L are grouped in a corresponding weight group 1810_1L, and so on. Thus, weights of kernels of each filter 1304 are grouped in a corresponding specific weight group.

Now referring to the example of FIG. 19, the weights of the neural network topology are grouped in accordance with corresponding kernels in which the weights are included. For example, weights of a kernel 1306_1*a*1 included in a filter 1304_1*a* of the layer 1302*a* are grouped in a corresponding weight group 1910_1*a*1, weights of a kernel 1306_1*ak* included in the filter 1304_1*a* of the layer 1302*a* are grouped in a corresponding weight group 1910_1*ak*, weights of a kernel 1306_NL1 included in a filter 1304_NL of the layer 1302L are grouped in a corresponding weight group 1910_NL1, and so on. Thus, weights of each kernel are grouped in a corresponding weight group.

Thus, FIGS. 17-19 illustrate example ways to group the weights. There may be other criteria for grouping the weights. For example, weights to process data from a first channel can be grouped in a first group, weights to process data from a second channel can be grouped in a second group, and so on.

In FIG. 17 where a layer-specific weight grouping is done, each weight group includes a relatively higher number of weights. In contrast, In FIG. 19 where a kernel-specific weight grouping is done, each weight group includes a relatively smaller number of weights. In FIG. 18 where a filter-specific weight grouping is done, each weight group includes a relatively moderate number of weights. Thus, referring again to 1608 of FIG. 16, the manner in which the grouping is done can dictate a number of parameters included in each group, and the grouping criteria can be implementation specific. Further discussion on grouping criteria will be presented herein later in turn.

Figure 20:
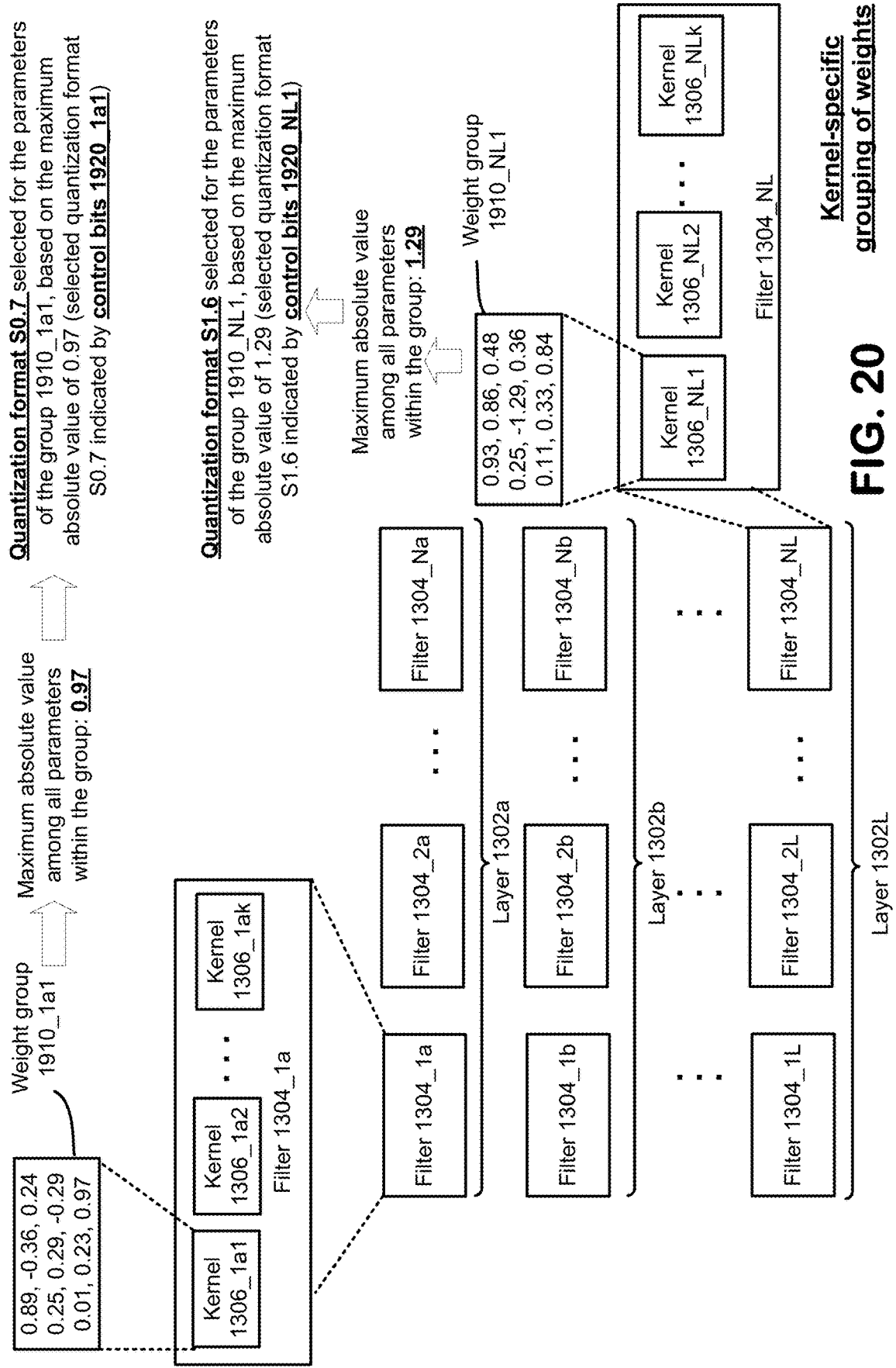
FIG. 20 illustrates a kernel-specific grouping of neural network parameters, where a parameter that has a maximum absolute value among all parameters within a corresponding group is identified.

The method 1600 then proceeds from 1608 to 1612, where for each group of parameters, a maximum absolute value among absolute values of all parameters within the corresponding group is identified. For example, FIG. 20 illustrates a kernel-specific grouping of neural network parameters (e.g., similar to FIG. 19), where a parameter that has a maximum absolute value among all parameters within a corresponding group is identified. In FIG. 20, example weights of weight groups 1910_1a1 and 1910_NL1 are illustrated. For example, the weight group 1910_1a1 comprises weights of the kernel 1306_1a1, and the weight group 1910_NL1 comprises weights of the kernel 1306_NL1. In the example of FIG. 20, the example weights of the example weight group 1910_1a1 are 0.89, −0.36, 0.24, 0.25, 0.29, −0.29, 0.01, 0.23, and 0.97. The example weights of the example weight group 1910_NL1 are 0.93, 0.86, 0.48, 0.25, −1.29, 0.36, 0.11, 0.33, and 0.84. Thus, weights of the two weight groups are generally between −1 to +1. However, there is one weight in the weight group 1910_NL1 having value −1.29, which may be considered an outlier.

Referring to FIGS. 16 and 20, at 1612 of method 1600, a maximum absolute value among absolute values of all parameters within the group 1910_1a1 is identified as 0.97, and a maximum absolute value among absolute values of all parameters within the group 1910_NL1 is identified as 1.29.

The method 1600 of FIG. 16 then proceeds from 1612 to 1616, where for each group, (i) a corresponding quantization format is selected (e.g., using equation 3 and/or any of the LUTs 1500, 1550, or 1570), based on the maximum absolute value for the group, and (ii) corresponding control information identifying the selected quantization format is generated.

In an example, quantization parameters (e.g., which may be stored in a memory that is either coupled to the CPU 102 or the remote computing machine) stores indication of a plurality of possible or available quantization formats in which the parameters can possibly be quantized. At 1616, the quantization logic (e.g., being executed either by the CPU 102 or by the remote computing machine) selects, for each group, a corresponding quantization format from the plurality of available quantization formats, based on the maximum absolute value for the group.

For example, referring to FIGS. 16 and 20, for the group 1910_1a1, the quantization format is selected based on the maximum absolute value for the group 1910_1a1, where the maximum absolute value for the group 1910_1a1 is 0.97. Now, any of equation 3, or LUTs 1500, 1550, or 1570 can be used to select a quantization format for the parameters of the group 1910_1a1. As discussed with respect to equation 3 and as illustrated in the LUTs 1500, 1550, and 1570, the quantization format corresponding to the parameter value 0.97 is S0.7 format, and accordingly, quantization format S0.7 is selected for all the parameters of the group 1910_1a1.

On the other hand, for the group 1910_NL1, the quantization format is selected based on the maximum absolute value for the group 1910_NL1, where the maximum absolute value for the group 1910_NL1 is 1.29. Now, any of equation 3, or LUTs 1500, 1550, or 1570 can be used to select a quantization format for the parameters of the group 1910_NL1. As discussed with respect to equation 3 and as illustrated in the LUTs, the quantization format corresponding to the parameter value 1.29 is S1.6 format, and accordingly, quantization format S1.6 is selected for all the parameters of the group 1910_NL1.

Furthermore, for each group, control information identifying the selected quantization format is generated. For example, control bits 1920_1a1 are generated that identifies the selected quantization format S0.7 for the group 1910_1a1. Similarly, control bits 1920_NL1 are generated that identifies the selected quantization format S1.6 for the group 1910_NL1. In a similar manner, quantization formats are selected for various other parameter groups, and corresponding control information identifying the selected quantization formats are also generated.

The method 1600 of FIG. 16 then proceeds from 1616 to 1620, where for each group, individual parameters within the group are quantized in accordance with the selected quantization format. For example, referring to FIG. 20, the weights in the weight group 1910_1a1 may be initially (e.g., prior to operations 1620 of FIG. 16) in a prequantized number format, such as a floating-point format or another appropriate number format. That is, prior to operations 1620, the weights are prequantized weights (i.e., the weights have not been quantized yet, and the prequantized weights are in an appropriate prequantized number format). At 1620 of the method 1600, the weights of the weight group 1910_1a1 are quantized in accordance with the quantization format S0.7 selected for that group.

Similarly, the weights in the weight group 1910_NL1 may be initially in a floating-point format (or another appropriate number format). At 1620 of the method 1600, the weights of the weight group 1910_NL1 are quantized in accordance with the quantization format S1.6 selected for that group.

It is to be noted that although FIG. 20 is used as an example to illustrate various operations of the method 1600 (such as operations 1616, 1620), the specific examples illustrated in FIG. 20 are not intended to limit the scope of this disclosure. For example, although FIG. 20 illustrates a kernel-specific grouping, another appropriate grouping may be used, such as a layer-specific grouping (see FIG. 17), a filter-specific grouping (see FIG. 18), or grouping based on another appropriate criteria (e.g., channel-specific grouping). Moreover, although FIG. 20 illustrates weights, the grouping and quantization is not limited to neural network weights, and the teachings of this disclosure is applicable to other types of neural network parameters, such as biases.

Although not illustrated in FIG. 16, in an embodiment, one or more configuration files are generated (e.g., either by the CPU 102, or by the remote computing machine) after the operations 1620, where a configuration file that includes quantized parameters and/or the corresponding control information of one or more groups. For example, a runtime logic or runtime program (discussed herein earlier) being executed in the CPU 102 generates the configuration file(s) that includes the quantized parameters of individual groups, as well as the control information for the individual groups.

It may be noted that a quantization format selected for a group is applicable to all parameters of the group. For example, for the group 1910_NL1, ideally, the format S1.6 is optimal for the weight −1.29, and the format S0.7 is optimal for the remaining weights. However, if individual weights of the group 1910_NL1 are to be assigned corresponding different quantization formats, then each weight of the group has to have corresponding control bits, which will increase the control signal overhead. Accordingly, instead of selecting individual formats for individual weights in a group, the entire group is assigned a common quantization format, thereby decreasing the control signal overhead. All weights in the group 1910_NL1 are to be quantized in accordance with the selected quantization format for the group 1910_NL1.

Furthermore, increasing the number of parameters in each group decreases the control signal overhead, but may result in larger quantization errors. For example, even if a single outlier parameter within a large group has a relatively high absolute value, to fit the single outlier parameter within a range of a format, a format with higher number of integer bits is to be selected for the entire group, and as seen in FIG. 14, quantization error (e.g., resolution) increases with an increase in the number of integer bits in the selected format. Thus, increasing the number of parameters in each group increases possibility of larger overall quantization errors. On the other hand, decreasing the number of parameters in each group increases the control signal overhead (e.g., as control information has to be generated for each group), but may result in smaller overall quantization errors. Thus, a decision on a size of the group (e.g., whether to select the layer-specific larger group of FIG. 17, to select the filter-specific moderate-sized group of FIG. 18, or to select the kernel-specific smaller group of FIG. 19) may be based on a desired level of control signal overhead and/or desired level of quantization error, and may be implementation specific.

Referring again to the method 1600 of FIG. 16, subsequent to 1620, the method 1600 proceeds to 1640. It may be noted that in case the operations 1604-1620 are performed remotely by a remote computing machine, the quantized weights at the end of operations 1620 are transmitted from the remote computing machine to the sequencing machine 100, and stored within the memory 103 and/or memory 160.

Operation 1640 is performed by the CPU 102 and/or the data flow logic 151 (see FIG. 1). At 1640, the neural network topology (e.g., that is to be used for base calling) and the quantized parameters are loaded to the configurable processor 150, along with the control information. In an embodiment, loading the quantized parameters and the control information involves loading the configuration file(s) that includes the quantized parameters and the associated control information.

The method 1600 then proceeds from 1640 to 1644, where each loaded parameter is interpreted in accordance with the corresponding control information (e.g., within the configurable processor 150), and the neural network is configured using the interpreted parameters.

Note that each quantized parameter is a corresponding 8-bit binary number (e.g., assuming that 8-bit quantization formats are used), and without the control information, the 8-bit binary numbers are meaningless. For example, 11111111 quantized with a S0.7 format is different from 11111111 quantized with a S1.6 format (e.g., the radix or decimal points for these two different formats are placed at different corresponding positions). Thus, a mere 11111111, without accompanying control information indicating the format used for associated quantization, would not convey any meaningful information. Accordingly, at 1640, for each parameter group, the corresponding control information identifying the corresponding selected quantization format is also loaded in the configurable processor 150; and at 1644, the parameters are interpreted using the corresponding control information.

For example, the various 8-bit numbers representing the weights of the weight group 1910_1a1 were quantized using the format S0.7, and the corresponding control bits 1920_1a1 identify the format S0.7. Accordingly, at 1644, the 8-bit weights of the weight group 1910_1a1 are interpreted in accordance with the format S0.7. For example, when processing the 8-bit weights of the weight group 1910_1a1, the configurable processor 150 knows that for each 8-bit weight in this group, the MSB is the sign bit, the radix or decimal point is immediately after the sign bit, and the remaining 7 bits are fractional bits (e.g., see first row of FIG. 15A)—the configurable processor 150 interprets and processes the 8-bit weights of this group accordingly.

On the other hand, when processing the 8-bit weights of the weight group 1910_NL1 that were quantized in accordance with the format S1.6 (see FIG. 20), the configurable processor 150 knows that for each 8-bit weight in this group, the MSB is the sign bit, followed by an integer bit, then the radix or decimal point, and the remaining 6 bits are fractional bits (e.g., see second row of FIG. 15A)—the configurable processor 150 interprets and processes the 8-bit weights of this group accordingly.

Thus, when interpreting and processing weights of a specific group, the configurable processor 150 shifts the radix point of the weights, based on the associated control information. For example, when processing weights of the group 1910_1a1 that is quantized in accordance with the format S0.7, the configurable processor 150 shifts the radix point to immediately after the sign bit (which is the MSB). When processing weights of the group 1910_NL1 that is quantized in accordance with the format S1.6, the configurable processor 150 shifts the radix point between the second and third bits (e.g., the radix point is now after the MSB or sign bit, and a single integer bit). Thus, the configurable processor 150 shifts the radix point within a weight, depending on the quantization format used for the weight.

Also, at 1644, the interpreted parameters (such as the interpreted weights and biases) are used by the configurable processor 150 to configure the neural network topology (e.g., that was also loaded at 1640).

The method 1600 then proceeds from 1644 to 1648, where the configured neural network is applied on sensor data generated by various sensors of the sequencing machine 100, to produce base call classification data. Application of a configured neural network on sensor data generated by various sensors of the sequencing machine 100, to produce base call classification data, is discussed in further detail in co-pending U.S. Nonprovisional patent application Ser. No. 16/826,126, titled "ARTIFICIAL INTELLIGENCE-BASED BASE CALLING," filed 20 Mar. 2020, which is incorporated by reference as if fully set forth herein.

In the method 1600 discussed herein, if a parameter (such as an outlier) is outside a specific quantization range of an associated quantization format, a next higher quantization format (e.g., having higher number of integer bits) with a higher range is considered for the parameter and for each parameter in the associated parameter group. For example, in the weight group 1910_NL1 (see FIG. 20), based on the outlier weight of −1.29, all weights of that group are assigned the quantization format S1.6. If that "−1.29" outlier weight was not considered or ignored when selecting the quantization format, then the group could have been assigned the quantization format S0.7. Thus, because of merely one outlier parameter, the entire weight group is assigned the quantization format S1.6, which increases quantization noise for individual weights of that weight group. In some examples, it may be preferable to disregard such an outlier when selecting the quantization format, e.g., to reduce the overall quantization noise for all weights of the group. Thus, in such an example, the quantization format S0.7 may be selected for weight group 1910_NL1. The weight −1.29 is then saturated to −1, which is the minimum allowed value for this quantization format. This results in higher quantization noise for the outlier weight, but overall higher quantization resolution (or lower quantization noise) for all other weights of that weight group.

In an example, the method 1600 may be modified, to apply any appropriate criteria to select a quantization format. For example, if there is only one outlier outside a quantization format range, the outlier is ignored when selecting the quantization format. For example, as there is only one weight (e.g., −1.29) that is outside the range of the quantization format S0.7, the quantization format S0.7 is selected for the weight group 1910_NL1 (the weight −1.29 is then saturated to −1). However, in an example, if there is more than one outlier outside the quantization format range, the outliers are not ignored, and the next higher quantization format (e.g., with higher number of integers) is selected.

In yet another example, if there is only one outlier outside a quantization format range, then it is determined as to how much the outlier is outside the range of the quantization format. For example, a threshold value may be pre-specified (e.g., each quantization format can have a corresponding threshold value). Merely as an example, the threshold value for the quantization format S0.7 may be 0.2. Thus, if there is only one outlier and that outlier is more than 0.2 apart from the range of the quantization format S0.7, then the next higher quantization format (e.g., quantization format S1.6) is selected. In the above discussed example, as −1.29 is 0.29 apart from the range of the quantization format S0.7, the next higher quantization format (e.g., quantization format S1.6) is selected.

Thus, the principles of this disclosure allow use of multiple useful quantization formats that have their own range and/or noise tradeoffs, and the selection criteria of a quantization format can be easily modified based on implementation.

Figure 21:
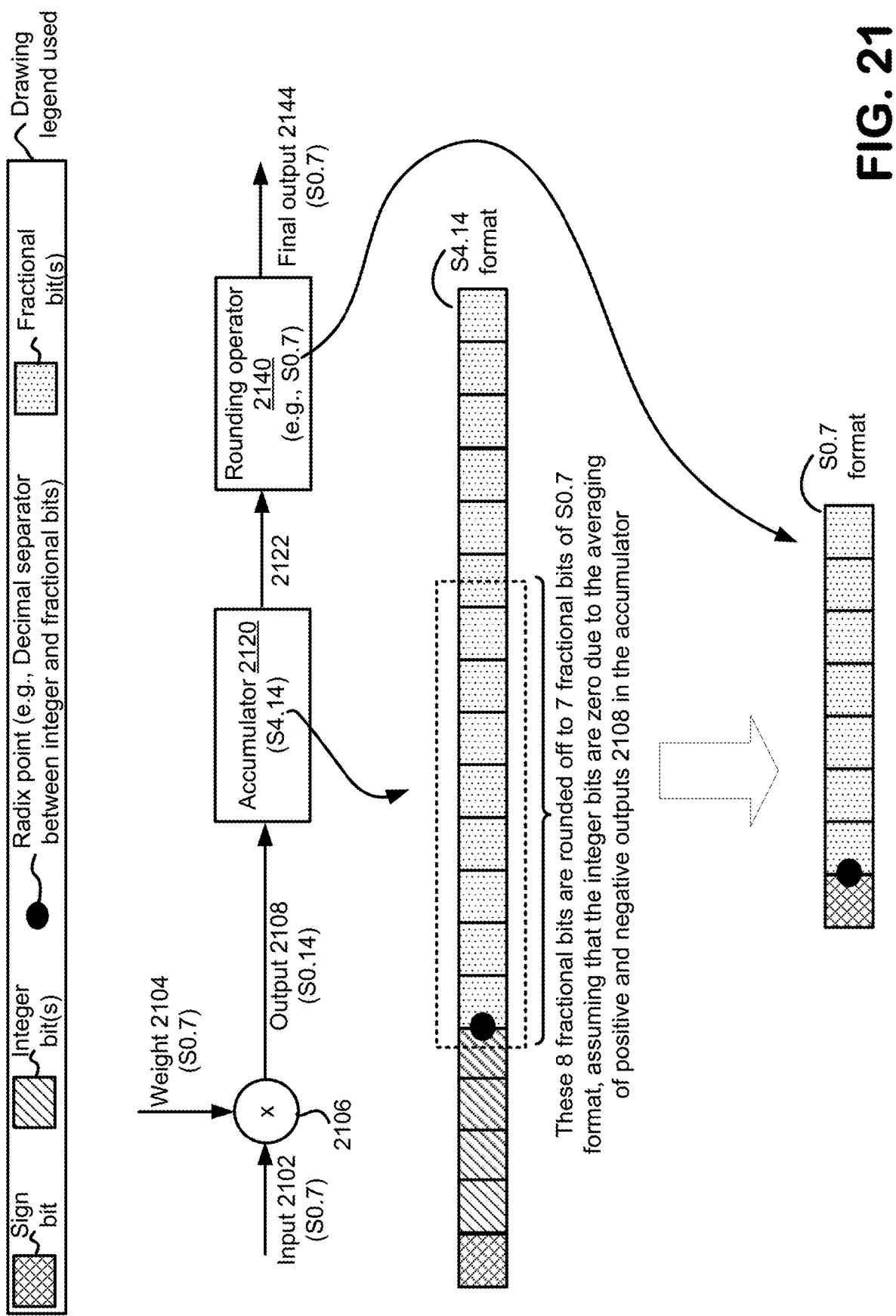
FIG. 21 illustrates a multiplication operation and an accumulation operation for an example input data quantization format and an example weight quantization format.

FIG. 21 illustrates a multiplication and an accumulation operation for an example input data quantization format and an example weight quantization format. For example, input data 2102 is in a format S0.7. The input data 2102 may be a tensor in a matrix form, merely as an example, and individual entries of the input tensor is quantized in the S0.7 format. Also, merely as an example, a kernel comprising weights 2104 are to be convoluted with the input 2102, and individual ones of the weights 2104 are also in the S0.7 format. Assume a convolution operation that involves multiplication of individual weights with individual entries of the input matrix.

As discussed, values in S0.7 format can take values in the range from −1 to +0.9921875, and in steps of 2-7 or 0.0078125, as illustrated in table 1400. There are 256 possible values within the range specified for S0.7 format. In an example, the quantization is performed to symmetrically limit the S0.7 format range, so that it is in the range from −0.9921875 to +0.9921875 in steps of 0.0078125 (e.g., see LUT 1570 in FIG. 15D), and −1 is excluded from this format (e.g., as discussed with respect to FIG. 15D), so that only 255 values are possible within this format.

Because output 2108 is a multiplication (e.g., block 2106) of the input 2102 in S0.7 format and weight 2104 in S0.7 format, the output 2108 also has a specific range. For example, a maximum value of the output 2108 is (−1)×(−0.9921875)=0.9921875, and a minimum value of the output 2108 is (−0×0.9921875=−0.9921875. In an example, the output 2018 is quantized and stored using a S0.14 format with no loss of precision due to the quantization or multiplication, and with a step size of 2-7×2-7=2-14.

In an embodiment, an accumulator 2120 accumulates outputs 2108 of multiple such multiplications. Accordingly, as the accumulator output 2122 is a sum of multiple such outputs, the accumulator output 2122 can be outside the range of the S0.14 format. Merely as an example, if there are four consecutive outputs 2108 having values of 0.98, 0.88, 0.85, and 0.87, the accumulator output from accumulating the four outputs 2108 would be 3.58, which would be outside the range allowed by the S0.14 format, and the accumulator output has to saturate to the maximum value allowed by the S0.14 format. Accordingly, to prevent such saturation, the accumulator output has a format that has a higher number of integers (e.g., higher than the zero number of integer present in the S0.14 format of the output 2108). For example, the accumulator output is in accordance with the S4.14 format. With a S4.14 format, at least 16 outputs 2108 (e.g., each having maximum possible value in the S0.14 format) can be summed and accumulated, because 24 or about 16 is a maximum number that can be represented by the S4.14 format. In practice, more than 16 number of outputs 2108 can be accumulated by the accumulator 2120 without saturating, as many of the outputs 2108 may not have the maximum possible value in the S0.14 format, and some of the outputs 2108 are positive while some are negative, thereby averaging out and decreasing the value of the accumulator output.

Some of the outputs 2108 accumulated by the accumulator 2120, as discussed, can be positive, while some can be negative. Accordingly, the final sum or final accumulation of these outputs 2108 may not need the higher range provided by the S4.14 format. For example, some or all the integer bits can be dropped in the output 2122, as these integer bits are likely to be zero. Moreover, the 14 fractional bits can also be truncated or rounded off—such reduction in the fractional bits can result in some loss of precision. In an example, the quantization noise introduced by 14 fractional bits is relatively less than the noise in the input signal. Therefore, rounding away some of these LSBs does not impact system performance in a measurable way. Accordingly, in the example of FIG. 21, the S4.14 format output 2122 of the accumulator 2120 is rounded off by a rounding operator 2140 to a S0.7 format of the final output 2144. For example, the 8 most significant fractional bits are rounded off to the 7 fractional bits of the S0.7 format.

Figure 22:
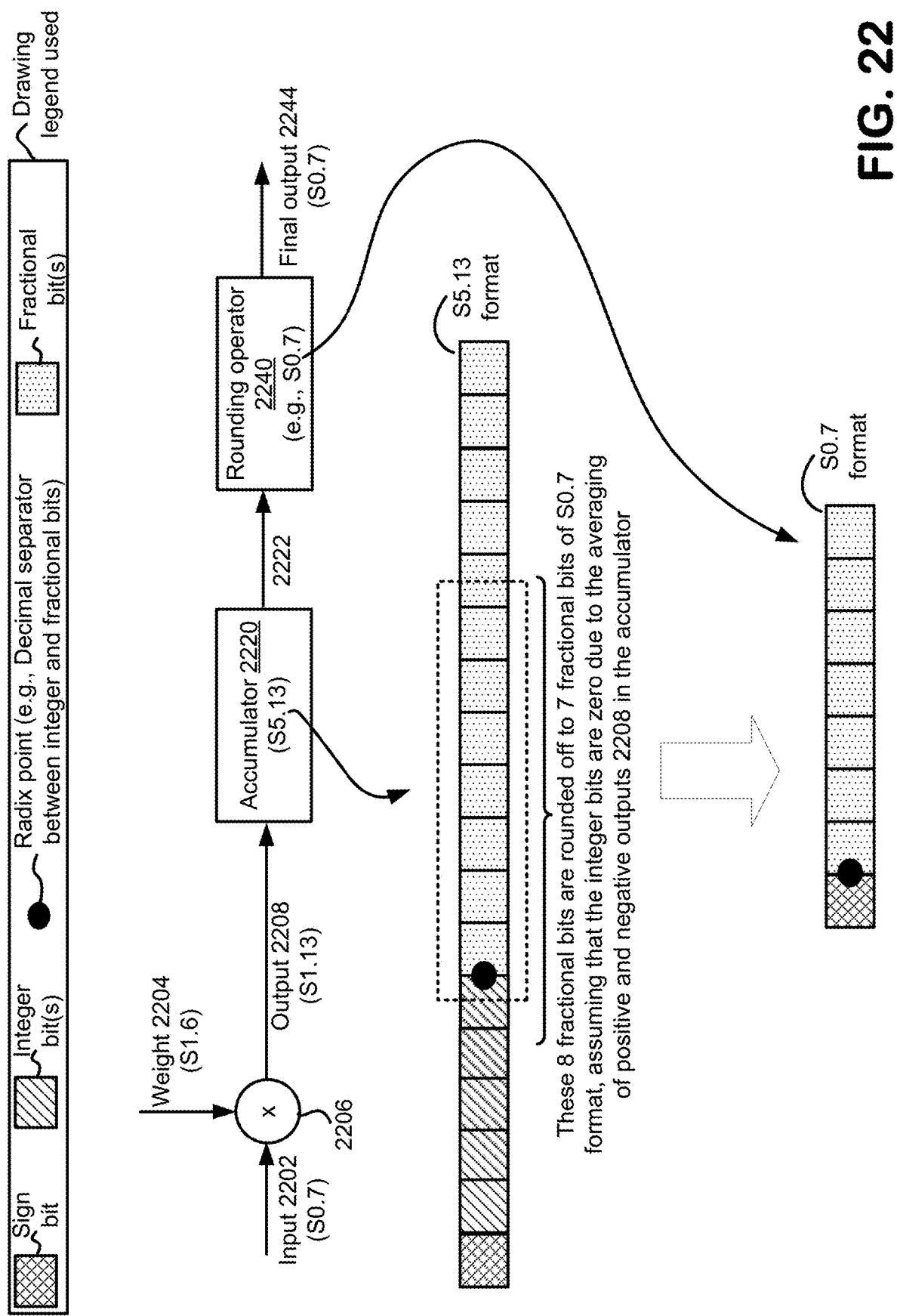
FIG. 22 illustrates a multiplication operation and an accumulation operation for another example input data quantization format and another example weight quantization format.

FIG. 22 illustrates a multiplication and an accumulation operation for an example input data quantization format and an example weight quantization format. For example, input data 2202 is in a format S0.7, similar to FIG. 21. In FIG. 22 a kernel comprising weights 2204 are to be convoluted with the input 2202. Unlike FIG. 21, in FIG. 22 individual ones of the weights 2204 are in the S1.6 format (note that in FIG. 21, the weights were stored in a different format). Assume a convolution operation that involves multiplication of individual weights with individual entries of the input matrix.

As discussed, input 2202 in S0.7 format can take values in the range from −1 to +0.9921875, and in steps of 2-7 or 0.0078125, as illustrated in table 1400. There are 256 possible values within the range specified for S0.7 format. In an example, the quantization is performed to symmetrically limit the S0.7 format range, so that it is in the range from −0.9921875 to +0.9921875 in steps of 0.0078125, and −1 is excluded from this format (e.g., as discussed with respect to FIG. 15D), so that only 255 values are possible within this format.

Weight values 2204 in S1.6 format can take values in the range from −2 to +1.984375, and in steps of 2-6, as illustrated in table 1400. Note that the resolution of the weights 2204 is 2-6, whereas the resolution of the weights 2104 of FIG. 21 is 2-7—accordingly, quantization noise for the weights 2204 is larger than the quantization noise for the weights 2104.

Because output 2208 is a multiplication (e.g., block 2206) of the input 2202 in S0.7 format and weight 2204 in S1.6 format, the output 2208 also has a specific range. For example, a maximum value of the output 2108 is (−1)×(−1.984375)=1.984375, and a minimum value of the output 2108 is (−1)×0.984375=−1.984375. In an example, the output 2018 is quantized and stored using a S1.13 format with no loss of precision due to the quantization or multiplication, and with a step size of 2-7×2-6=2-13.

Thus, compared to the output 2108 of FIG. 21, the output 2208 of FIG. 22 has a higher range, but a lower precision or resolution.

In an embodiment, an accumulator 2220 accumulates outputs 2208 of multiple such multiplications. Accordingly, as the accumulator output 2222 is a sum of multiple such outputs 2208, the accumulator output can be outside the range of the S1.13 format, as also discussed with respect to FIG. 21. Accordingly, to prevent saturation, the accumulator output has a format that has a higher number of integers (e.g., higher than the one integer present in the S1.13 format of the output 2208). Merely as an example, the accumulator output 222 are in accordance with S5.13 format.

Some of the outputs 2208 accumulated by the accumulator 2220, as discussed, can be positive, while others can be negative. Accordingly, the final sum or final accumulation of these outputs 2208 may not need the higher range provided by the S5.13 format. For example, some or all the integer bits can be dropped, as these integer bits are likely to be zero. Moreover, the 13 fractional bits can also be truncated or rounded off—such reduction in the fractional bits can result in some loss of resolution, but the final output 2244 may not need the resolution of the 13 fractional bits. Accordingly, in the example of FIG. 22, the S5.13 format output 2222 of the accumulator 2220 is rounded off by a rounding operator 2240 to a S0.7 format of the final output 2244. For example, the 8 most significant fractional bits are rounded off to the 7 fractional bits of the S0.7 format.

Figure 23:
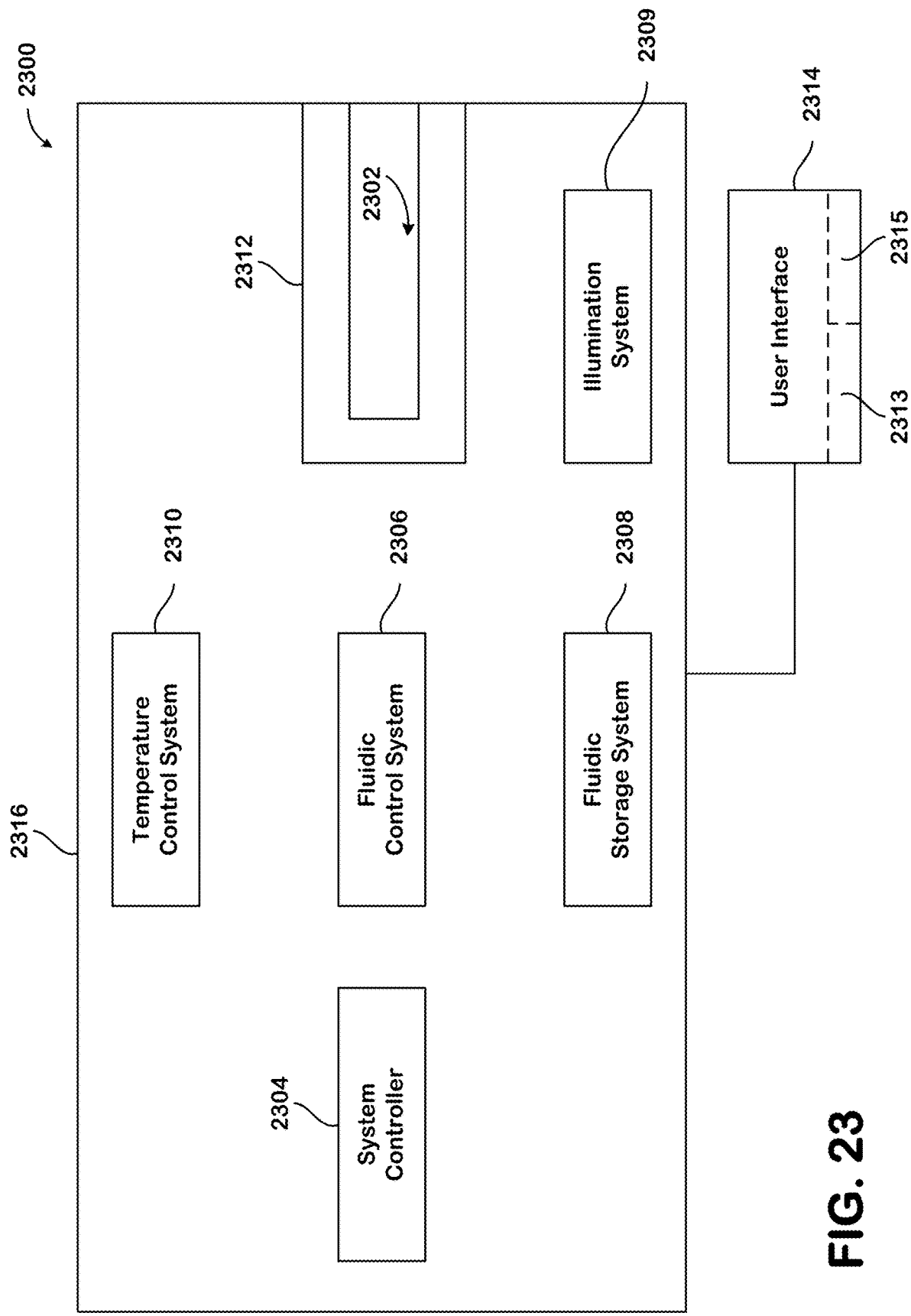
FIG. 23 is a block diagram of a base calling system in accordance with one implementation.

FIG. 23 is a block diagram of a base calling system 2300 in accordance with one implementation. The base calling system 2300 may operate to obtain any information or data that relates to at least one of a biological or chemical substance. In some implementations, the base calling system 2300 is a workstation that may be similar to a bench-top device or desktop computer. For example, a majority (or all) of the systems and components for conducting the desired reactions can be within a common housing 2316.

In particular implementations, the base calling system 2300 is a nucleic acid sequencing system (or sequencer) configured for various applications, including but not limited to de novo sequencing, resequencing of whole genomes or target genomic regions, and metagenomics. The sequencer may also be used for DNA or RNA analysis. In some implementations, the base calling system 2300 may also be configured to generate reaction sites in a biosensor. For example, the base calling system 2300 may be configured to receive a sample and generate surface attached clusters of clonally amplified nucleic acids derived from the sample. Each cluster may constitute or be part of a reaction site in the biosensor.

The exemplary base calling system 2300 may include a system receptacle or interface 2312 that is configured to interact with a biosensor 2302 to perform desired reactions within the biosensor 2302. In the following description with respect to FIG. 23, the biosensor 2302 is loaded into the system receptacle 2312. However, it is understood that a cartridge that includes the biosensor 2302 may be inserted into the system receptacle 2312 and in some states the cartridge can be removed temporarily or permanently. As described above, the cartridge may include, among other things, fluidic control and fluidic storage components.

In particular implementations, the base calling system 2300 is configured to perform a large number of parallel reactions within the biosensor 2302. The biosensor 2302 includes one or more reaction sites where desired reactions can occur. The reaction sites may be, for example, immobilized to a solid surface of the biosensor or immobilized to beads (or other movable substrates) that are located within corresponding reaction chambers of the biosensor. The reaction sites can include, for example, clusters of clonally amplified nucleic acids. The biosensor 2302 may include a solid-state imaging device (e.g., CCD or CMOS imager) and a flow cell mounted thereto. The flow cell may include one or more flow channels that receive a solution from the base calling system 2300 and direct the solution toward the reaction sites. Optionally, the biosensor 2302 can be configured to engage a thermal element for transferring thermal energy into or out of the flow channel.

The base calling system 2300 may include various components, assemblies, and systems (or sub-systems) that interact with each other to perform a predetermined method or assay protocol for biological or chemical analysis. For example, the base calling system 2300 includes a system controller 2304 that may communicate with the various components, assemblies, and sub-systems of the base calling system 2300 and also the biosensor 2302. For example, in addition to the system receptacle 2312, the base calling system 2300 may also include a fluidic control system 2306 to control the flow of fluid throughout a fluid network of the base calling system 2300 and the biosensor 2302; a fluidic storage system 2308 that is configured to hold all fluids (e.g., gas or liquids) that may be used by the bioassay system; a temperature control system 2310 that may regulate the temperature of the fluid in the fluid network, the fluidic storage system 2308, and/or the biosensor 2302; and an illumination system 2309 that is configured to illuminate the biosensor 2302. As described above, if a cartridge having the biosensor 2302 is loaded into the system receptacle 2312, the cartridge may also include fluidic control and fluidic storage components.

Also shown, the base calling system 2300 may include a user interface 2314 that interacts with the user. For example, the user interface 2314 may include a display 2313 to display or request information from a user and a user input device 2315 to receive user inputs. In some implementations, the display 2313 and the user input device 2315 are the same device. For example, the user interface 2314 may include a touch-sensitive display configured to detect the presence of an individual's touch and also identify a location of the touch on the display. However, other user input devices 2315 may be used, such as a mouse, touchpad, keyboard, keypad, handheld scanner, voice-recognition system, motion-recognition system, and the like. As will be discussed in greater detail below, the base calling system

2300 may communicate with various components, including the biosensor 2302 (e.g., in the form of a cartridge), to perform the desired reactions. The base calling system 2300 may also be configured to analyze data obtained from the biosensor to provide a user with desired information.

The system controller 2304 may include any processor-based or microprocessor-based system, including systems using microcontrollers, reduced instruction set computers (RISC), application specific integrated circuits (ASICs), field programmable gate array (FPGAs), logic circuits, and any other circuit or processor capable of executing functions described herein. The above examples are exemplary only, and are thus not intended to limit in any way the definition and/or meaning of the term system controller. In the exemplary implementation, the system controller 2304 executes a set of instructions that are stored in one or more storage elements, memories, or modules in order to at least one of obtain and analyze detection data. Detection data can include a plurality of sequences of pixel signals, such that a sequence of pixel signals from each of the millions of sensors (or pixels) can be detected over many base calling cycles. Storage elements may be in the form of information sources or physical memory elements within the base calling system 2300.

The set of instructions may include various commands that instruct the base calling system 2300 or biosensor 2302 to perform specific operations such as the methods and processes of the various implementations described herein. The set of instructions may be in the form of a software program, which may form part of a tangible, non-transitory computer readable medium or media. As used herein, the terms "software" and "firmware" are interchangeable and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

The software may be in various forms such as system software or application software. Further, the software may be in the form of a collection of separate programs, or a program module within a larger program or a portion of a program module. The software also may include modular programming in the form of object-oriented programming After obtaining the detection data, the detection data may be automatically processed by the base calling system 2300, processed in response to user inputs, or processed in response to a request made by another processing machine (e.g., a remote request through a communication link). In the illustrated implementation, the system controller 2304 includes an analysis module 2438 (see FIG. 24). In other implementations, system controller 2304 does not include the analysis module 2438 and instead has access to the analysis module 2438 (e.g., the analysis module 2438 may be separately hosted on cloud).

The system controller 2304 may be connected to the biosensor 2302 and the other components of the base calling system 2300 via communication links. The system controller 2304 may also be communicatively connected to off-site systems or servers. The communication links may be hardwired, corded, or wireless. The system controller 2304 may receive user inputs or commands, from the user interface 2314 and the user input device 2315.

The fluidic control system 2306 includes a fluid network and is configured to direct and regulate the flow of one or more fluids through the fluid network. The fluid network may be in fluid communication with the biosensor 2302 and the fluidic storage system 2308. For example, select fluids may be drawn from the fluidic storage system 2308 and directed to the biosensor 2302 in a controlled manner, or the fluids may be drawn from the biosensor 2302 and directed toward, for example, a waste reservoir in the fluidic storage system 2308. Although not shown, the fluidic control system 2306 may include flow sensors that detect a flow rate or pressure of the fluids within the fluid network. The sensors may communicate with the system controller 2304.

The temperature control system 2310 is configured to regulate the temperature of fluids at different regions of the fluid network, the fluidic storage system 2308, and/or the biosensor 2302. For example, the temperature control system 2310 may include a thermocycler that interfaces with the biosensor 2302 and controls the temperature of the fluid that flows along the reaction sites in the biosensor 2302. The temperature control system 2310 may also regulate the temperature of solid elements or components of the base calling system 2300 or the biosensor 2302. Although not shown, the temperature control system 2310 may include sensors to detect the temperature of the fluid or other components. The sensors may communicate with the system controller 2304.

The fluidic storage system 2308 is in fluid communication with the biosensor 2302 and may store various reaction components or reactants that are used to conduct the desired reactions therein. The fluidic storage system 2308 may also store fluids for washing or cleaning the fluid network and biosensor 2302 and for diluting the reactants. For example, the fluidic storage system 2308 may include various reservoirs to store samples, reagents, enzymes, other biomolecules, buffer solutions, aqueous, and non-polar solutions, and the like. Furthermore, the fluidic storage system 2308 may also include waste reservoirs for receiving waste products from the biosensor 2302. In implementations that include a cartridge, the cartridge may include one or more of a fluidic storage system, fluidic control system or temperature control system. Accordingly, one or more of the components set forth herein as relating to those systems can be contained within a cartridge housing. For example, a cartridge can have various reservoirs to store samples, reagents, enzymes, other biomolecules, buffer solutions, aqueous, and non-polar solutions, waste, and the like. As such, one or more of a fluidic storage system, fluidic control system or temperature control system can be removably engaged with a bioassay system via a cartridge or other biosensor.

The illumination system 2309 may include a light source (e.g., one or more LEDs) and a plurality of optical components to illuminate the biosensor. Examples of light sources may include lasers, arc lamps, LEDs, or laser diodes. The optical components may be, for example, reflectors, dichroics, beam splitters, collimators, lenses, filters, wedges, prisms, mirrors, detectors, and the like. In implementations that use an illumination system, the illumination system 2309 may be configured to direct an excitation light to reaction sites. As one example, fluorophores may be excited by green wavelengths of light, as such the wavelength of the excitation light may be approximately 532 nm. In one implementation, the illumination system 2309 is configured to produce illumination that is parallel to a surface normal of a surface of the biosensor 2302. In another implementation, the illumination system 2309 is configured to produce illumination that is off-angle relative to the surface normal of the surface of the biosensor 2302. In yet another implementation, the illumination system 2309 is configured to produce illumination that has plural angles, including some parallel illumination and some off-angle illumination.

The system receptacle or interface 2312 is configured to engage the biosensor 2302 in at least one of a mechanical, electrical, and fluidic manner. The system receptacle 2312 may hold the biosensor 2302 in a desired orientation to facilitate the flow of fluid through the biosensor 2302. The system receptacle 2312 may also include electrical contacts that are configured to engage the biosensor 2302 so that the base calling system 2300 may communicate with the biosensor 2302 and/or provide power to the biosensor 2302. Furthermore, the system receptacle 2312 may include fluidic ports (e.g., nozzles) that are configured to engage the biosensor 2302. In some implementations, the biosensor 2302 is removably coupled to the system receptacle 2312 in a mechanical manner, in an electrical manner, and also in a fluidic manner.

In addition, the base calling system 2300 may communicate remotely with other systems or networks or with other bioassay systems 2300. Detection data obtained by the bioassay system(s) 2300 may be stored in a remote database.

Figure 24:
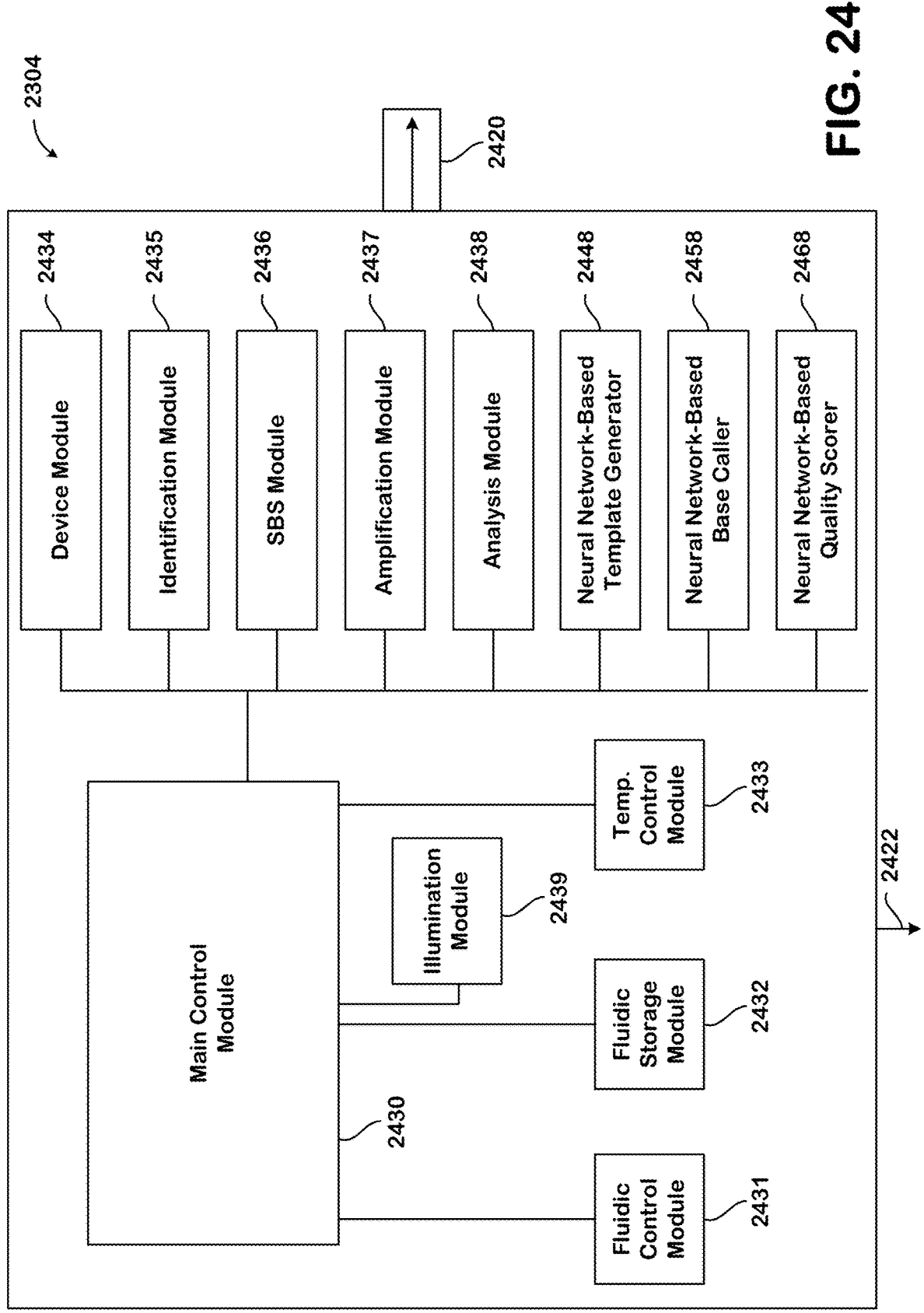
FIG. 24 is a block diagram of a system controller that can be used in the system of FIG. 23.

FIG. 24 is a block diagram of the system controller 2304 that can be used in the system of FIG. 23. In one implementation, the system controller 2304 includes one or more processors or modules that can communicate with one another. Each of the processors or modules may include an algorithm (e.g., instructions stored on a tangible and/or non-transitory computer readable storage medium) or sub-algorithms to perform particular processes. The system controller 2304 is illustrated conceptually as a collection of modules, but may be implemented utilizing any combination of dedicated hardware boards, DSPs, processors, etc. Alternatively, the system controller 2304 may be implemented utilizing an off-the-shelf PC with a single processor or multiple processors, with the functional operations distributed between the processors. As a further option, the modules described below may be implemented utilizing a hybrid configuration in which certain modular functions are performed utilizing dedicated hardware, while the remaining modular functions are performed utilizing an off-the-shelf PC and the like. The modules also may be implemented as software modules within a processing unit.

During operation, a communication port 2420 may transmit information (e.g., commands) to or receive information (e.g., data) from the biosensor 2302 (FIG. 23) and/or the sub-systems 2306, 2308, 2310 (FIG. 23). In implementations, the communication port 2420 may output a plurality of sequences of pixel signals. A communication port 2420 may receive user input from the user interface 2314 (FIG. 23) and transmit data or information to the user interface 2314. Data from the biosensor 2302 or sub-systems 2306, 2308, 2310 may be processed by the system controller 2304 in real-time during a bioassay session. Additionally, or alternatively, data may be stored temporarily in a system memory during a bioassay session and processed in slower than real-time or off-line operation.

As shown in FIG. 24, the system controller 2304 may include a plurality of modules 2431-2439 that communicate with a main control module 2430. The main control module 2430 may communicate with the user interface 2314 (FIG. 23). Although the modules 2431-2439 are shown as communicating directly with the main control module 2430, the modules 2431-2439 may also communicate directly with each other, the user interface 2314, and the biosensor 2302. Also, the modules 2431-2439 may communicate with the main control module 2430 through the other modules.

The plurality of modules 2431-2439 include system modules 2431-2433, 2439 that communicate with the sub-systems 2306, 2308, 2310, and 2309, respectively. The fluidic control module 2431 may communicate with the fluidic control system 2306 to control the valves and flow sensors of the fluid network for controlling the flow of one or more fluids through the fluid network. The fluidic storage module 2432 may notify the user when fluids are low or when the waste reservoir is at or near capacity. The fluidic storage module 2432 may also communicate with the temperature control module 2433 so that the fluids may be stored at a desired temperature. The illumination module 2439 may communicate with the illumination system 2309 to illuminate the reaction sites at designated times during a protocol, such as after the desired reactions (e.g., binding events) have occurred. In some implementations, the illumination module 2439 may communicate with the illumination system 2309 to illuminate the reaction sites at designated angles.

The plurality of modules 2431-2439 may also include a device module 2434 that communicates with the biosensor 2302 and an identification module 2435 that determines identification information relating to the biosensor 2302. The device module 2434 may, for example, communicate with the system receptacle 2312 to confirm that the biosensor has established an electrical and fluidic connection with the base calling system 2300. The identification module 2435 may receive signals that identify the biosensor 2302. The identification module 2435 may use the identity of the biosensor 2302 to provide other information to the user. For example, the identification module 2435 may determine and then display a lot number, a date of manufacture, or a protocol that is recommended to be run with the biosensor 2302.

The plurality of modules 2431-2439 also includes an analysis module 2438 (also called signal processing module or signal processor) that receives and analyzes the signal data (e.g., image data) from the biosensor 2302. Analysis module 2438 includes memory (e.g., RAM or Flash) to store detection data. Detection data can include a plurality of sequences of pixel signals, such that a sequence of pixel signals from each of the millions of sensors (or pixels) can be detected over many base calling cycles. The signal data may be stored for subsequent analysis or may be transmitted to the user interface 2314 to display desired information to the user. In some implementations, the signal data may be processed by the solid-state imager (e.g., CMOS image sensor) before the analysis module 2438 receives the signal data.

The analysis module 2438 is configured to obtain image data from the light detectors at each of a plurality of sequencing cycles. The image data is derived from the emission signals detected by the light detectors and process the image data for each of the plurality of sequencing cycles through a neural network (e.g., a neural network-based template generator 2448, a neural network-based base caller 2458 (e.g., FIG. 4 and FIG. 10), and/or a neural network-based quality scorer 2468) and produce a base call for at least some of the analytes at each of the plurality of sequencing cycle.

Protocol modules 2436 and 2437 communicate with the main control module 2430 to control the operation of the sub-systems 2306, 2308, and 2310 when conducting predetermined assay protocols. The protocol modules 2436 and 2437 may include sets of instructions for instructing the base calling system 2300 to perform specific operations pursuant to predetermined protocols. As shown, the protocol module may be a sequencing-by-synthesis (SBS) module 2436 that is configured to issue various commands for performing sequencing-by-synthesis processes. In SBS, extension of a nucleic acid primer along a nucleic acid template is monitored to determine the sequence of nucleotides in the template. The underlying chemical process can be polymerization (e.g. as catalyzed by a polymerase enzyme) or ligation (e.g. catalyzed by a ligase enzyme). In a particular polymerase-based SBS implementation, fluorescently labeled nucleotides are added to a primer (thereby extending the primer) in a template dependent fashion such that detection of the order and type of nucleotides added to the primer can be used to determine the sequence of the template. For example, to initiate a first SBS cycle, commands can be given to deliver one or more labeled nucleotides, DNA polymerase, etc., into/through a flow cell that houses an array of nucleic acid templates. The nucleic acid templates may be located at corresponding reaction sites. Those reaction sites where primer extension causes a labeled nucleotide to be incorporated can be detected through an imaging event. During an imaging event, the illumination system 2309 may provide an excitation light to the reaction sites. Optionally, the nucleotides can further include a reversible termination property that terminates further primer extension once a nucleotide has been added to a primer. For example, a nucleotide analog having a reversible terminator moiety can be added to a primer such that subsequent extension cannot occur until a deblocking agent is delivered to remove the moiety. Thus, for implementations that use reversible termination a command can be given to deliver a deblocking reagent to the flow cell (before or after detection occurs). One or more commands can be given to effect wash(es) between the various delivery steps. The cycle can then be repeated n times to extend the primer by n nucleotides, thereby detecting a sequence of length n. Exemplary sequencing techniques are described, for example, in Bentley et al., Nature 456:53-59 (2008); WO 04/018497; U.S. Pat. No. 7,057,026; WO 91/06678; WO 07/123744; U.S. Pat. Nos. 7,329,492; 7,211,414; 7,315,019; 7,405,281, and US 2008/014708082, each of which is incorporated herein by reference.

For the nucleotide delivery step of an SBS cycle, either a single type of nucleotide can be delivered at a time, or multiple different nucleotide types (e.g., A, C, T and G together) can be delivered. For a nucleotide delivery configuration where only a single type of nucleotide is present at a time, the different nucleotides need not have distinct labels since they can be distinguished based on temporal separation inherent in the individualized delivery. Accordingly, a sequencing method or apparatus can use single color detection. For example, an excitation source need only provide excitation at a single wavelength or in a single range of wavelengths. For a nucleotide delivery configuration where delivery results in multiple different nucleotides being present in the flow cell at one time, sites that incorporate different nucleotide types can be distinguished based on different fluorescent labels that are attached to respective nucleotide types in the mixture. For example, four different nucleotides can be used, each having one of four different fluorophores. In one implementation, the four different fluorophores can be distinguished using excitation in four different regions of the spectrum. For example, four different excitation radiation sources can be used. Alternatively, fewer than four different excitation sources can be used, but optical filtration of the excitation radiation from a single source can be used to produce different ranges of excitation radiation at the flow cell.

In some implementations, fewer than four different colors can be detected in a mixture having four different nucleotides. For example, pairs of nucleotides can be detected at the same wavelength, but distinguished based on a difference in intensity for one member of the pair compared to the other, or based on a change to one member of the pair (e.g., via chemical modification, photochemical modification or physical modification) that causes apparent signal to appear or disappear compared to the signal detected for the other member of the pair. Exemplary apparatus and methods for distinguishing four different nucleotides using detection of fewer than four colors are described for example in US Pat. App. Ser. Nos. 61/538,294 and 61/619,878, which are incorporated herein by reference in their entireties. U.S. application Ser. No. 13/624,200, which was filed on Sep. 21, 2012, is also incorporated by reference in its entirety.

The plurality of protocol modules may also include a sample-preparation (or generation) module 2437 that is configured to issue commands to the fluidic control system 2306 and the temperature control system 2310 for amplifying a product within the biosensor 2302. For example, the biosensor 2302 may be engaged to the base calling system 2300. The amplification module 2437 may issue instructions to the fluidic control system 2306 to deliver necessary amplification components to reaction chambers within the biosensor 2302. In other implementations, the reaction sites may already contain some components for amplification, such as the template DNA and/or primers. After delivering the amplification components to the reaction chambers, the amplification module 2437 may instruct the temperature control system 2310 to cycle through different temperature stages according to known amplification protocols. In some implementations, the amplification and/or nucleotide incorporation is performed isothermally.

The SBS module 2436 may issue commands to perform bridge PCR where clusters of clonal amplicons are formed on localized areas within a channel of a flow cell. After generating the amplicons through bridge PCR, the amplicons may be "linearized" to make single stranded template DNA, or sstDNA, and a sequencing primer may be hybridized to a universal sequence that flanks a region of interest. For example, a reversible terminator-based sequencing by synthesis method can be used as set forth above or as follows.

Each base calling or sequencing cycle can extend an sstDNA by a single base which can be accomplished for example by using a modified DNA polymerase and a mixture of four types of nucleotides. The different types of nucleotides can have unique fluorescent labels, and each nucleotide can further have a reversible terminator that allows only a single-base incorporation to occur in each cycle. After a single base is added to the sstDNA, excitation light may be incident upon the reaction sites and fluorescent emissions may be detected. After detection, the fluorescent label and the terminator may be chemically cleaved from the sstDNA. Another similar base calling or sequencing cycle may follow. In such a sequencing protocol, the SBS module 2436 may instruct the fluidic control system 2306 to direct a flow of reagent and enzyme solutions through the biosensor 2302. Exemplary reversible terminator-based SBS methods which can be utilized with the apparatus and methods set forth herein are described in US Patent Application Publication No. 2007/0166705 A1, US Patent Application Publication No. 2006/0188901 A1, U.S. Pat. No. 7,057,026, US Patent Application Publication No. 2006/0240439 A1, PCT Publication No. WO 05/065814, and PCT Publication No. WO 06/064199, each of which is incorporated herein by reference in its entirety. Exemplary reagents for reversible terminator-based SBS are described in U.S. Pat. Nos. 7,541,444; 7,057,026; 7,427,673; 7,566,537; and 7,592,435, each of which is incorporated herein by reference in its entirety.

In some implementations, the amplification and SBS modules may operate in a single assay protocol where, for example, template nucleic acid is amplified and subsequently sequenced within the same cartridge.

The base calling system 2300 may also allow the user to reconfigure an assay protocol. For example, the base calling system 2300 may offer options to the user through the user interface 2314 for modifying the determined protocol. For example, if it is determined that the biosensor 2302 is to be used for amplification, the base calling system 2300 may request a temperature for the annealing cycle. Furthermore, the base calling system 2300 may issue warnings to a user if a user has provided user inputs that are generally not acceptable for the selected assay protocol.

In implementations, the biosensor 2302 includes millions of sensors (or pixels), each of which generates a plurality of sequences of pixel signals over successive base calling cycles. The analysis module 2438 detects the plurality of sequences of pixel signals and attributes them to corresponding sensors (or pixels) in accordance to the row-wise and/or column-wise location of the sensors on an array of sensors.

Each sensor in the array of sensors can produce sensor data for a tile of the flow cell, where a tile in an area on the flow cell at which clusters of genetic material are disposed during the based calling operation. The sensor data can comprise image data in an array of pixels. For a given cycle, the sensor data can include more than one image, producing multiple features per pixel as the tile data.

"Logic" (e.g., data flow logic), as used herein, can be implemented in the form of a computer product including a non-transitory computer readable storage medium with computer usable program code for performing the method steps described herein. The "logic" can be implemented in the form of an apparatus including a memory and at least one processor that is coupled to the memory and operative to perform exemplary method steps. The "logic" can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media). In one implementation, the logic implements a data processing function. The logic can be a general purpose, single core or multicore, processor with a computer program specifying the function, a digital signal processor with a computer program, configurable logic such as an FPGA with a configuration file, a special purpose circuit such as a state machine, or any combination of these. Also, a computer program product can embody the computer program and configuration file portions of the logic.

Figure 25:
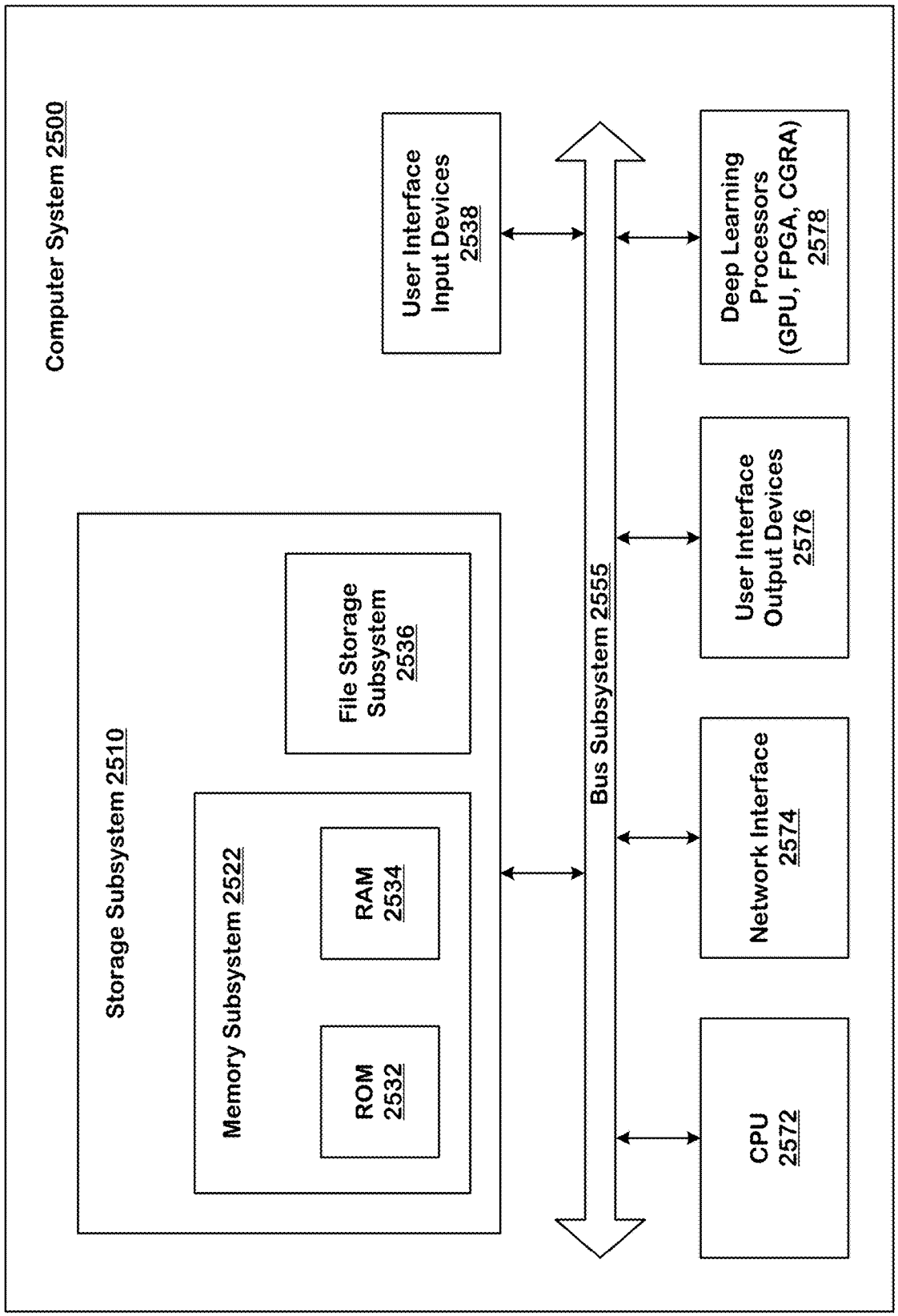
FIG. 25 is a simplified block diagram of a computer system that can be used to implement the technology disclosed.

FIG. 25 is a simplified block diagram of a computer system 2500 that can be used to implement the technology disclosed. Computer system 2500 includes at least one central processing unit (CPU) 2572 that communicates with a number of peripheral devices via bus subsystem 2555. These peripheral devices can include a storage subsystem 2510 including, for example, memory devices and a file storage subsystem 2536, user interface input devices 2538, user interface output devices 2576, and a network interface subsystem 2574. The input and output devices allow user interaction with computer system 2500. Network interface subsystem 2574 provides an interface to outside networks, including an interface to corresponding interface devices in other computer systems.

User interface input devices 2538 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2500.

User interface output devices 2576 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2500 to the user or to another machine or computer system.

Storage subsystem 2510 stores programming and data constructs that provide the functionality of some or all of the modules and methods described herein. These software modules are generally executed by deep learning processors 2578.

In one implementation, the neural networks are implemented using deep learning processors 2578 can be configurable and reconfigurable processors, field-programmable gate arrays (FPGAs), application-specific integrated circuits (ASICs), and/or coarse-grained reconfigurable architectures (CGRAs) and graphics processing units (GPUs) other configured devices. Deep learning processors 2578 can be hosted by a deep learning cloud platform such as Google Cloud Platform™, Xilinx™, and Cirrascale™. Examples of deep learning processors 2578 include Google's Tensor Processing Unit (TPU)™, rackmount solutions like GX4 Rackmount Series™, GX149 Rackmount Series™, NVIDIA DGX-1™, Microsoft' Stratix V FPGA™ Graphcore's Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, and others.

Memory subsystem 2522 used in the storage subsystem 2510 can include a number of memories including a main random access memory (RAM) 2534 for storage of instructions and data during program execution and a read only memory (ROM) 2532 in which fixed instructions are stored. A file storage subsystem 2536 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2536 in the storage subsystem 2510, or in other machines accessible by the processor.

Bus subsystem 2555 provides a mechanism for letting the various components and subsystems of computer system 2500 communicate with each other as intended. Although bus subsystem 2555 is shown schematically as a single bus, alternative implementations of the bus subsystem can use multiple busses.

Computer system 2500 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2500 depicted in FIG. 25 is intended only as a specific example for purposes of illustrating the preferred implementations of the present invention. Many other configurations of computer system 2500 are possible having more or less components than the computer system depicted in FIG. 25.

I claim as follows:

1. A method of quantizing parameters of a neural network, comprising:
   grouping a plurality of parameters of a neural network in a plurality of groups, such that each group of the plurality of groups includes corresponding two or more parameters of the plurality of parameters;
   selecting a lookup table from a plurality of lookup tables comprising varying respective value ranges for a plurality of available quantization formats;
   for each group of the plurality of groups, selecting a corresponding quantization format from the plurality of available quantization formats based on the respective value ranges of the selected lookup table, such that a first quantization format selected for at least a first group is different from a second quantization format selected for at least a second group;
   for each group, quantizing individual parameters within the corresponding group using the corresponding quantization format selected for the corresponding group to determine quantized parameters;
   configuring a topology of the neural network according to the quantized parameters; and
   applying the configured neural network on sensor data generated by a substrate to generate base call classification data.

2. The method of claim 1, wherein selecting the first quantization format for the first group comprises:
   identifying a parameter of the first group that has a maximum absolute value among absolute values of all parameters of the first group; and
   selecting the first quantization format for the first group, based on the maximum absolute value of the identified parameter of the first group.

3. The method of claim 2, wherein selecting the first quantization format for the first group further comprises:
   determining that the maximum absolute value is within a first range of values in the respective value ranges of the selected lookup table; and
   selecting the first quantization format for the first group, based on the first range of values being mapped to the first quantization format in the selected lookup table.

4. The method of claim 2, wherein selecting the first quantization format for the first group further comprises:
   determining a power of 2 that is higher than, and closest to, the maximum absolute value, where the power of 2 is represented as $2^N$, and
   selecting the first quantization format such that the first quantization format is represented by a sign bit, N number of integer bits, (T−N−1) number of fractional bits, wherein T is a total number of bits in each of the plurality of available quantization formats.

5. The method of claim 1, wherein the first quantization format has a first range and a first number of integer bits, wherein the second quantization format has a second range and a second number of integer bits, wherein the second range is higher than the first range, and wherein selecting the first quantization format for the first group comprises:
   identifying a first parameter of the first group that has a maximum absolute value among absolute values of all parameters of the first group,
   determining that the maximum absolute value is within the second range and outside the first range; determining that all parameters of the first group, other than the first parameter, is within the first range; and
   in response to determining that all parameters of the first group, other than the first parameter, is within the first range, selecting the first quantization format for the first group.

6. The method of claim 1, wherein the first quantization format has a first range and a first number of integer bits, wherein the second quantization format has a second range and a second number of integer bits, wherein the second range is higher than the first range, and wherein selecting the first quantization format for the first group comprises:
   identifying a first parameter of the first group that has a maximum absolute value among absolute values of all parameters of the first group,
   determining that the maximum absolute value is within the second range and outside the first range;
   determining that (i) the maximum absolute value is within a threshold value of the first range and (ii) only the first parameter of the first group, and no other parameters of the first group, is outside the first range; and
   in response to determining that (i) the maximum absolute value is within the threshold value of the first range and (ii) only the first parameter of the first group, and no other parameters of the first group, is outside the first range, selecting the first quantization format for the first group.

7. The method of claim 1, wherein:
   the first quantization format and the second quantization format have a same number of total bits; the first quantization format has a first number of integer bits and a second number of fractional bits; and
   the second quantization format has a third number of integer bits that is different from the first number of integer bits, and a fourth number of fractional bits that is different from the second number of fractional bits.

8. The method of claim 1, wherein each of the first quantization format and the second quantization format has a corresponding sign bit.

9. The method of claim 1, wherein:
   the plurality of parameters of the neural network comprises a first plurality of trained weights of the neural network and/or a second plurality of trained biases of the neural network.

10. The method of claim 1, further comprising:
    training the neural network to compute the plurality of parameters of the neural network.

11. The method of claim 1, further comprising:
    for each group, generating corresponding control information that identifies the corresponding quantization format of the plurality of available quantization formats selected for the corresponding group.

12. The method of claim 11, further comprising:
    loading the topology of the neural network, the quantized parameters, and the corresponding control information to a configurable processor; and
    interpreting, by the configurable processor, the quantized parameters based on the corresponding control information, such that the quantized parameters of the first group are interpreted based on control information associated with the first group, and the quantized parameters of the second group are interpreted based on control information associated with the second group.

13. The method of claim 12, wherein the respective value ranges of the selected lookup table include respective upper and lower bounds comprising an approximation of upper and lower bounds from respective value ranges of an unselected lookup table of the plurality of lookup tables and wherein the respective upper and lower bounds from the selected lookup table comprise fewer significant figures relative to the upper and lower bounds from the unselected lookup table.

14. A method of quantizing parameters of a neural network, comprising:
selecting a lookup table from a plurality of lookup tables comprising varying respective value ranges for a plurality of available quantization formats;
selecting, for a first parameter of a neural network, a first quantization format based on a first value range of the selected lookup table;
selecting, for a second parameter of the neural network, a second quantization format based on a second value range of the selected lookup table,
wherein the first quantization format and the second quantization format have a same number of total bits, wherein the first quantization format has a first number of integer bits and a second number of fractional bits, and wherein the second quantization format has (i) a third number of integer bits that is different from the first number of integer bits and (ii) a fourth number of fractional bits that is different from the second number of fractional bits;
generating first control information that identifies the first quantization format selected for the first parameter;
generating second control information that identifies the second quantization format selected for the second parameter;
quantizing the first parameter and the second parameter in accordance with the first quantization format and the second quantization format, respectively;
configuring a topology of the neural network according to quantized parameters including the first parameter and the second parameter; and
applying the configured neural network on sensor data generated by a substrate to generate base call classification data.

15. The method of claim 14, further comprising:
loading a topology of the neural network, the quantized first and second parameters, the first control information, and the second control information on a processor;
interpreting, by the processor, the quantized first and second parameters, based on the first control information and the second control information, respectively;
configuring, by the processor, the topology of the neural network, based on the quantized first and second parameters interpreted by the processor; and
applying the configured neural network on sensor data generated by a flow cell, to generate base call classification data.

16. The method of claim 14, wherein the first parameter and the second parameter are a first trained weight and a second trained weight of the neural network.

17. The method of claim 14, wherein the first parameter and the second parameter are a first trained bias and a second trained bias of the neural network.

18. A method of generating base call classification data, comprising:

selecting a lookup table from a plurality of lookup tables comprising varying respective value ranges for a plurality of available quantization formats;
loading, on a configurable processor, (i) a topology of a neural network, (ii) a plurality of groups of parameters, each group of parameters including two or more corresponding parameters, and (iii) for each group of parameters, corresponding control information, wherein control information of each group of parameters identifies a corresponding quantization format, selected according to the respective value ranges of the selected lookup table, in which each parameter of the corresponding group of parameters is quantized;
interpreting, by the configurable processor, the parameters in each group of parameters, based on the corresponding control information;
configuring, by the configurable processor, the topology of the neural network, based on the parameters as interpreted by the configurable processor; and
applying the configured neural network on sensor data generated by a flow cell, to generate base call classification data.

19. The method of claim 18, wherein:
first control information identifies a first quantization format in which parameters of a corresponding first group of parameters are quantized;
second control information identifies a second quantization format in which parameters of a corresponding second group of parameters are quantized;
the first quantization format and the second quantization format have a same number of total bits; the first quantization format has a sign bit, a first number of integer bits, and a second number of fractional bits; and
the second quantization format has a sign bit, a third number of integer bits that is different from the first number of integer bits, and a fourth number of fractional bits that is different from the second number of fractional bits.

20. A system, comprising:
memory storing trained weights and biases for a neural network in a prequantized format, and a plurality of lookup tables comprising varying respective value ranges for a plurality of available quantization formats implemented by a configurable processor, wherein quantization formats in the plurality of available quantization formats have a same total bit width, with variations in fractional bit widths;
quantization logic configured to use quantization parameters of a selected lookup table from the plurality of lookup tables to quantize the trained weights and biases from the prequantized format to one or more quantization formats of the plurality of available quantization formats according to the respective value ranges of the selected lookup table;
runtime logic configured to generate a configuration file that includes the quantized trained weights and biases, and control information that identifies the one or more quantization formats as selected quantization formats, and to load the configuration file on the configurable processor; and
the configurable processor configured to store and process the quantized trained weights and biases based on the control information, to compensate for the variations in fractional bit widths between the selected quantization formats using bit shift operations, and to apply the quantized trained weights and biases of the neural network on sensor data generated by a substrate to generate base call classification data.

21. The system of claim 20, wherein the neural network has a plurality of layers, and the quantization parameters specify the plurality of available quantization formats for each layer in the plurality of layers.

22. The system of claim 21, wherein the control information includes one or more control bits that are configured to indicate the selected quantization formats.

23. The system of claim 22, wherein the control information includes the control bits for each layer in the plurality of layers.

24. The system of claim 21, wherein the quantization parameters specify a first selected quantization format for a first layer in the plurality of layers, a second selected quantization format for a second layer in the plurality of layers, and a third selected quantization format for a third layer in the plurality of layers.

25. The system of claim 24, wherein the quantization logic is further configured to use the first selected quantization format to quantize a first set of the trained weights and biases for the first layer, the second selected quantization format to quantize a second set of the trained weights and biases for the second layer, and the third selected quantization format to quantize a third set of the trained weights and biases for the third layer.

26. The system of claim 25, wherein, for a sequencing run, the runtime logic is further configured to load, on the configurable processor, a first set of the trained weights and biases, then a second set of the trained weights and biases, and then a third set of the trained weights and biases.

27. The system of claim 20, wherein the neural network processes an input that has a plurality of channels, and the quantization parameters specify the plurality of available quantization formats for each channel in the plurality of channels.

28. The system of claim 20, wherein each operation in a plurality of operations of the neural network has a plurality of groups of trained weights and biases, and the quantization parameters specify the plurality of available quantization formats for each group of trained weights and biases in the plurality of groups of trained weights and biases.

29. The system of claim 20, wherein the configurable processor is further configured to quantize weighted sums and post-nonlinearized outputs generated from the quantized trained weights and biases in the selected quantization formats using the bit shift operations.

30. The system of claim 20, wherein the quantization formats in the plurality of available quantization formats comprise signed values.

31. The system of claim 20, wherein the quantization formats in the plurality of available quantization formats comprise unsigned values.

* * * * *